Nov. 19, 1957  A. H. DICKINSON ET AL  2,813,986
ACCOUNTING MACHINE SYSTEMS
Filed April 29, 1953
50 Sheets-Sheet 1

INVENTORS
ARTHUR H. DICKINSON
BY ROBERT I. ROTH
Joseph B. Taphorn
ATTORNEY

Nov. 19, 1957    A. H. DICKINSON ET AL    2,813,986
ACCOUNTING MACHINE SYSTEMS
Filed April 29, 1953    50 Sheets-Sheet 2

INVENTORS
ARTHUR H. DICKINSON
BY ROBERT I. ROTH
ATTORNEY

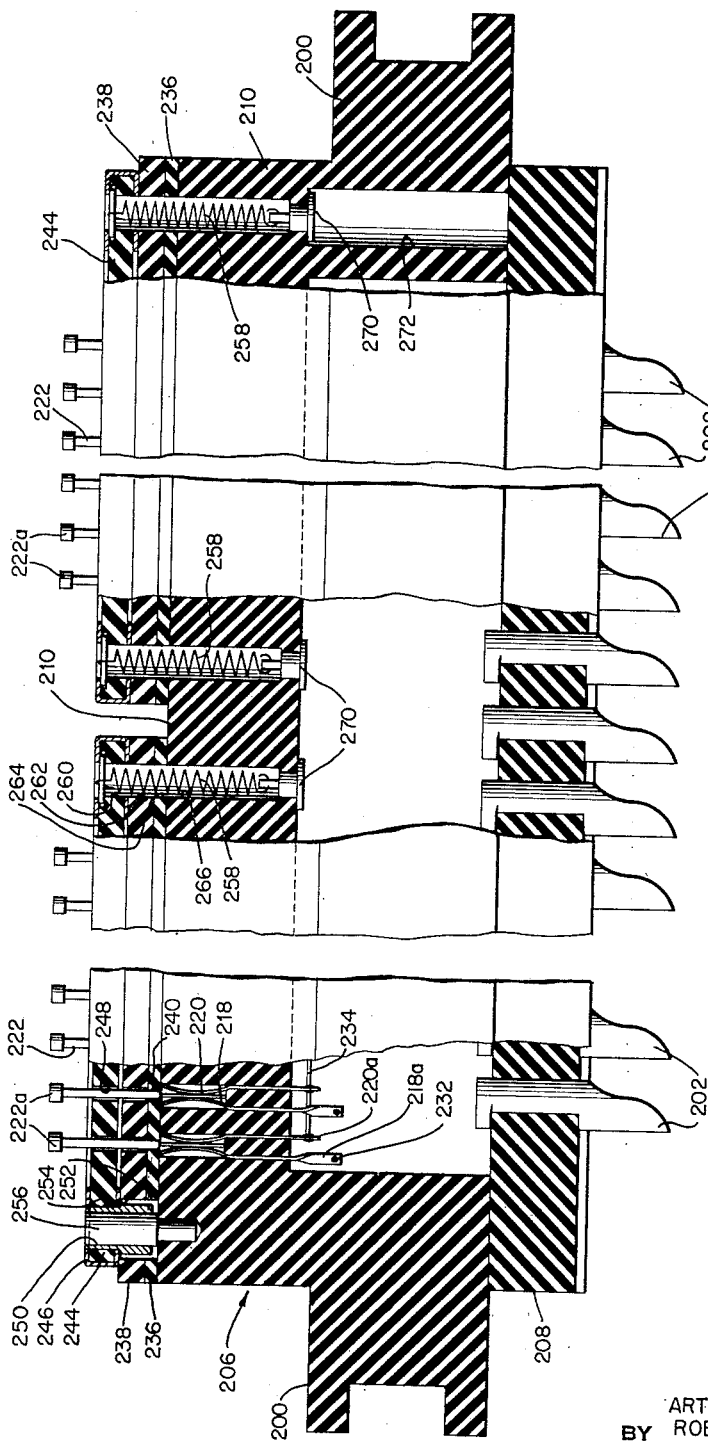

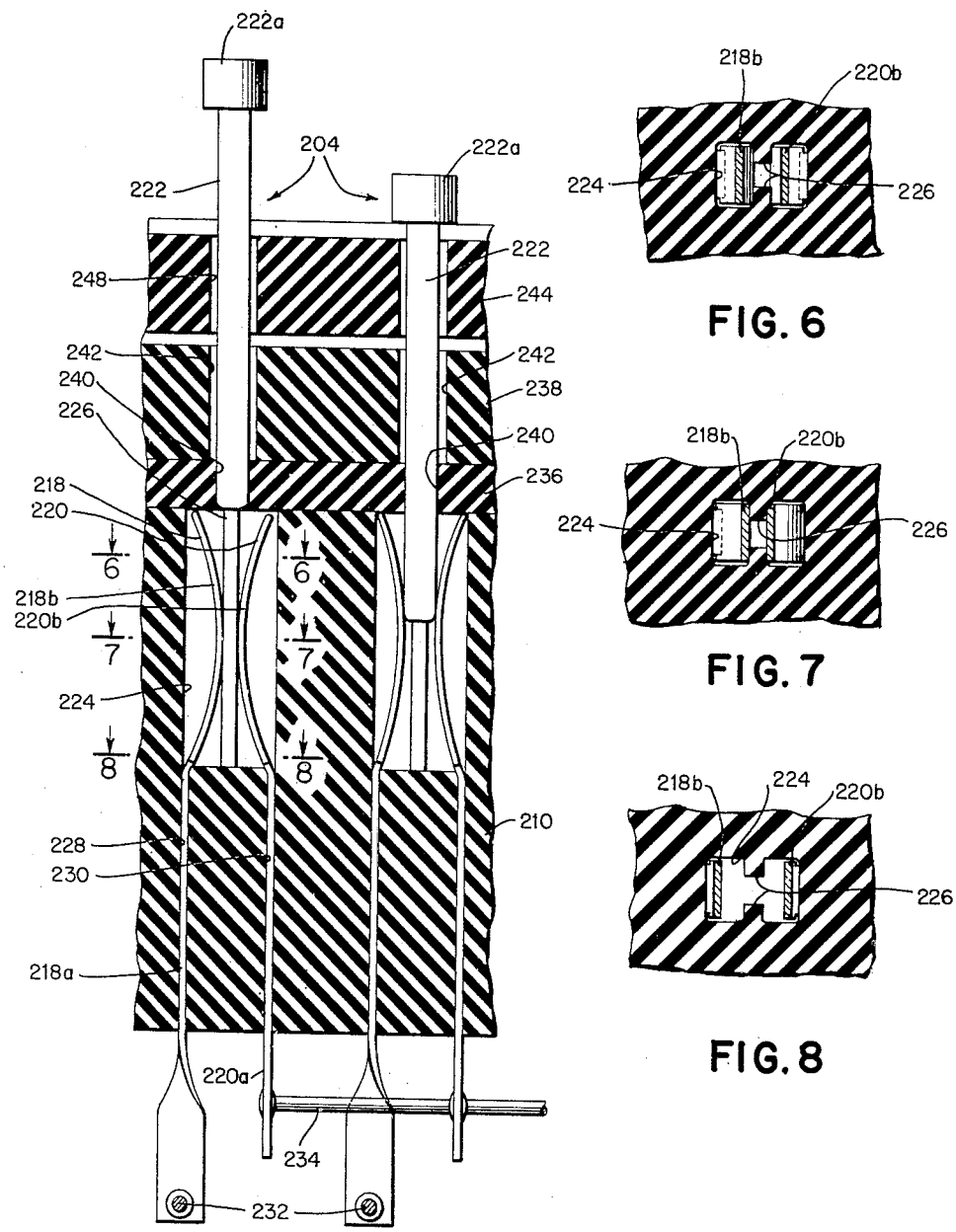

Nov. 19, 1957   A. H. DICKINSON ET AL   2,813,986
ACCOUNTING MACHINE SYSTEMS
Filed April 29, 1953                    50 Sheets-Sheet 5
FIG. 9
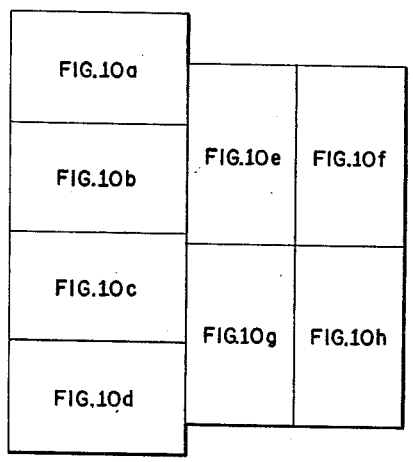
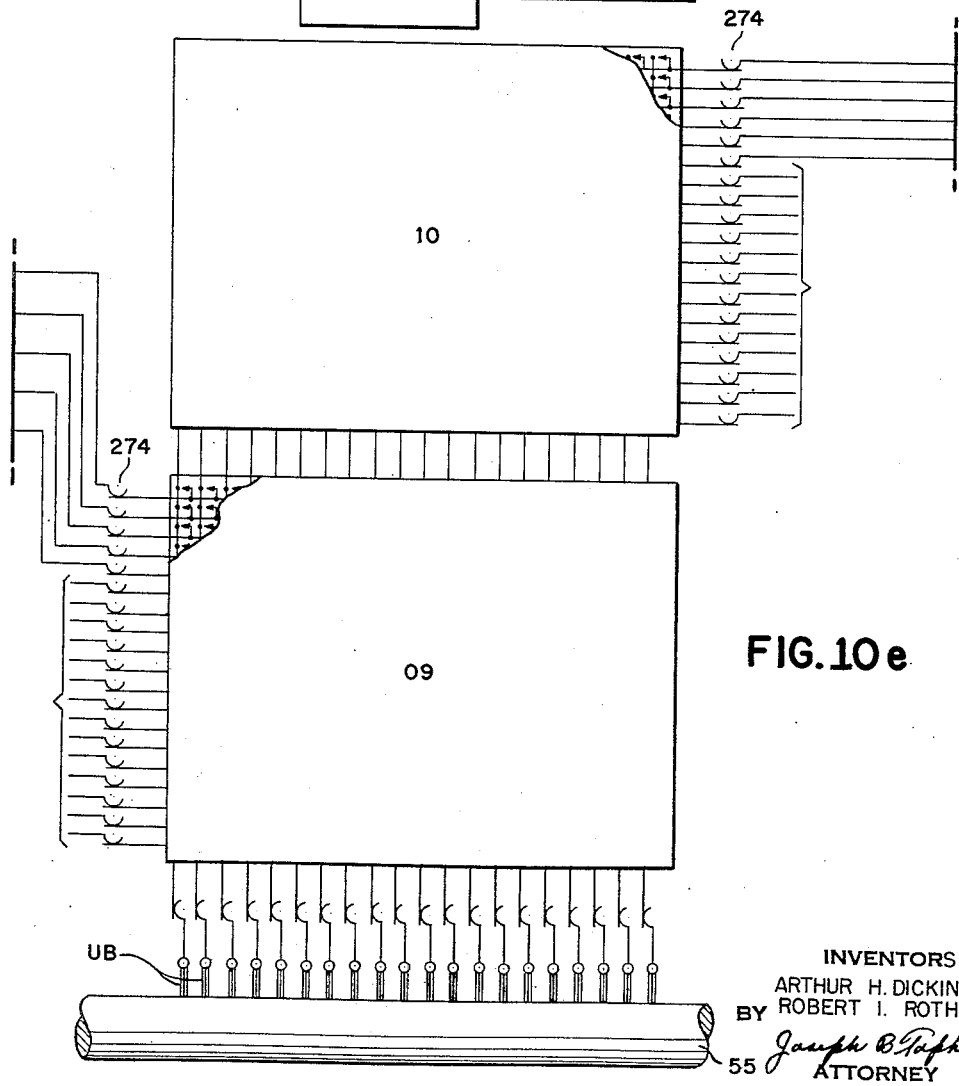
FIG. 10e
INVENTORS
ARTHUR H. DICKINSON
BY ROBERT I. ROTH
ATTORNEY Nov. 19, 1957   A. H. DICKINSON ET AL   2,813,986
ACCOUNTING MACHINE SYSTEMS
Filed April 29, 1953   50 Sheets-Sheet 6
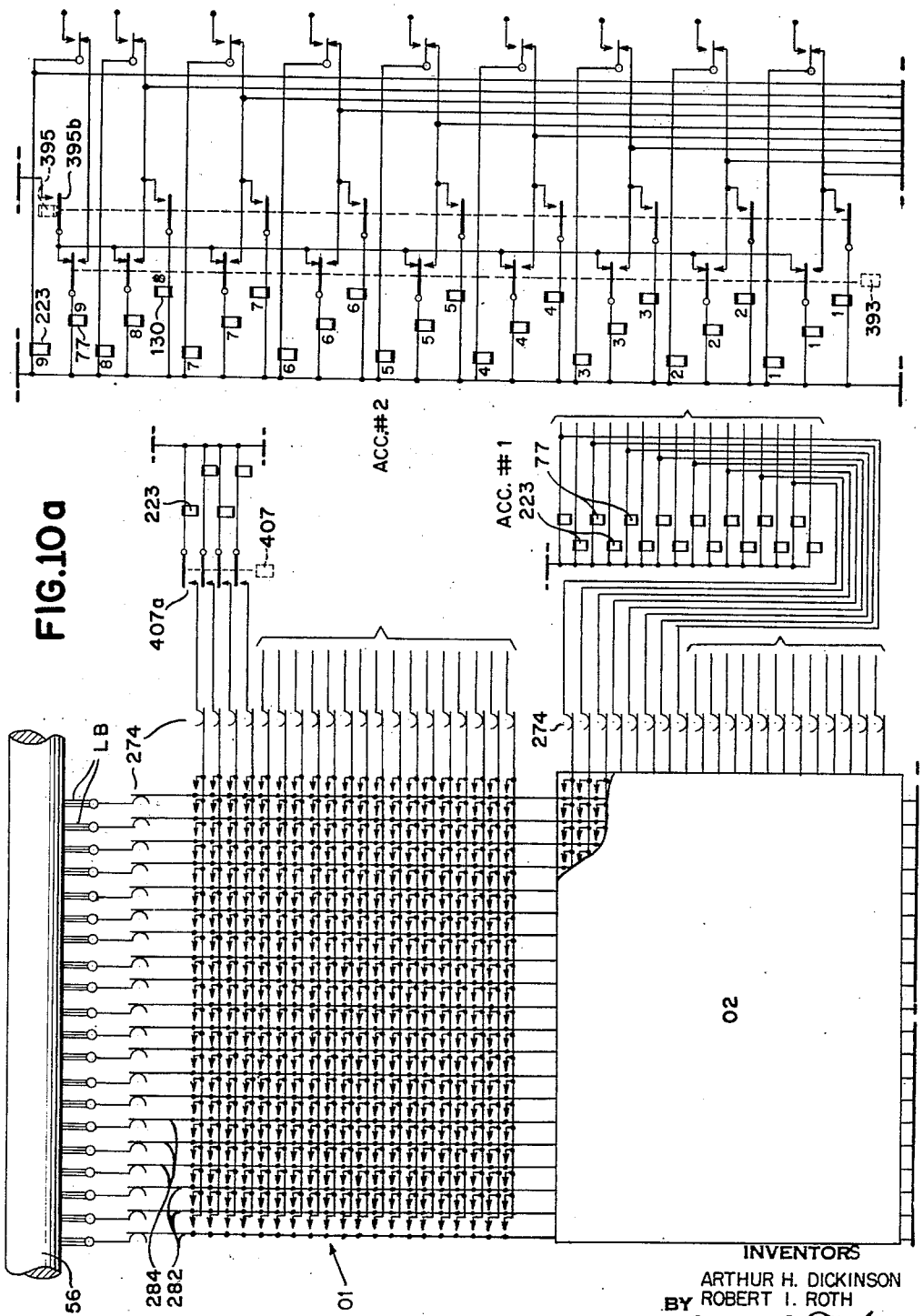
INVENTORS
ARTHUR H. DICKINSON
ROBERT I. ROTH
BY
ATTORNEY

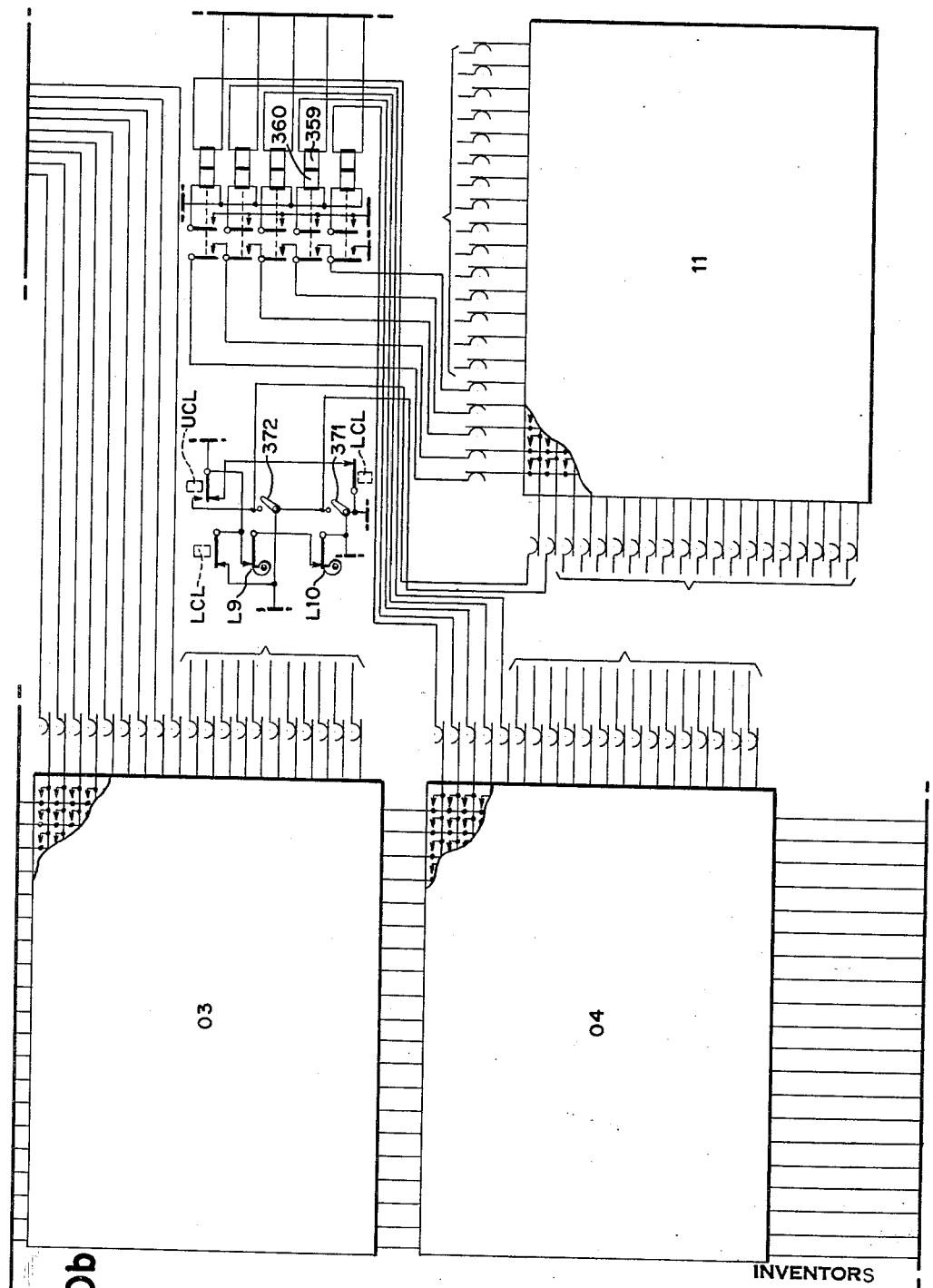

Nov. 19, 1957 A. H. DICKINSON ET AL 2,813,986
ACCOUNTING MACHINE SYSTEMS
Filed April 29, 1953 50 Sheets-Sheet 8

INVENTORS
ARTHUR H. DICKINSON
BY ROBERT I. ROTH
ATTORNEY

Nov. 19, 1957  A. H. DICKINSON ET AL  2,813,986
ACCOUNTING MACHINE SYSTEMS
Filed April 29, 1953  50 Sheets-Sheet 9

INVENTORS
ARTHUR H. DICKINSON
BY ROBERT I ROTH
ATTORNEY

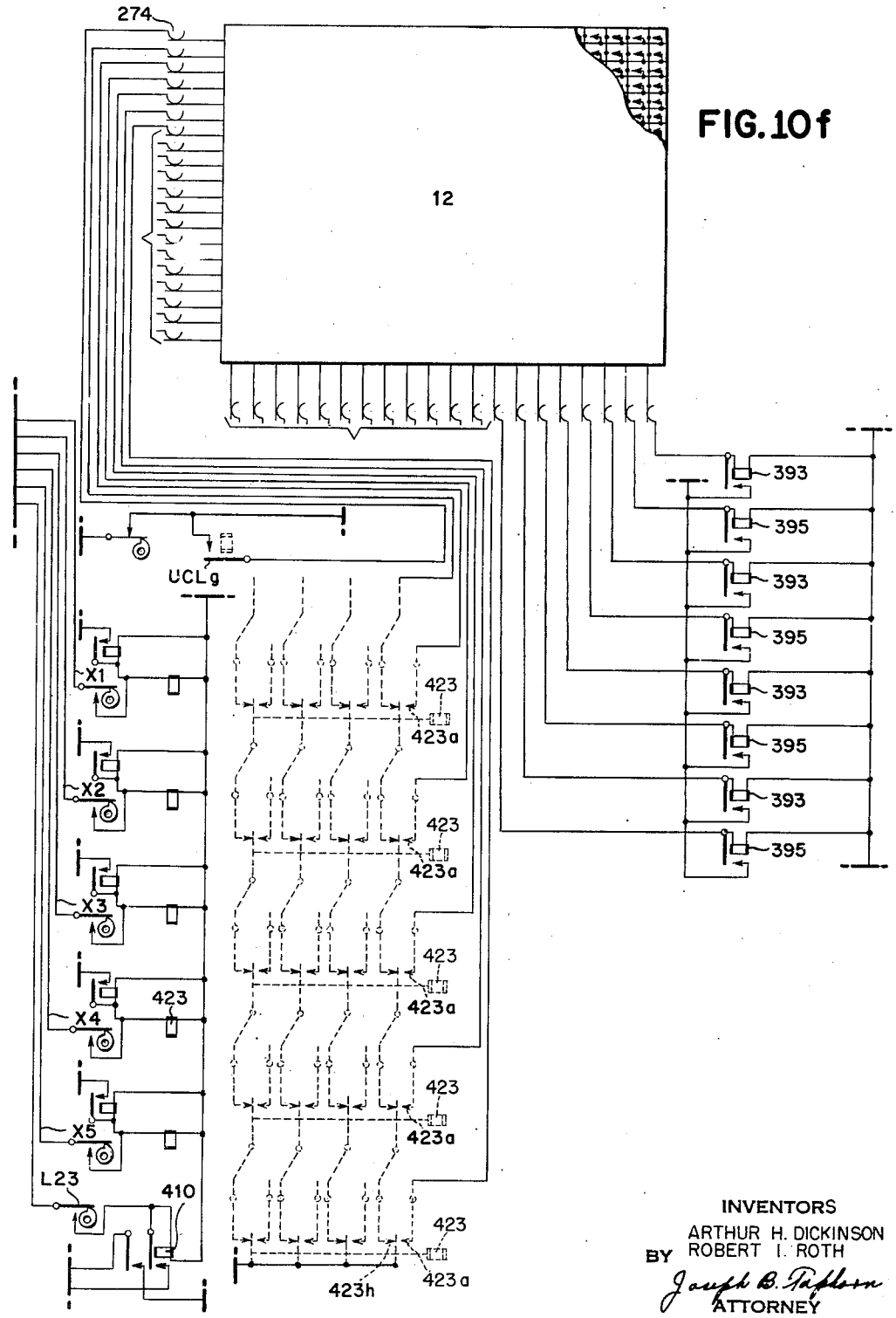

Nov. 19, 1957  A. H. DICKINSON ET AL  2,813,986
ACCOUNTING MACHINE SYSTEMS
Filed April 29, 1953  50 Sheets-Sheet 13

INVENTORS
ARTHUR H. DICKINSON
ROBERT I. ROTH
BY
ATTORNEY

Nov. 19, 1957  A. H. DICKINSON ET AL  2,813,986
ACCOUNTING MACHINE SYSTEMS
Filed April 29, 1953  50 Sheets-Sheet 14
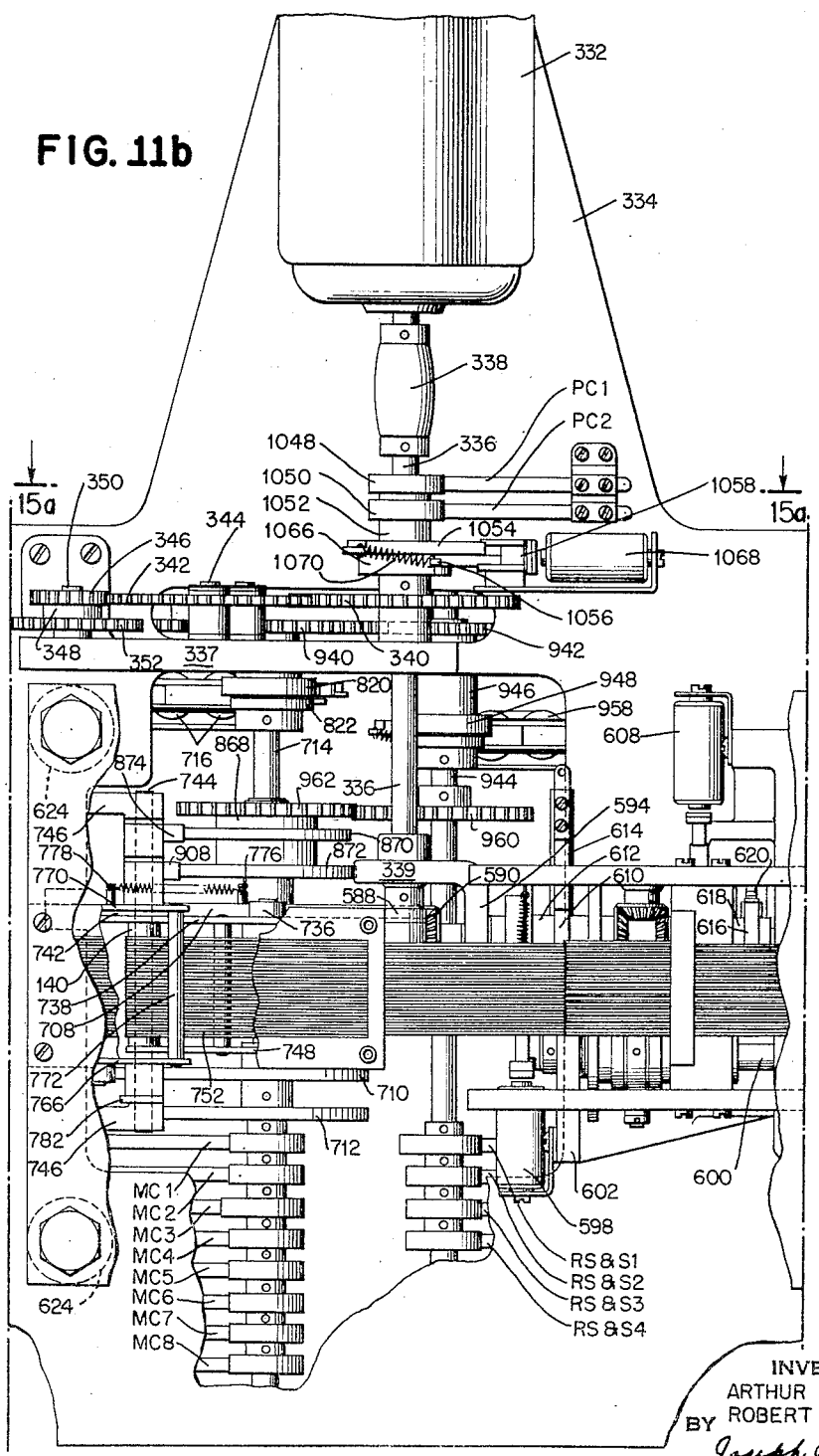
INVENTORS
ARTHUR H. DICKINSON
ROBERT I. ROTH
BY
Joseph B. Taphorn
ATTORNEY Nov. 19, 1957  A. H. DICKINSON ET AL  2,813,986
ACCOUNTING MACHINE SYSTEMS
Filed April 29, 1953  50 Sheets-Sheet 15

INVENTORS
ARTHUR H. DICKINSON
ROBERT I. ROTH
BY
*Joseph B. Taphorn*
ATTORNEY

Nov. 19, 1957   A. H. DICKINSON ET AL   2,813,986
ACCOUNTING MACHINE SYSTEMS
Filed April 29, 1953                    50 Sheets-Sheet 16

INVENTORS
ARTHUR H. DICKINSON
BY ROBERT I. ROTH
ATTORNEY

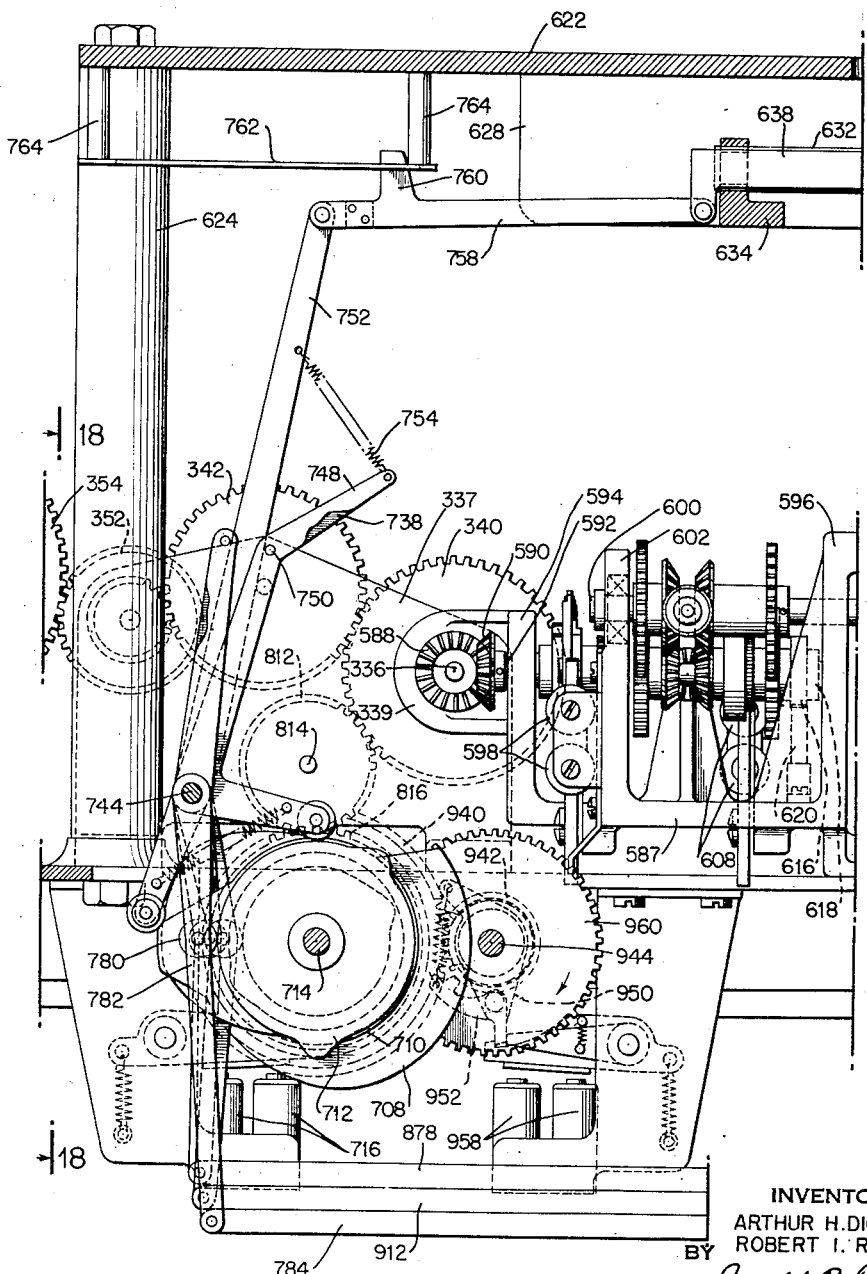

Nov. 19, 1957  A. H. DICKINSON ET AL  2,813,986
ACCOUNTING MACHINE SYSTEMS
Filed April 29, 1953  50 Sheets-Sheet 19

INVENTORS
ARTHUR H. DICKINSON
BY ROBERT I. ROTH
ATTORNEY

Nov. 19, 1957 A. H. DICKINSON ET AL 2,813,986
ACCOUNTING MACHINE SYSTEMS
Filed April 29, 1953 50 Sheets-Sheet 20
FIG. 12d
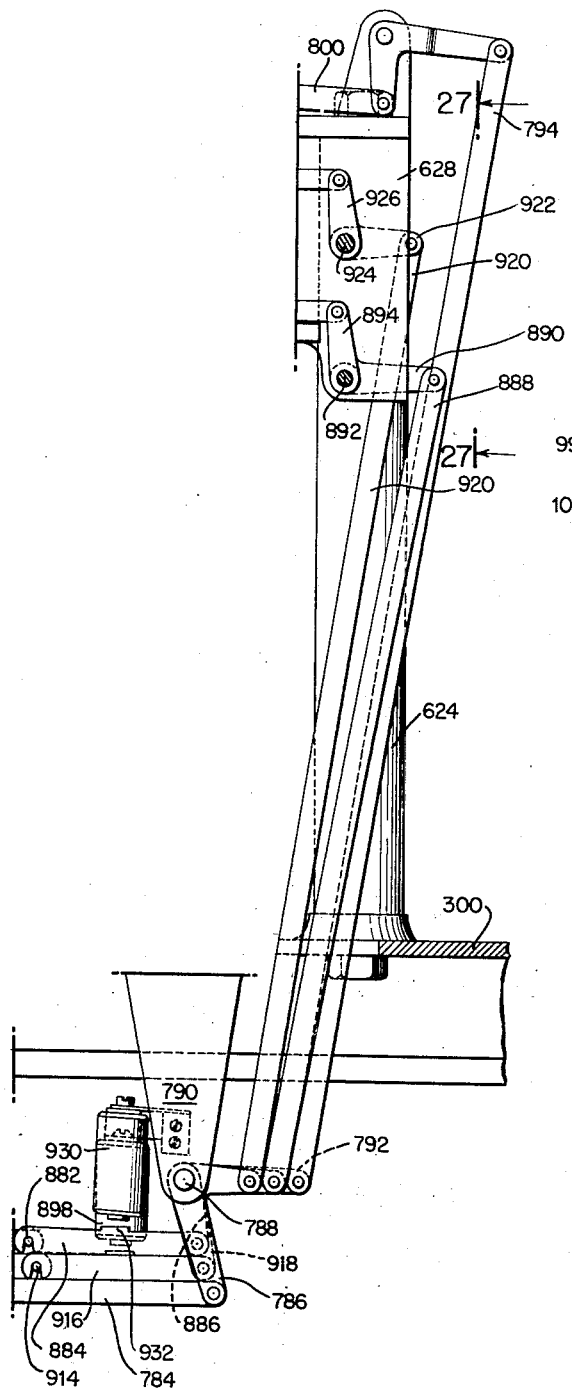
FIG. 13
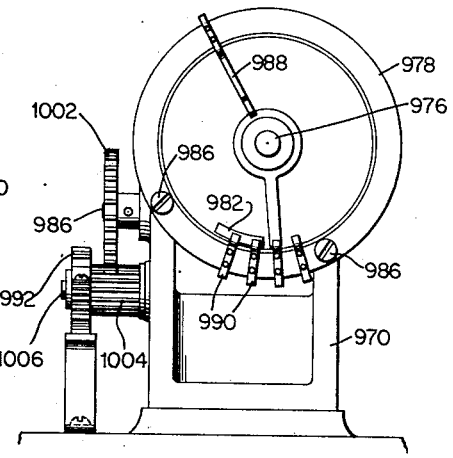
FIG. 14
INVENTORS
ARTHUR H. DICKINSON
BY ROBERT I. ROTH
Joseph B. Taphorn
ATTORNEY Nov. 19, 1957    A. H. DICKINSON ET AL    2,813,986
ACCOUNTING MACHINE SYSTEMS Filed April 29, 1953    50 Sheets-Sheet 22

INVENTORS
ARTHUR H. DICKINSON
BY ROBERT I. ROTH
ATTORNEY

Nov. 19, 1957 A. H. DICKINSON ET AL 2,813,986
ACCOUNTING MACHINE SYSTEMS
Filed April 29, 1953 50 Sheets-Sheet 23

INVENTORS
ARTHUR H. DICKINSON
BY ROBERT I. ROTH
ATTORNEY

INVENTORS
ARTHUR H. DICKINSON
ROBERT I. ROTH
BY
*Joseph B. Taphorn*
ATTORNEY

Nov. 19, 1957  A. H. DICKINSON ET AL  2,813,986
ACCOUNTING MACHINE SYSTEMS
Filed April 29, 1953  50 Sheets-Sheet 28

INVENTORS
ARTHUR H. DICKINSON
BY ROBERT I. ROTH
ATTORNEY

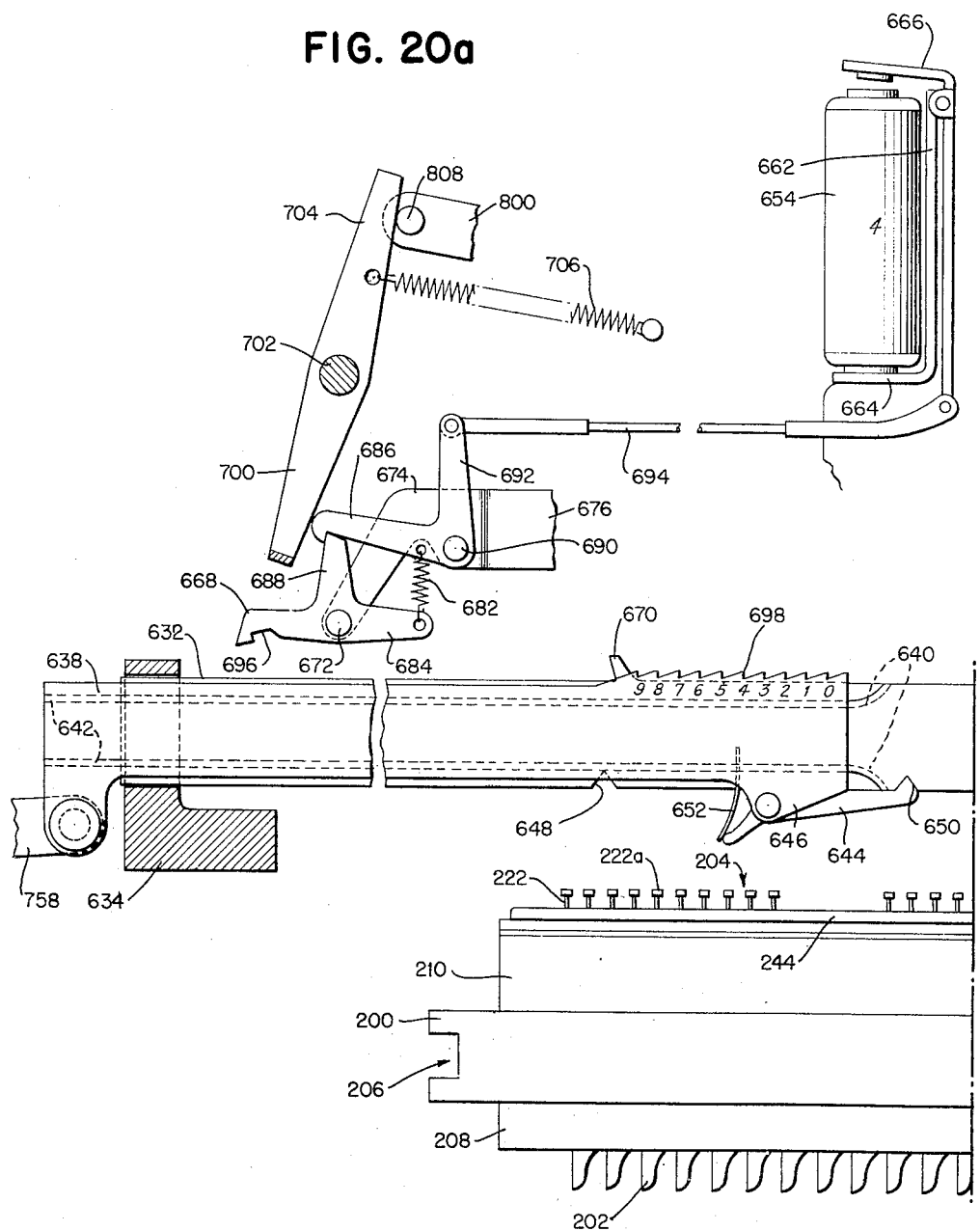

Nov. 19, 1957   A. H. DICKINSON ET AL   2,813,986
ACCOUNTING MACHINE SYSTEMS
Filed April 29, 1953   50 Sheets-Sheet 30

INVENTORS
ARTHUR H. DICKINSON
BY ROBERT I. ROTH
ATTORNEY

Nov. 19, 1957  A. H. DICKINSON ET AL  2,813,986
ACCOUNTING MACHINE SYSTEMS
Filed April 29, 1953  50 Sheets-Sheet 32

INVENTORS
ARTHUR H. DICKINSON
ROBERT I. ROTH
BY
ATTORNEY

Nov. 19, 1957    A. H. DICKINSON ET AL    2,813,986
ACCOUNTING MACHINE SYSTEMS
Filed April 29, 1953    50 Sheets-Sheet 33

INVENTORS
ARTHUR H. DICKINSON
ROBERT I. ROTH
BY Joseph B. Gaphorn
ATTORNEY

Nov. 19, 1957 A. H. DICKINSON ET AL 2,813,986
ACCOUNTING MACHINE SYSTEMS
Filed April 29, 1953 50 Sheets-Sheet 34

INVENTORS
ARTHUR H. DICKINSON
BY ROBERT I. ROTH
ATTORNEY

Nov. 19, 1957    A. H. DICKINSON ET AL    2,813,986
ACCOUNTING MACHINE SYSTEMS
Filed April 29, 1953    50 Sheets-Sheet 35

INVENTORS
ARTHUR H. DICKINSON
BY ROBERT I. ROTH
Joseph B. Taphorn
ATTORNEY

Nov. 19, 1957   A. H. DICKINSON ET AL   2,813,986
ACCOUNTING MACHINE SYSTEMS
Filed April 29, 1953   50 Sheets-Sheet 36

INVENTORS
ARTHUR H. DICKINSON
BY ROBERT I. ROTH
Joseph B. Taphorn
ATTORNEY

Nov. 19, 1957  A. H. DICKINSON ET AL  2,813,986
ACCOUNTING MACHINE SYSTEMS

Filed April 29, 1953  50 Sheets-Sheet 38

INVENTORS
ARTHUR H. DICKINSON
ROBERT I. ROTH

BY *Joseph B. Taphorn*
ATTORNEY

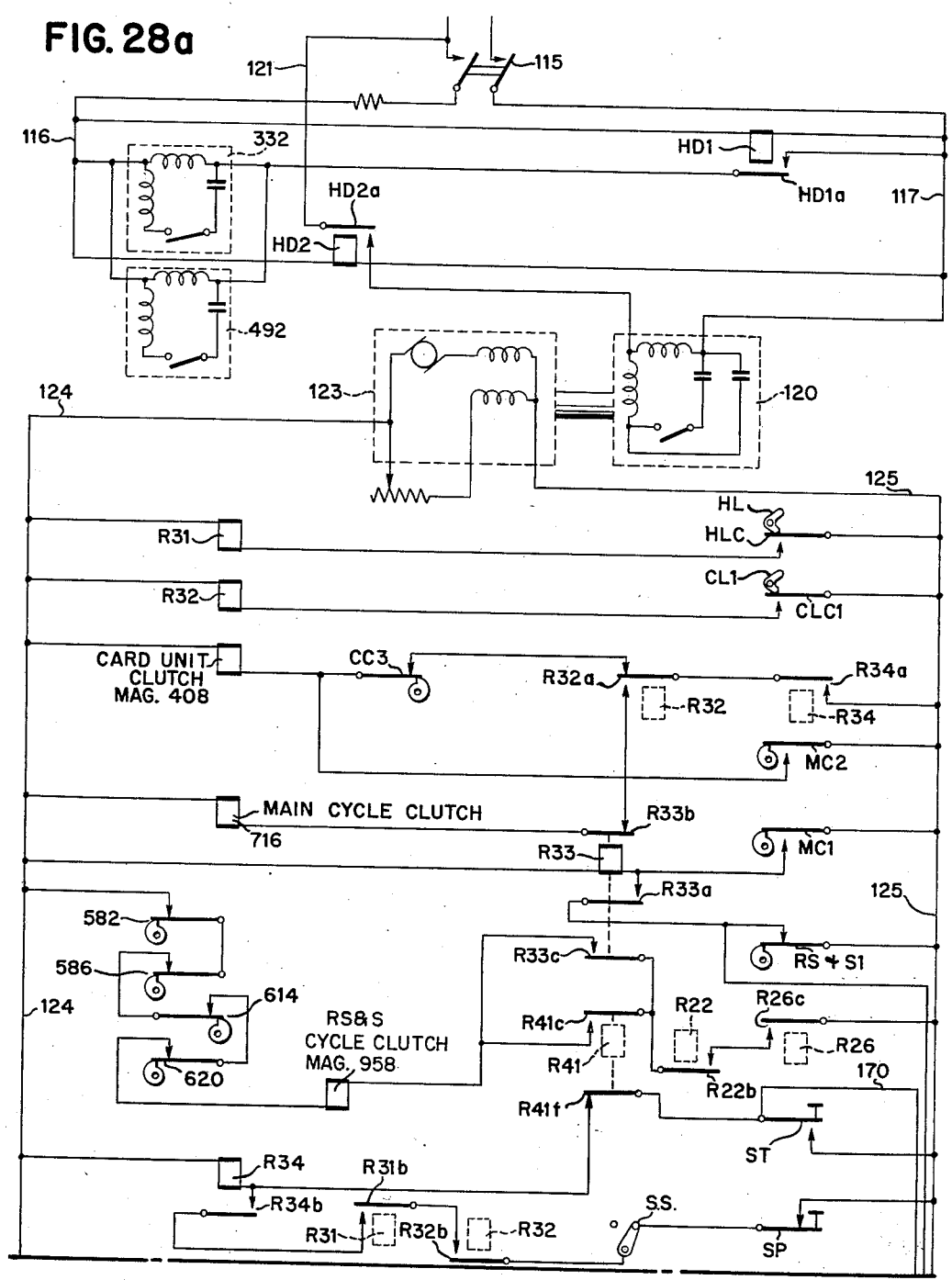

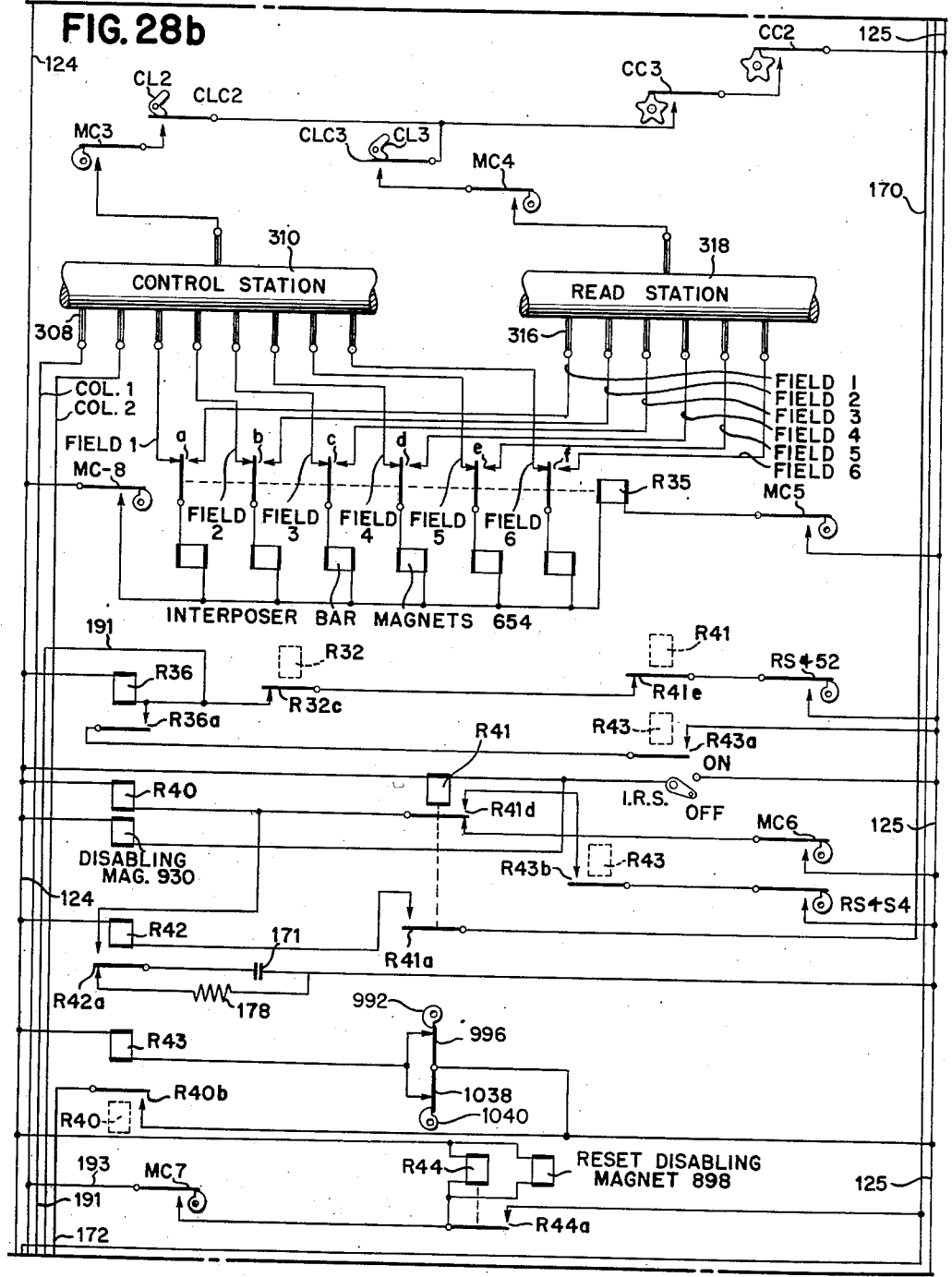

INVENTORS
ARTHUR H. DICKINSON
BY ROBERT I. ROTH

ATTORNEY

Nov. 19, 1957 A. H. DICKINSON ET AL 2,813,986
ACCOUNTING MACHINE SYSTEMS
Filed April 29, 1953 50 Sheets-Sheet 42

INVENTORS
ARTHUR H. DICKINSON
BY ROBERT I. ROTH
ATTORNEY

Nov. 19, 1957   A. H. DICKINSON ET AL   2,813,986
ACCOUNTING MACHINE SYSTEMS
Filed April 29, 1953   50 Sheets-Sheet 44

INVENTORS
ARTHUR H. DICKINSON
BY ROBERT I. ROTH
ATTORNEY

Nov. 19, 1957  A. H. DICKINSON ET AL  2,813,986
ACCOUNTING MACHINE SYSTEMS
Filed April 29, 1953  50 Sheets-Sheet 46

INVENTORS
ARTHUR H. DICKINSON
BY  ROBERT I. ROTH
ATTORNEY

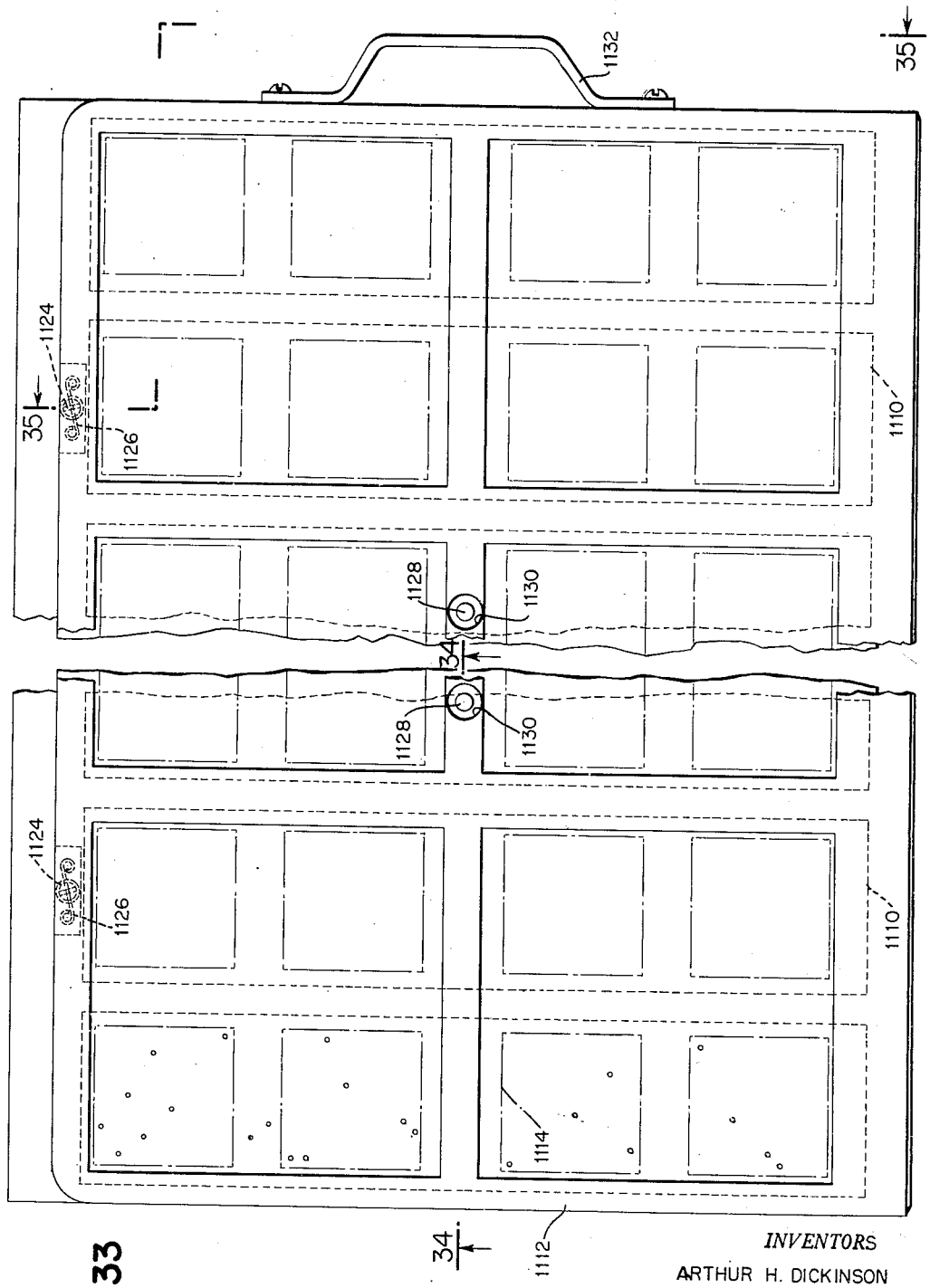

Nov. 19, 1957 A. H. DICKINSON ET AL 2,813,986
ACCOUNTING MACHINE SYSTEMS
Filed April 29, 1953 50 Sheets-Sheet 48
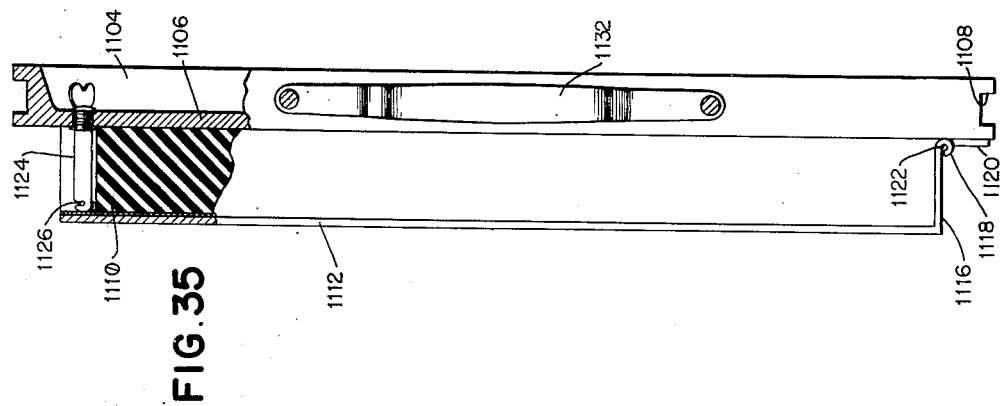
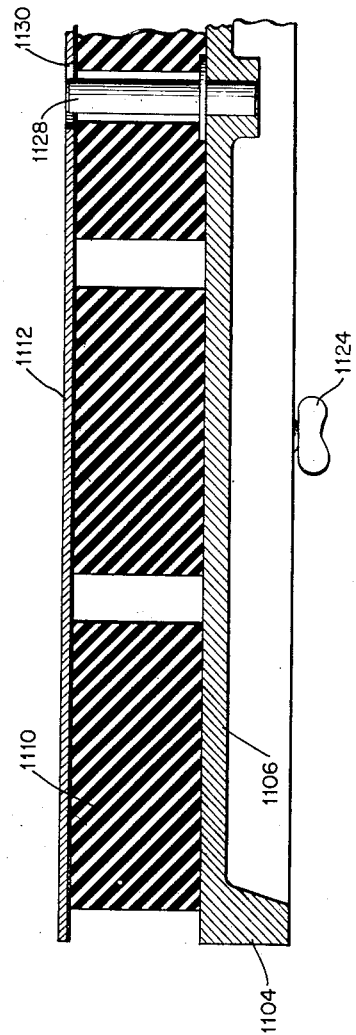
INVENTORS
ARTHUR H. DICKINSON
ROBERT I. ROTH
BY *Joseph B. Taphorn*
ATTORNEY

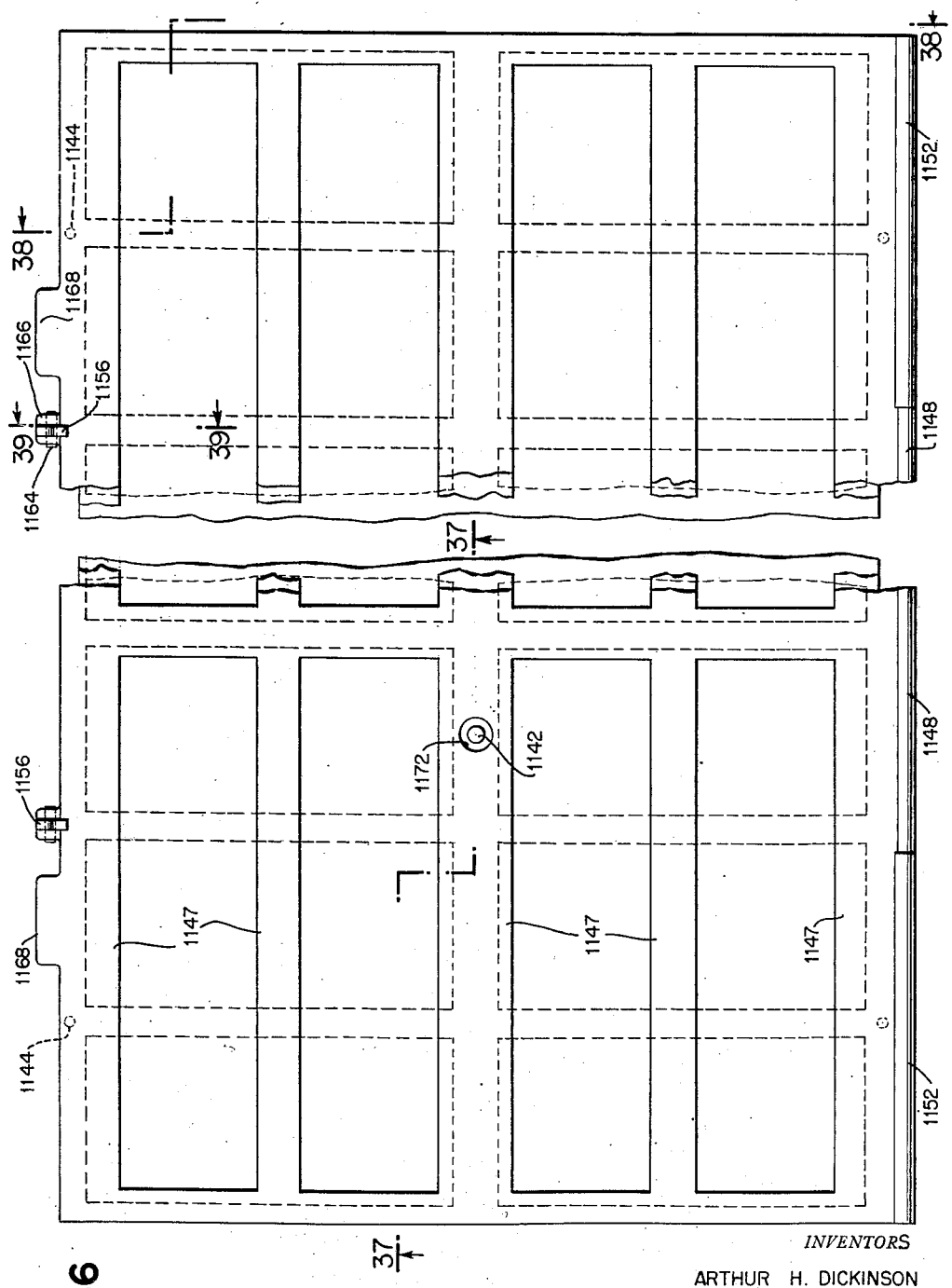

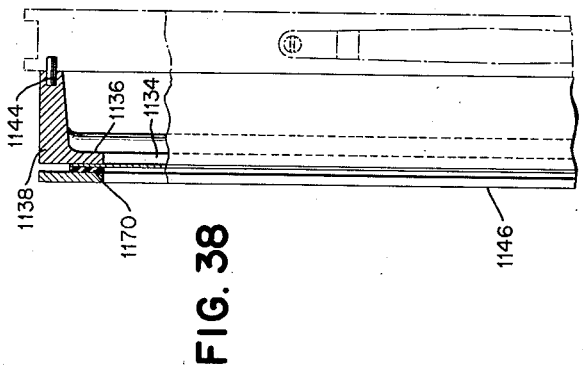
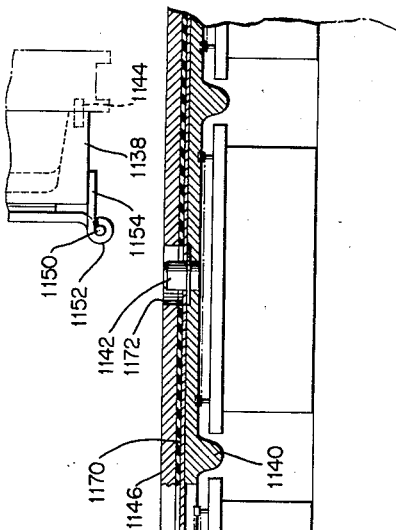
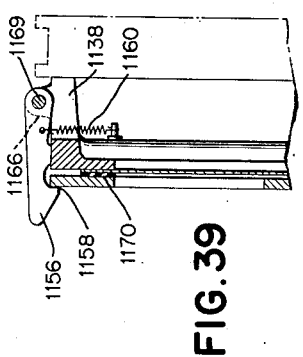

United States Patent Office 2,813,986
Patented Nov. 19, 1957

2,813,986

ACCOUNTING MACHINE SYSTEMS

Arthur H. Dickinson, Greenwich, Conn., and Robert I. Roth, Briarcliff Manor, N. Y., assignors to International Business Machines Corporation, New York, N. Y., a corporation of New York Application April 29, 1953, Serial No. 351,914

42 Claims. (Cl. 307—115)

This invention is concerned with the making of electrical interconnections in complex circuits such as are found in record controlled accounting machines, and more particularly, with control panels by which such electrical interconnections are made and with ways and means for setting up of such control panels which include a record controlled machine whereby such control panels may be set up directly and, in addition, other instrumentalities whereby such control panels may be readily set up by manual means at points remote from such a machine.

While record controlled accounting machines may be of various types such as punches, sorters, collators, calculators, and tabulators and aspects of this invention may be utilized with all of them; for the purposes of illustrating the present invention, the tabulating machine disclosed in the Lake et al. Patent No. 1,976,617 is relied upon. In that machine, various accounting operations are performed upon data recorded according to a preselected code as perforations at different index point positions in different columns of record cards. Different reports are obtained by simply changing the electrical connections between different elements of the machine.

In the tabulating machine disclosed in the Lake et al. patent, different electrical connections are made between various brushes adapted to sense the several columns in a perforated record card and the several orders of different accumulators so that any column of a card may be caused to control any order of any accumulator. Also, when printing is being effected in such a machine, any order of an accumulator may be connected to any column of type so that the printing will be done in a desired position on the report sheet. Or, if listing is to be done directly from the card, any column on the card may be connected to control any column of type to cause printing to be done in the desired column on the report.

Connections may also be made to cause the tabulating machine to bring about the taking of a total at the end of one group of cards and before accumulating commences under the control of the next group. This totaling may be done automatically when the machine effects a change from one group to the next. The feeding of cards at this time automatically ceases and the machine performs totaling operations clearing the columns if set to do so and then resuming accumulating or accumulating and listing operations under the control of the next group of cards.

Connections may also be made to cause the tabulating machine to take totals of major and minor groups. In such instances the groups of cards are divided into major and minor groups, as for instance, when several reports have been made covering the several months and the various days of each month. The groups of cards would be divided into minor groups covering the days and major groups covering the months. All the cards for one day are placed together followed by the group of cards for the next day and so on to the end of the month. The cards pertaining to one month are placed ahead of the cards for the succeeding month.

At the end of each minor group total, the accumulator may be made to clear so that each day's total will be separate from each other day, or the machine may be set to take progressive or accumulative totals so that each day's total will be included with the total of the preceding days of the month. Thus at the end of a group of cards for a particular day the machine is automatically caused to print a total of the data related to that day's transactions and to then commence operation in connection with the data for the next day.

Connections may also be made with respect to each of the accumulators in the machine to cause them to clear after the printing of minor totals or after the printing of major totals. Hence, at the end of the last day of the month there is a change in the major group as well as the minor group and the total for the day is printed and followed by the total for all of the days of that month. Of course, the accumulator which controls the printing of major totals must be set to accumulate data taken from all the cards of all of the minor groups included in the major group without any clearing operations until after the printing of the major total. After this, the machine commences analyzing cards for the first day of the next month. The accumulator may also be set to accumulate the progressive monthly major totals so that when the last major total is printed it will include all preceding major totals, or in other words will constitute a grand total of all the major totals.

These electrical connections or interconnections are usually effected at a control panel such as that disclosed in Fig. 1 of the Lake et al. patent. At the control panel, the leads from the various accounting elements are made to terminate. Heretofore, it has been customary to have the various leads terminate in the form of plug sockets. Cross connections were effected by the use of the plug wires which could be connected between the various sockets. This operation was referred to as "plugging up the machine."

In order to eliminate the need for completely replugging the machine whenever a different type of report was to be rendered, the control panel was provided with a separable connection board or "removable plugboard" as it is sometimes called, such as that disclosed in the Lake Patent No. 2,111,118. In a control panel having such a board, the sockets were mounted in the "removable plugboard" and the leads to the sockets are provided with readily separable connectors that facilitated the easy installation and removal of the "plugboards." The use of such "removable plugboards" reduced the "down" time of the tabulating machine in that it enabled the machine to be operated during the time that was normally devoted to connection changing. It also saved the time and effort that was formerly devoted to plugging up the machine for a type of report similar to a previous report, in that setup plugboards could be maintained in plugged or connected condition for those common reports and inserted as a complete unit in the control panel of the tabulating machine whenever such a report was again desired. The "removable plugboard" also enabled the plugging to be done in an out of the way place and with the plugboard disposed in a way that is most convenient to the operator.

Nevertheless, the use of such removable plugboards was not attended to without difficulty. There were so many individual wires to be set and so many different arrangements to govern the setting of the wires that unless the operator was extremely skilled and experienced in the operation of the machine, mistakes were made and these occurred even with the most skilled operators. Aside from the loss of time resulting from the errors which occurred, the plugging procedure itself occupied too great a period of time and entailed too concentrated an effort.

Furthermore, in statistical departments and others, a large number of different types of reports are commonly rendered. In providing a set-up "plugboard" for each type of commonly rendered report a large amount of space is utilized, as a "plugboard" which has its sockets interconnected with plug wires is of a considerable thickness. Thus the retention of a large number of set-up plugboards creates a storage problem which is particularly critical in locations where space is at a premium.

Accordingly, it is an object of this invention to eliminate the errors which have attended the setting up of connection boards.

It is another object of this invention to eliminate most, if not all, of the time involved in setting up a connection board and also to eliminate the need of a skilled operator to effect such settings.

It is a further object of the invention to so simplify the setting up of a removable connection board as to generally eliminate the need for storing set-up connection boards for use with common types of reports. A more specific object is to provide for the ready setting up of connection boards from records which occupy only a fraction of the space required by set-up "plugboards."

Still another object of the invention is to provide a removable connection board which if retained in a set-up condition occupies little of the space formerly required for a set-up plugboard.

According to the invention a removable connection board has been provided with integral connection-adjusting means whereby each of a plurality of leads from the accounting elements of the tabulating machine may be connected to the others singly or a plurality at a time. The connection-adjusting means are embodied in the form of switches each of which has a pair of contacts of which one is connected with one lead while the other is connected with another lead different from that to which is connected the other contact element of another switch whose one contact element is also connected to the one lead. A sufficient number of such switches are provided so that any lead may be connected with any other lead or number of such leads by simply closing switches. The circuits are completed through the contact elements by slidable connectors or pins which, when depressed, engage each of the contact elements. Facility in resetting the connection board is achieved by extending the connectors through a plate which may be raised to open the switches upon engagement with the headed upper ends of the connectors.

A salient feature of the invention resides in the provision of a record controlled machine for adjusting the circuit connections in such a removable connection board. A group of record cards prepared with information concerning the connections to be made on the removable connection board are processed through the machine which opens and closes the switches in accordance with the instructions contained thereon. To facilitate the switching operations the connection board is divided into sections and is movable by the machine so as to dispose the sections singly at a switching station in the machine. Each card pertains to but one section though more than one card may pertain to each section. As each card is fed through the machine it is first analyzed to determine what section is to be adjusted and thereafter it is analyzed for the connections to be made later after the section of the connection board or switchboard has been disposed at the switching station.

According to another feature of the invention provision is made for the perforation of a template by the record controlled machine whereby a switchboard may, at a point remote from the machine, be readily adjusted by manual means. A dummy switchboard is provided to support the blank template in the record controlled machine for perforation area by area in a manner akin to the closing of the switches section by section on the switchboard. In addition, a template adapter is provided to support the perforated template over the switchboard in a manner facilitating the manual insertion of a stylus or like tool therethrough to depress the connectors closing the switches of the switchboard.

The foregoing and other features, objects, and advantages of the invention will become apparent from the following description and claims and the accompanying drawings, which disclose, by way of example, the principle of the invention and the best mode, which has been contemplated, of applying that principle.

In the drawings:

Fig. 3 is a cross sectional view taken along the line 3—3 of Fig. 1.

Fig. 5 is an enlarged view of the portion of the switchboard shown in section of Fig. 3.

Fig. 6 is a sectional view taken along the line 6—6 of Fig. 5.

Fig. 7 is a sectional view taken along the line 7—7 of Fig. 5.

Fig. 8 is a sectional view taken along the line 8—8 of Fig. 5.

Fig. 9 is a block outline of how Figs. 10a through 10h should be assembled.

Figs. 10a, 10b, 10c, 10d, 10e, 10f, 10g, and 10h, when assembled according to the block outline of Fig. 9, disclose a wiring diagram for the switchboard.

Figure 11A:
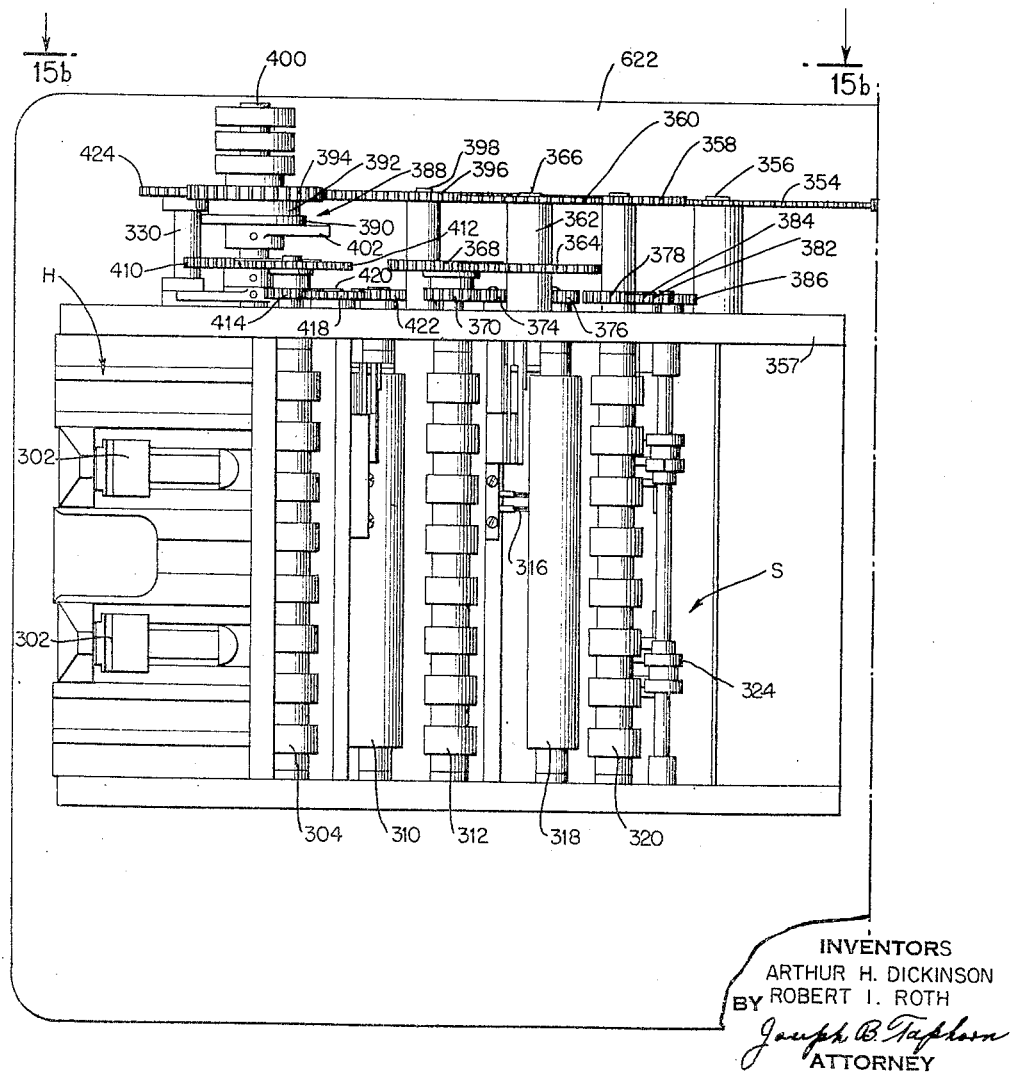
Figure 11C:
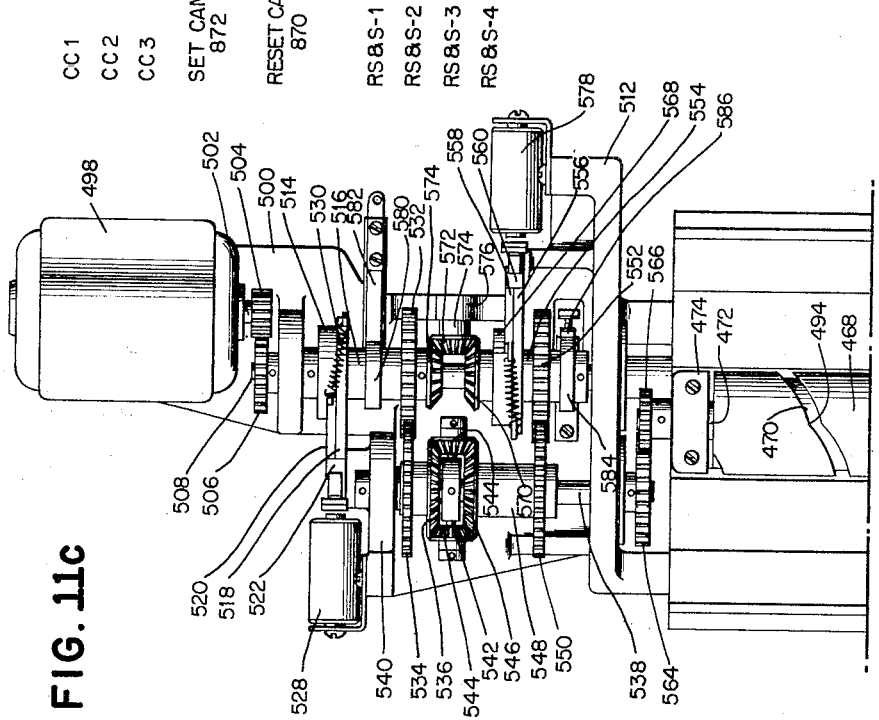
Figure 11D:
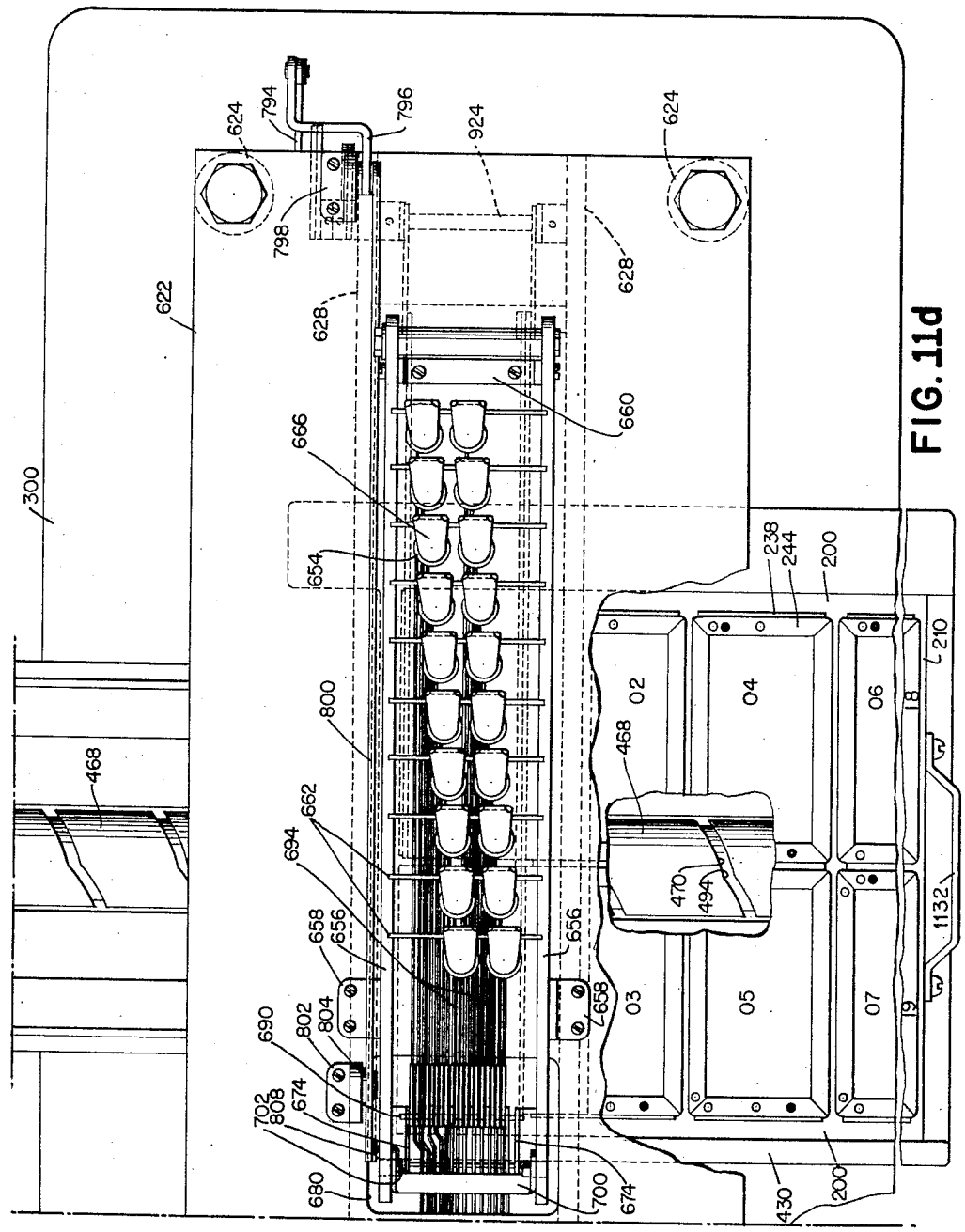

Figs. 11a, 11b, 11c, and 11d disclose, when assembled with the Figs. 11a, 11b, and 11d arranged horizontally in the order named and Fig. 11c arranged above 11d, a plan view of the switchboard adjusting machine.

Figs. 12a, 12b, 12c, and 12d disclose, when assembled horizontally in the order named, a side view of the switchboard adjusting machine shown in Figs. 11a to 11d.

Figure 12A:
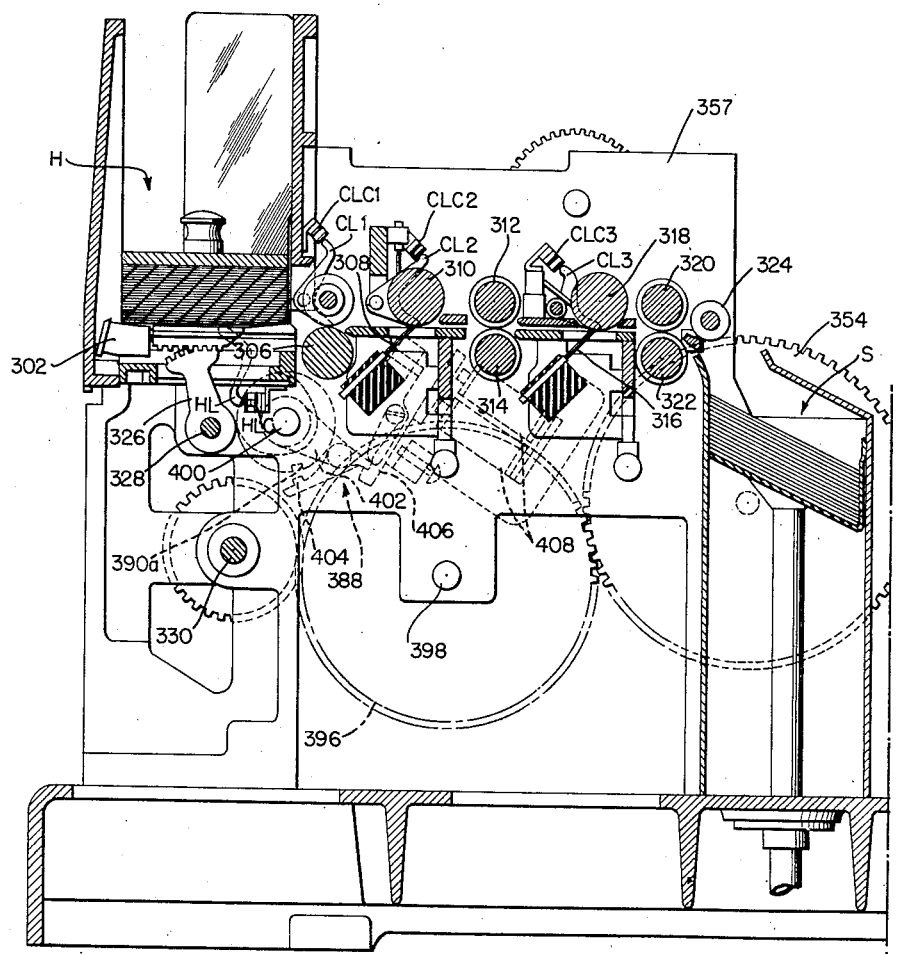
Figure 12C:
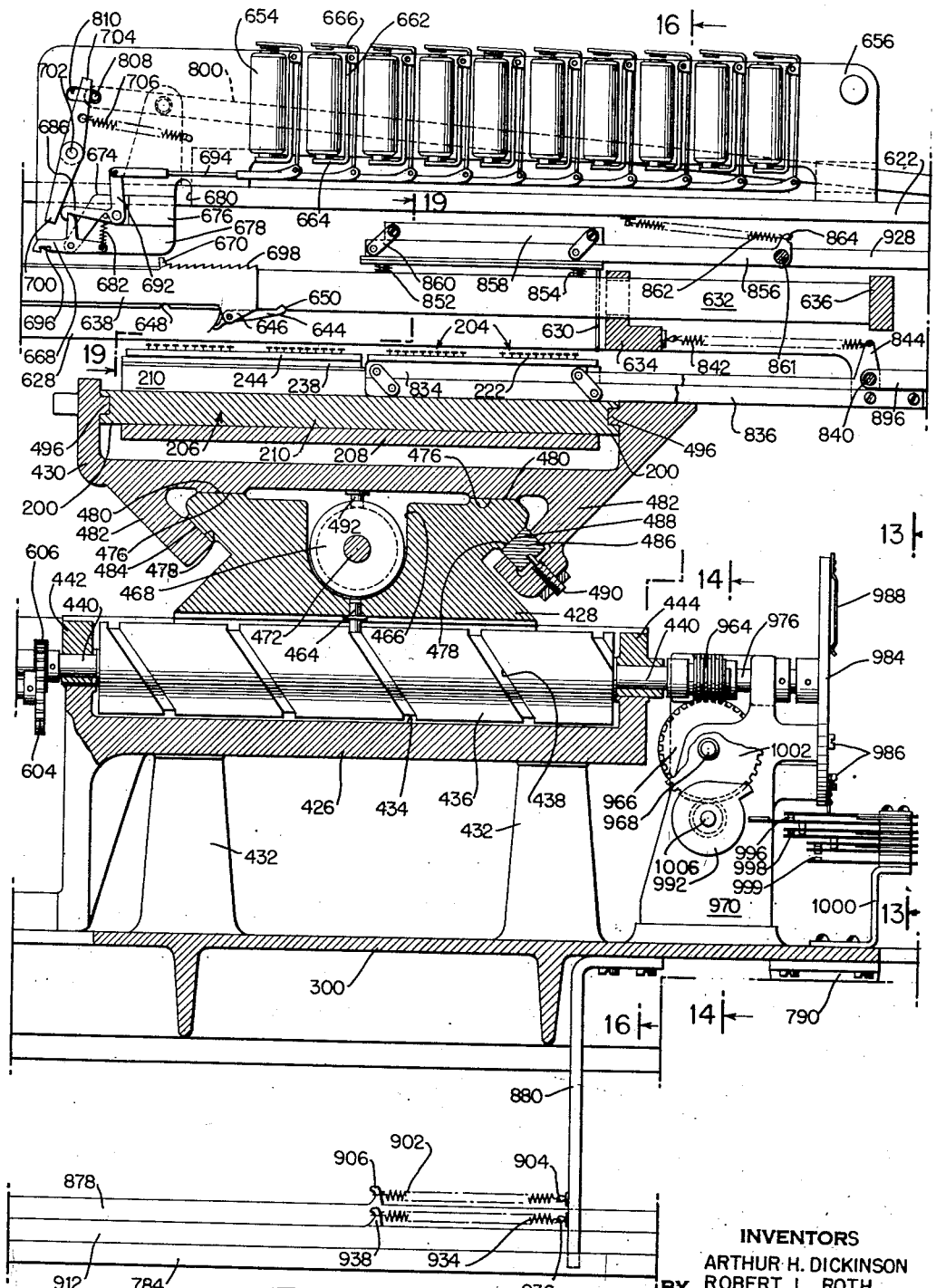

Fig. 13 is a view taken along the section line 13—13 of Fig. 12c.

Fig. 14 is a view taken along the section line 14—14 of Fig. 12c.

Figure 15A:
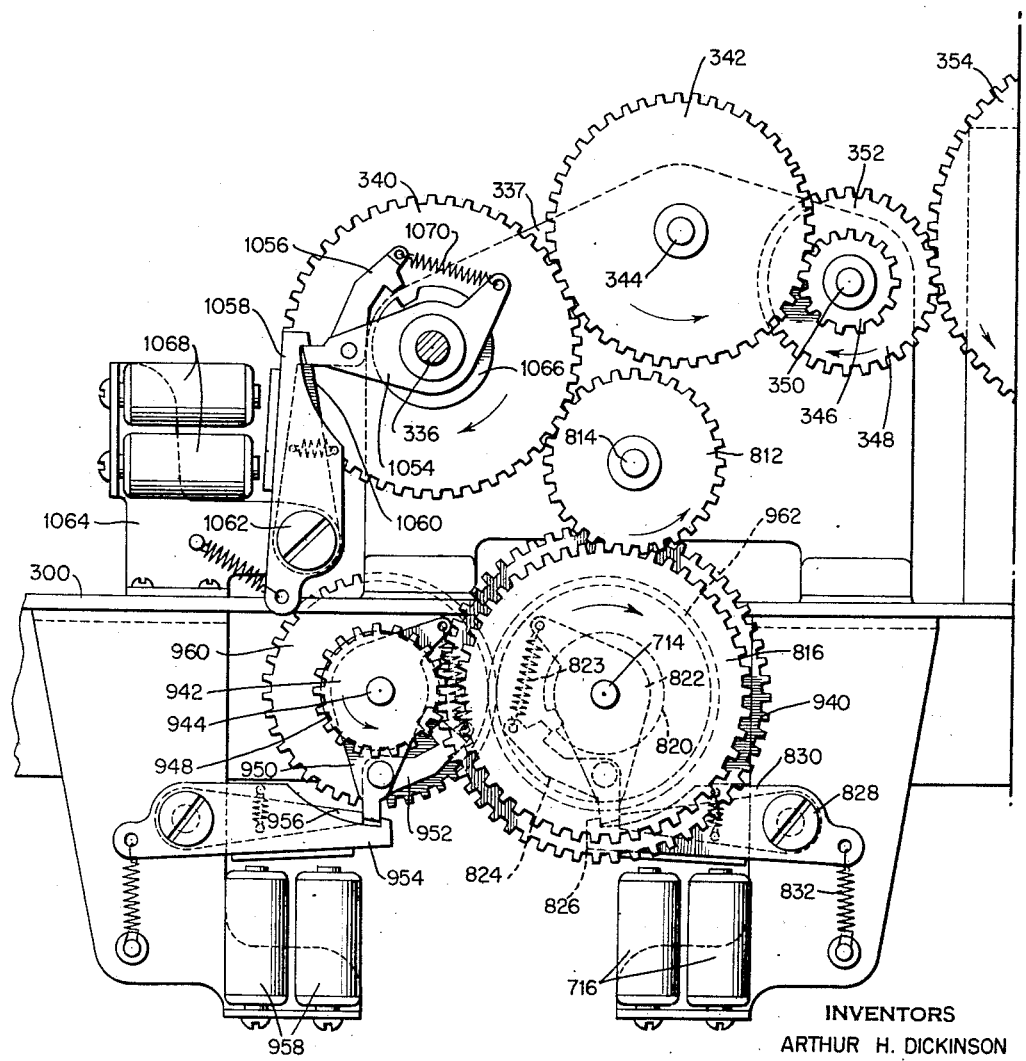
Figure 15B:
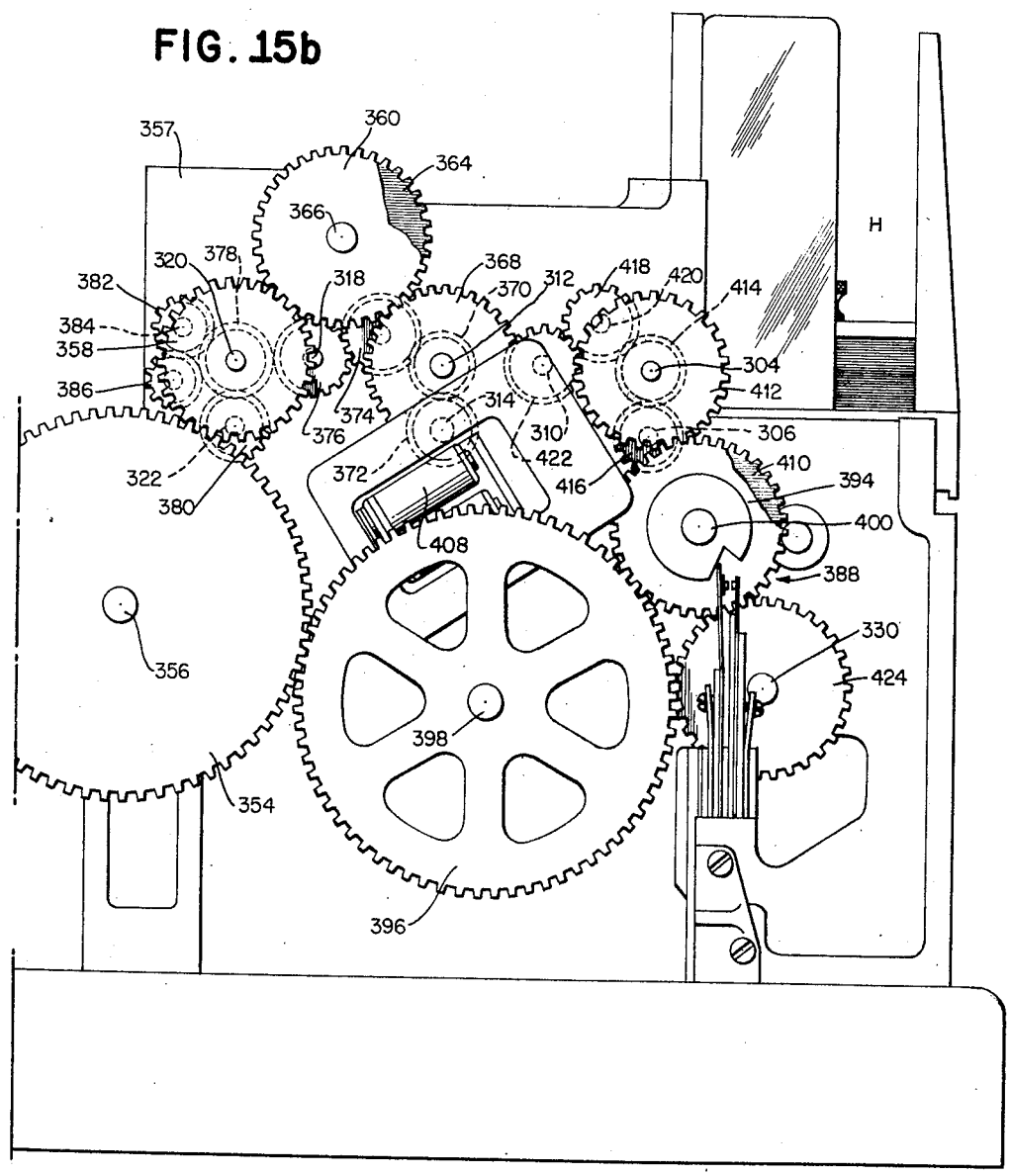

Figs. 15a and 15b disclose, when assembled horizontally in the order named, a view taken along the line 15—15 of Figs. 11a and 11b.

Figure 16A:
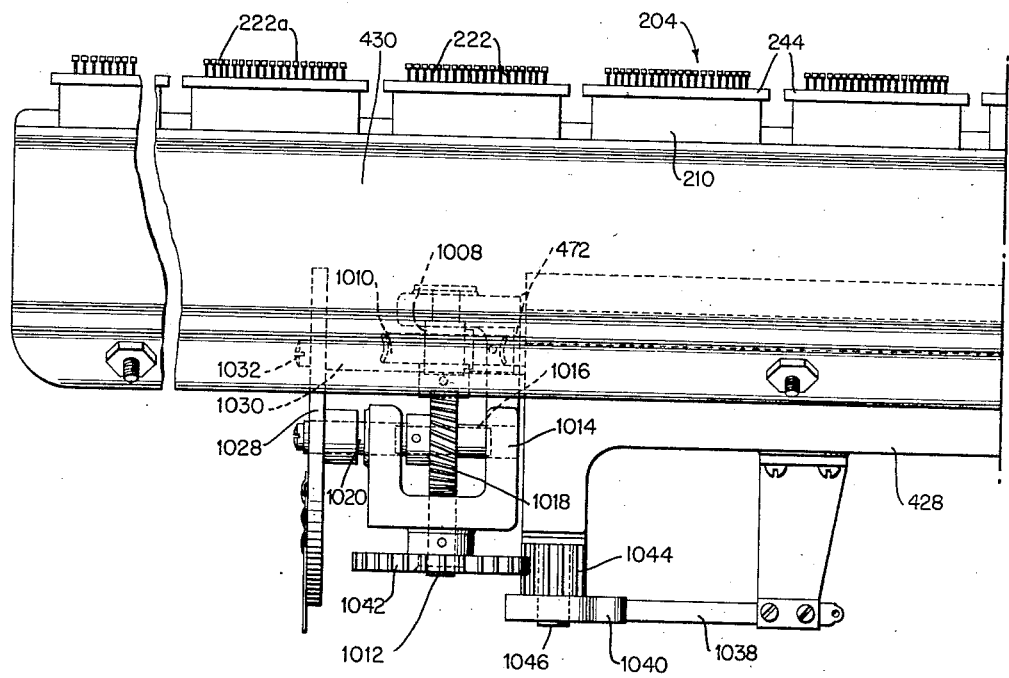
Figure 16B:
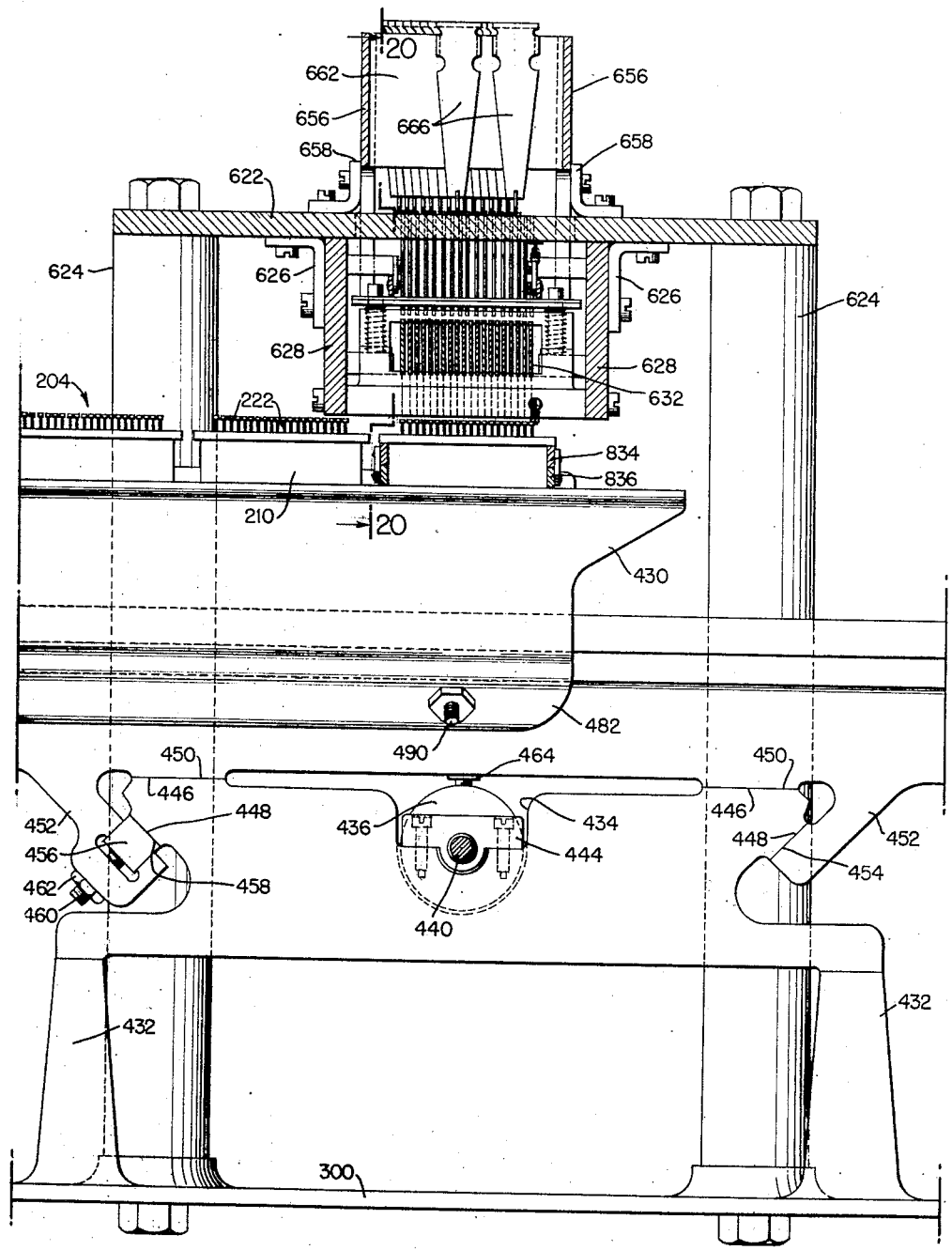
Figure 16C:
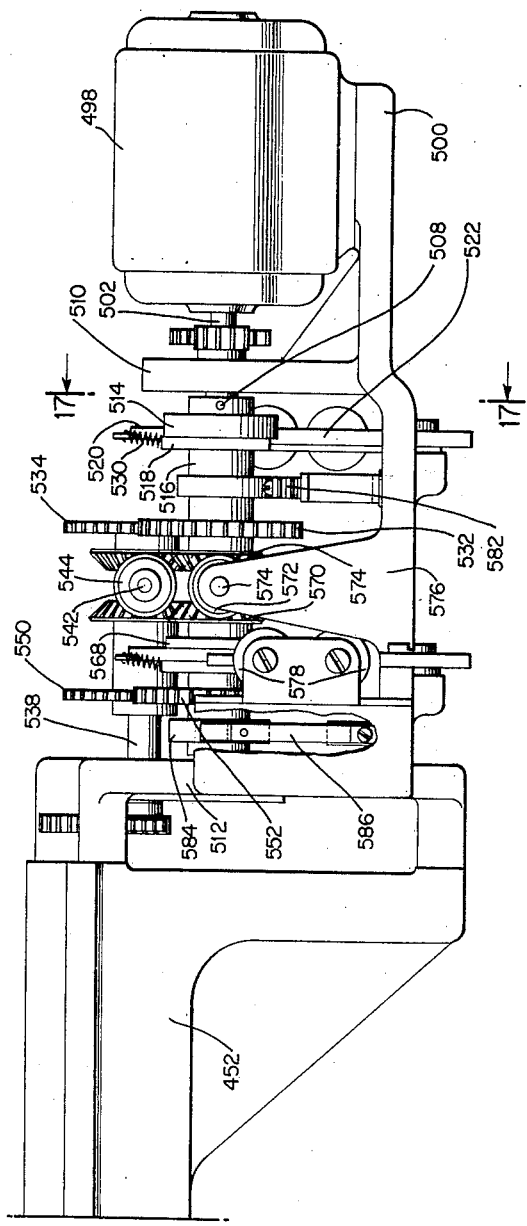

Figs. 16a, 16b and 16c disclose, when assembled horizontally in the order named, a view taken along the line 16—16 of Fig. 12c.

Figure 17:
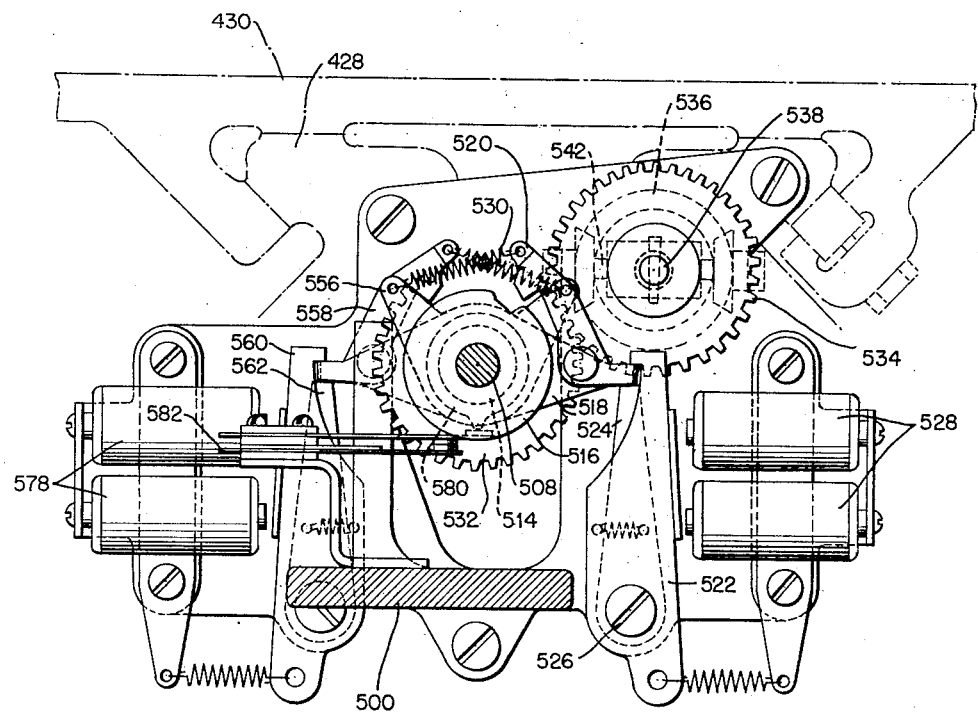

Fig. 17 is a view taken along the section line 17—17 of Fig. 16c.

Figure 18:
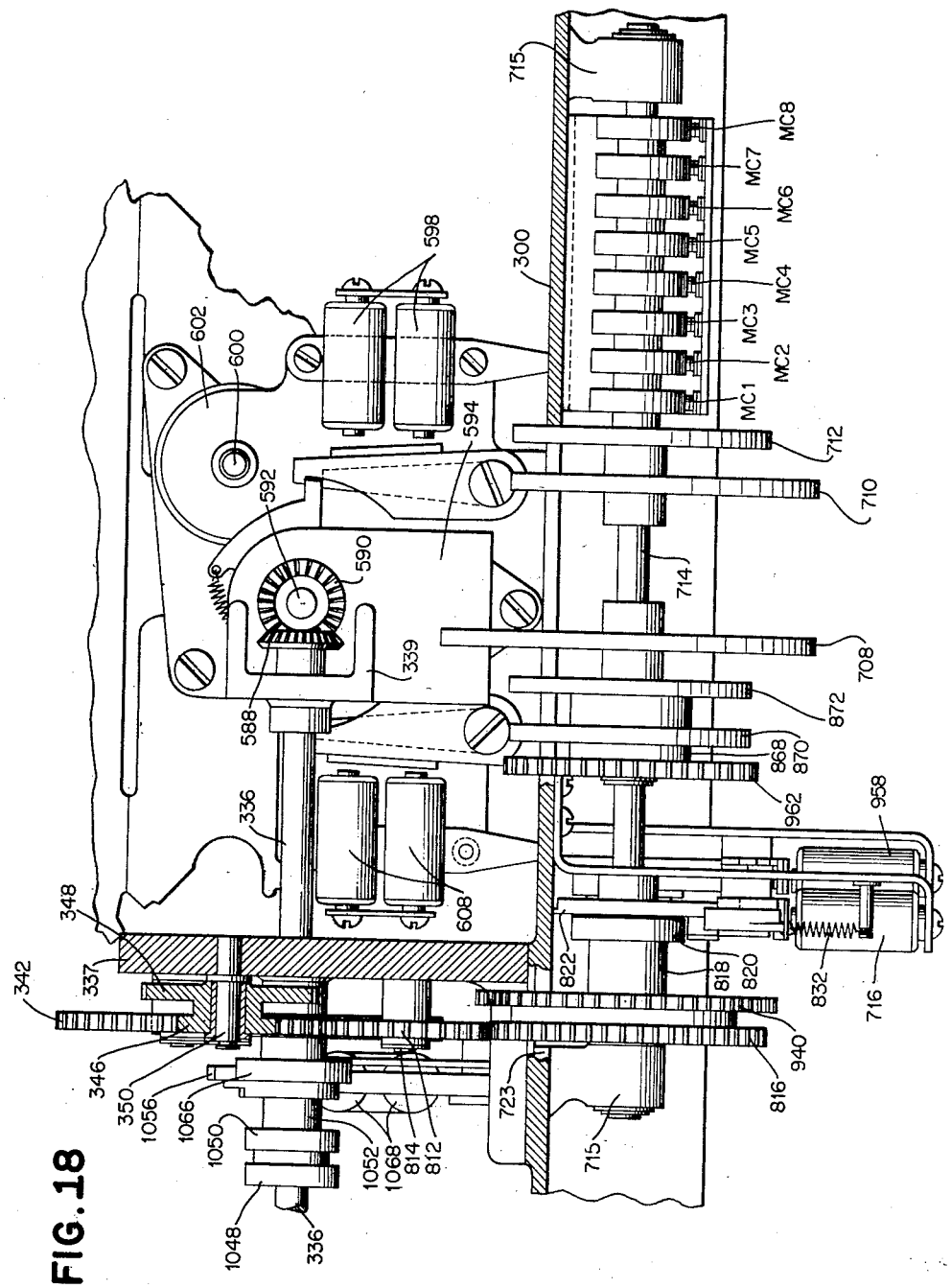

Fig. 18 is a view taken along the section line 18—18 of Fig. 12b.

Figure 19:
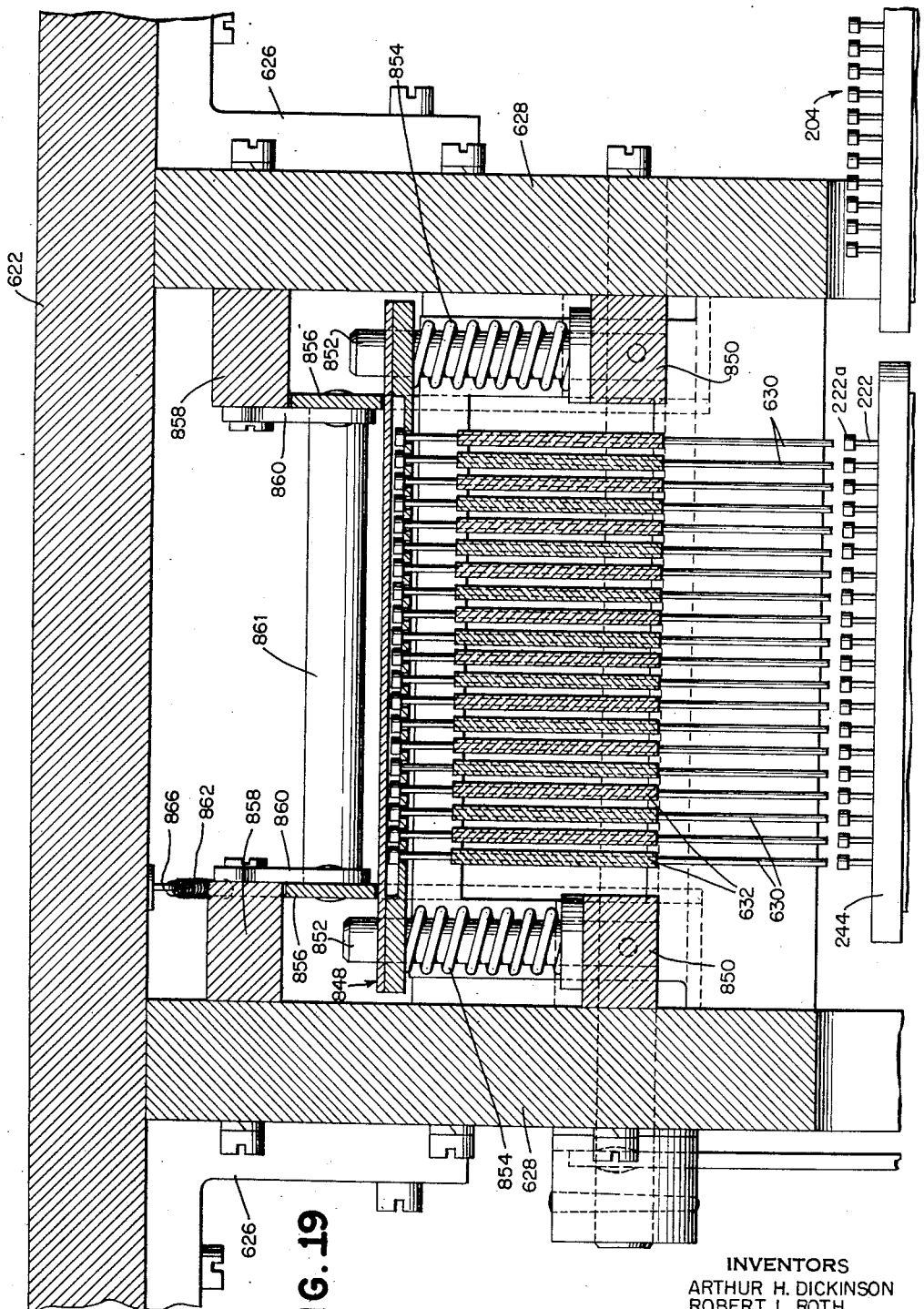

Fig. 19 is a view taken along the line 19—19 of Fig. 12c.

Figure 20B:
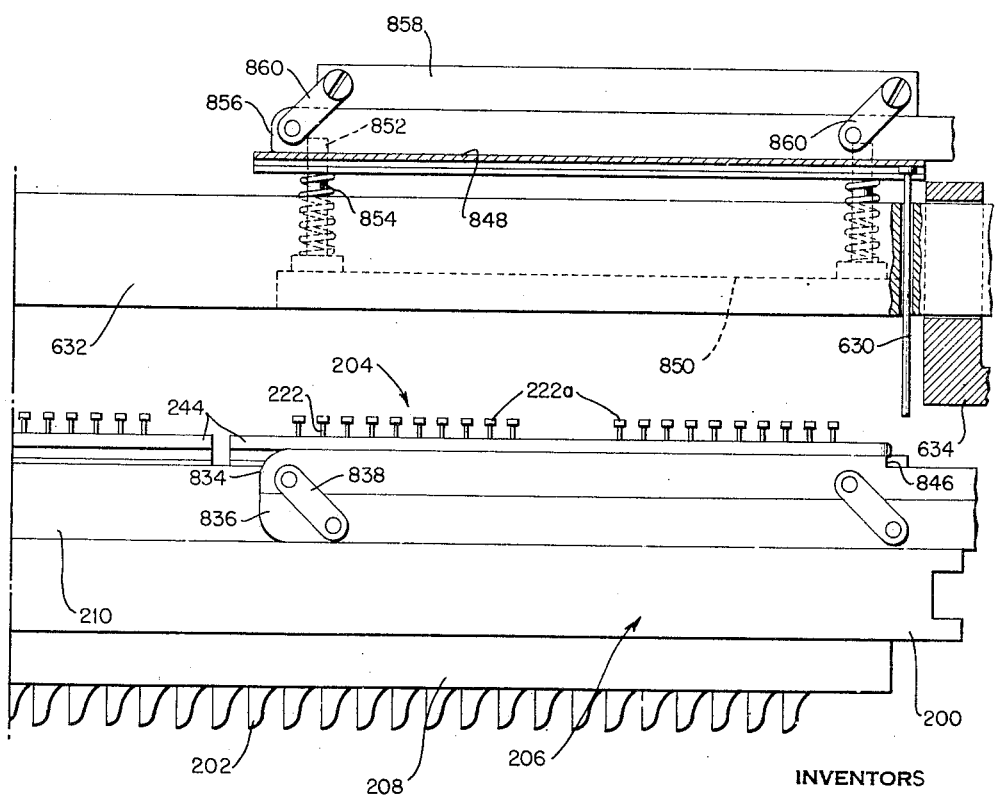

Figs. 20a and 20b disclose, when assembled horizontally in the order named, a fragmentary sectional view taken along the line 20—20 of Fig. 14b.

Figure 21A:
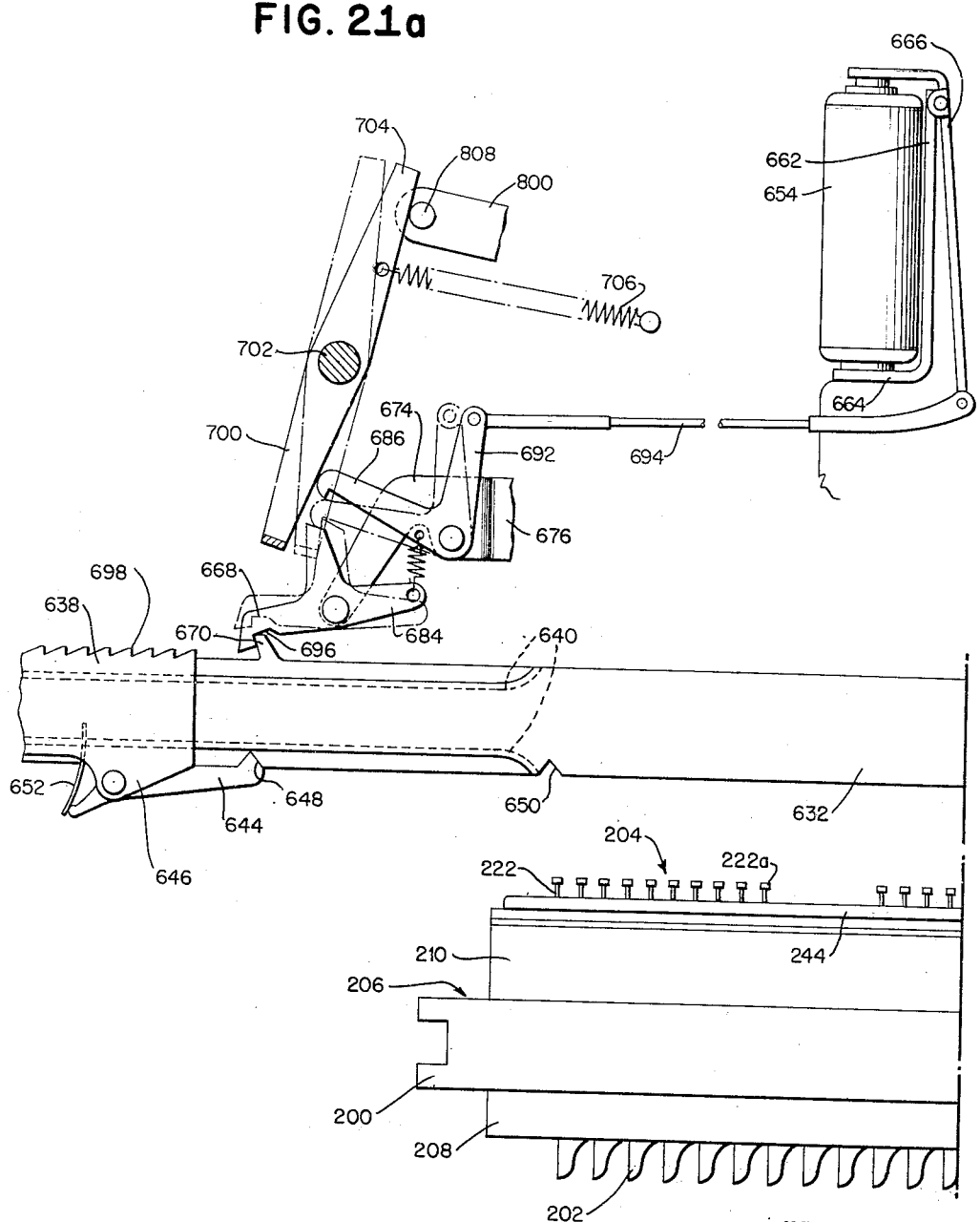
Figure 21B:
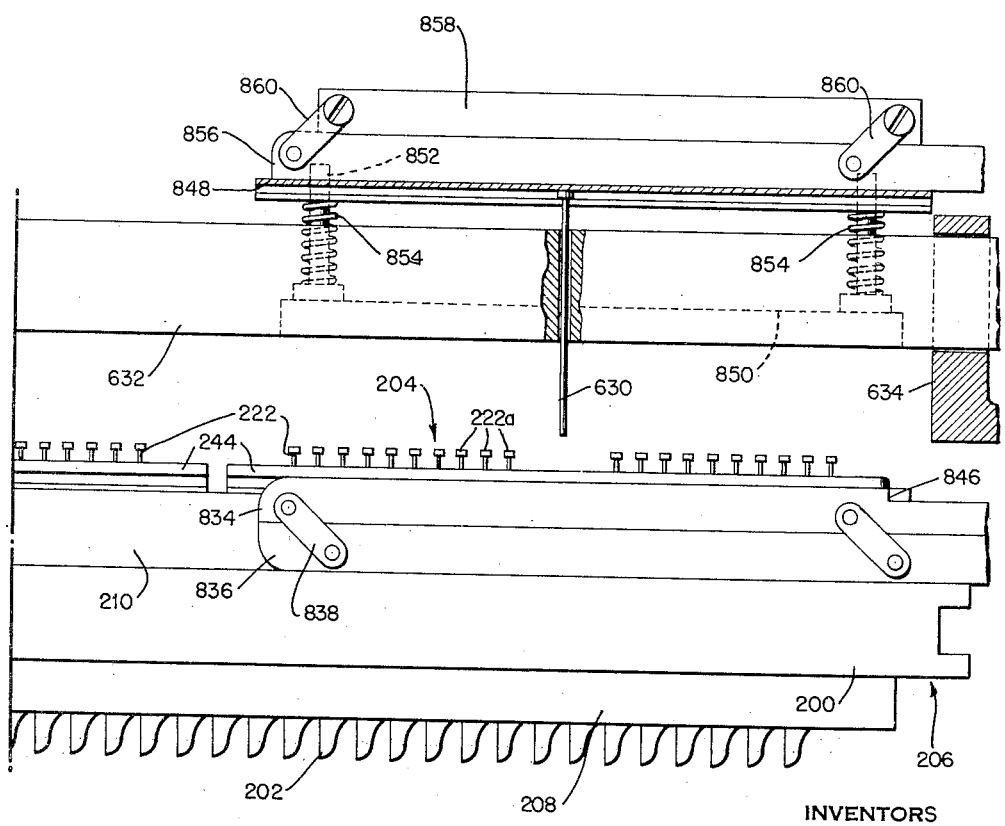

Figs. 21a and 21b disclose, when assembled horizontally in the order named, another condition of the apparatus shown in Figs. 20a and 20b.

Figure 22A:
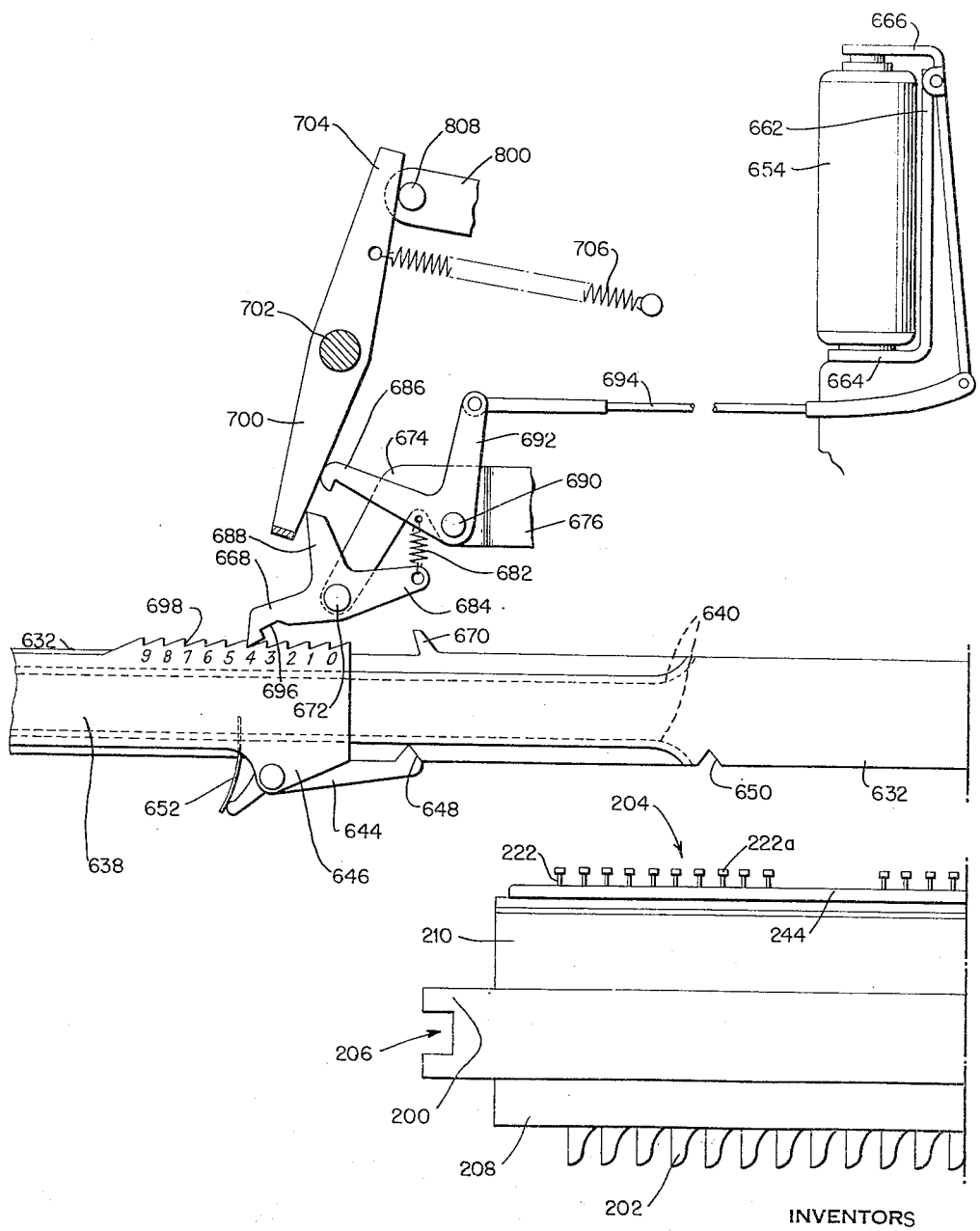
Figure 22B:
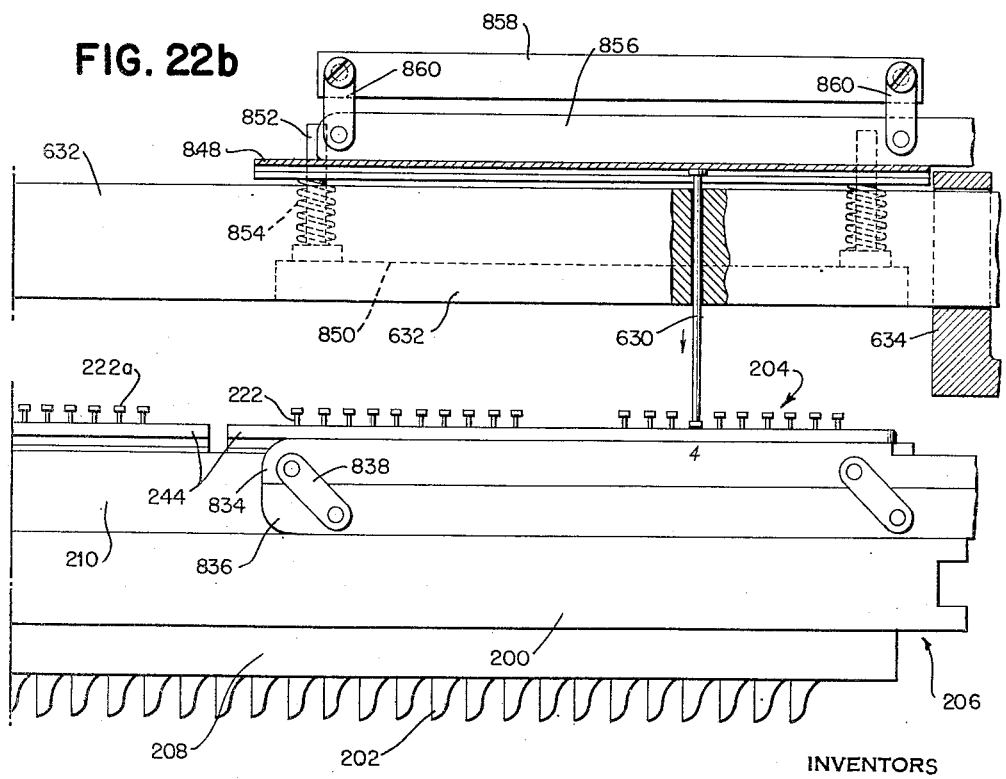

Figs. 22a and 22b disclose, when assembled horizontally in the order named, still another condition of the apparatus shown in Figs. 20a and 20b and Figs. 21a and 21b.

Figure 23:
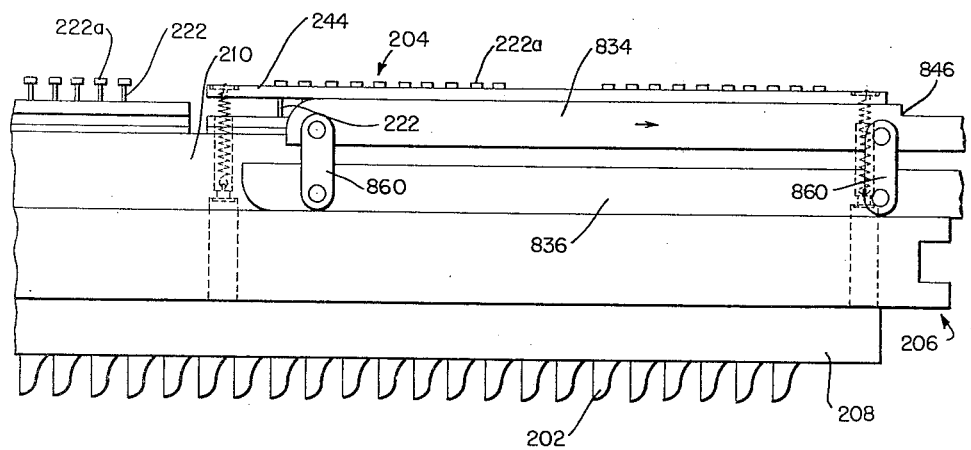

Fig. 23 is an enlarged view showing, in an operated condition, a portion of the apparatus disclosed in each of Figs. 20b, 21b, and 22b.

Figure 24:
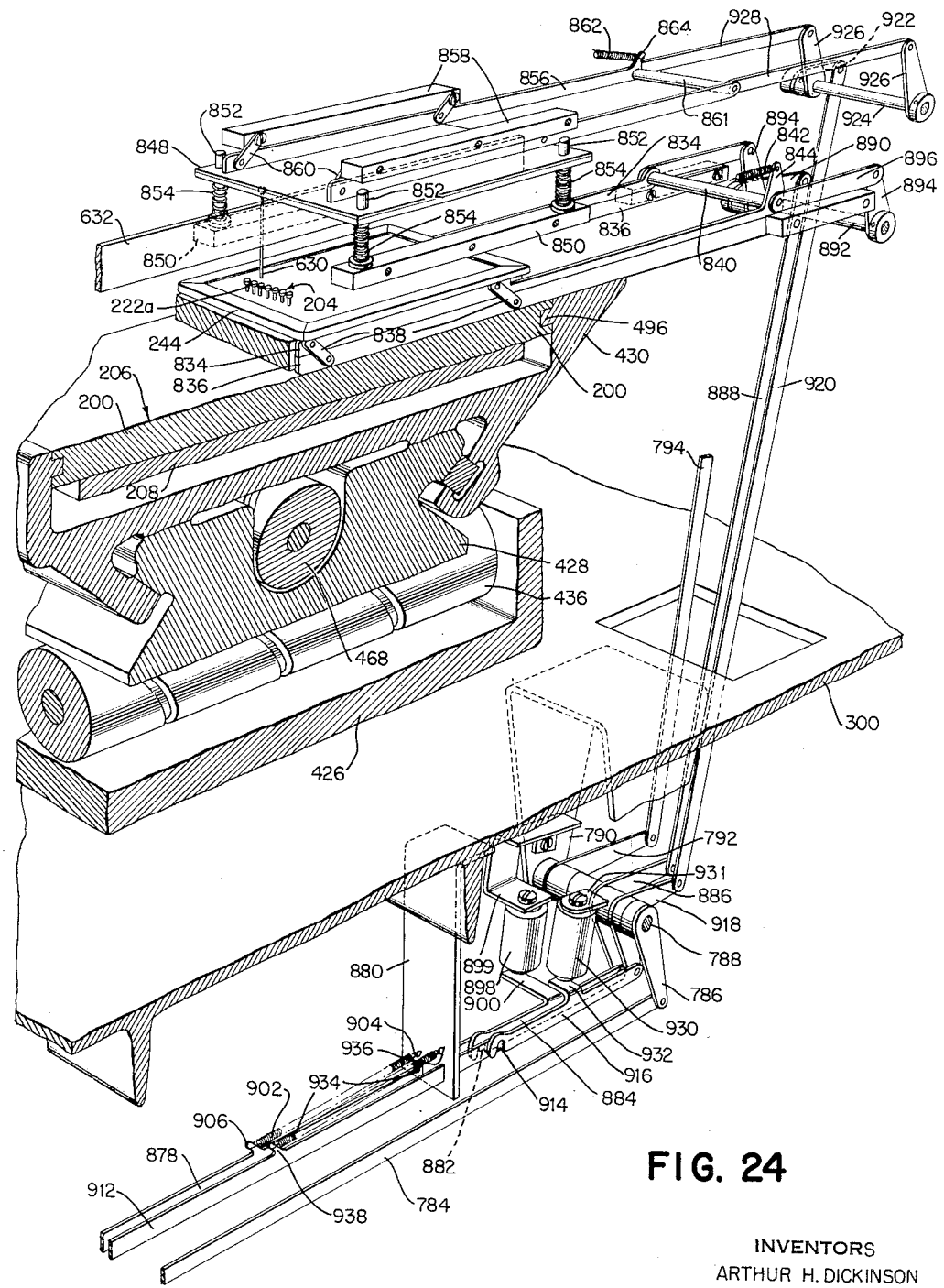

Fig. 24 is a view in perspective showing the operating linkages for some of the apparatus disclosed in Figs. 20, 21 and 22 and their relationship to other parts of the machine.

Figure 25:
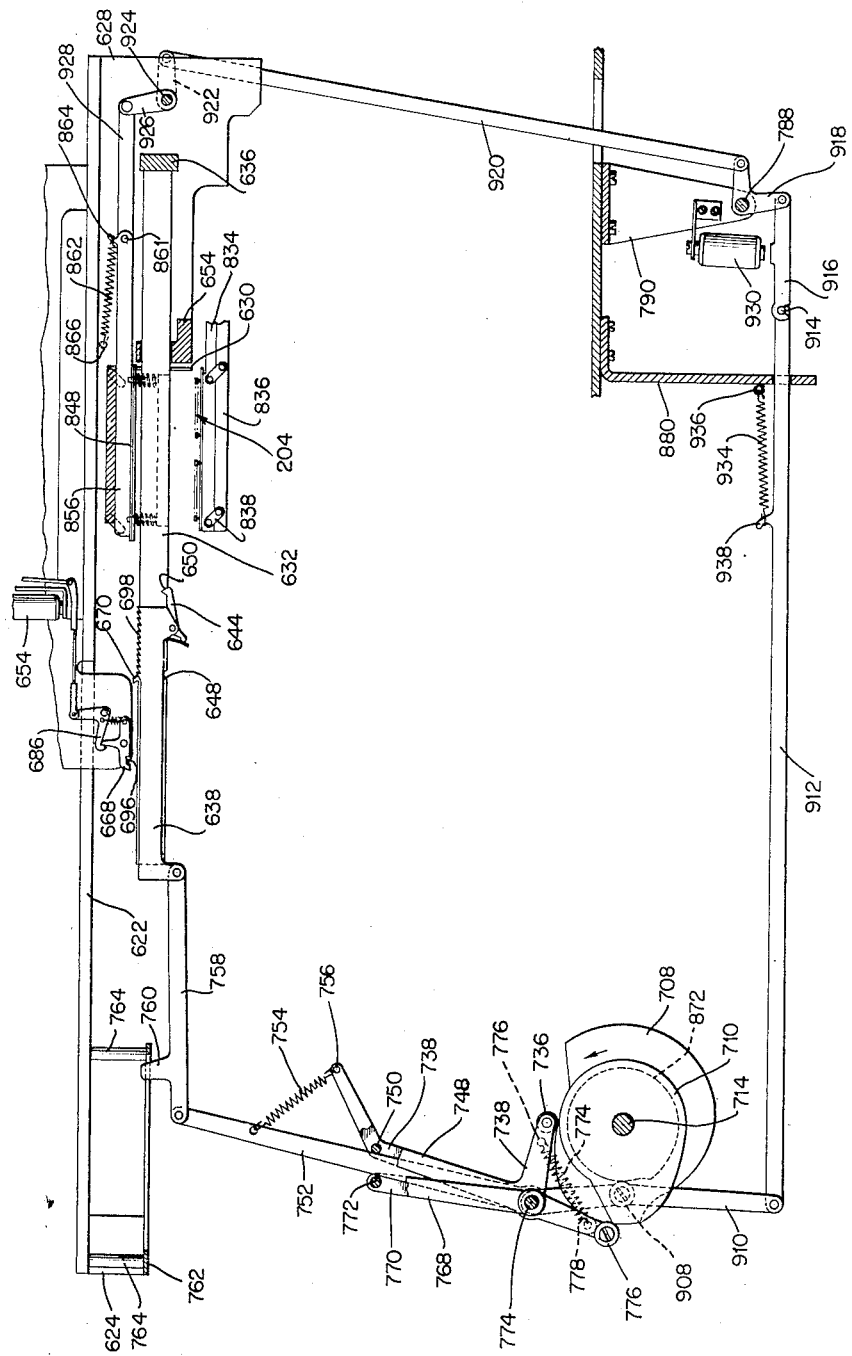

Fig. 25 is a view showing separately certain operating linkages disclosed in Fig. 12.

Figure 26:
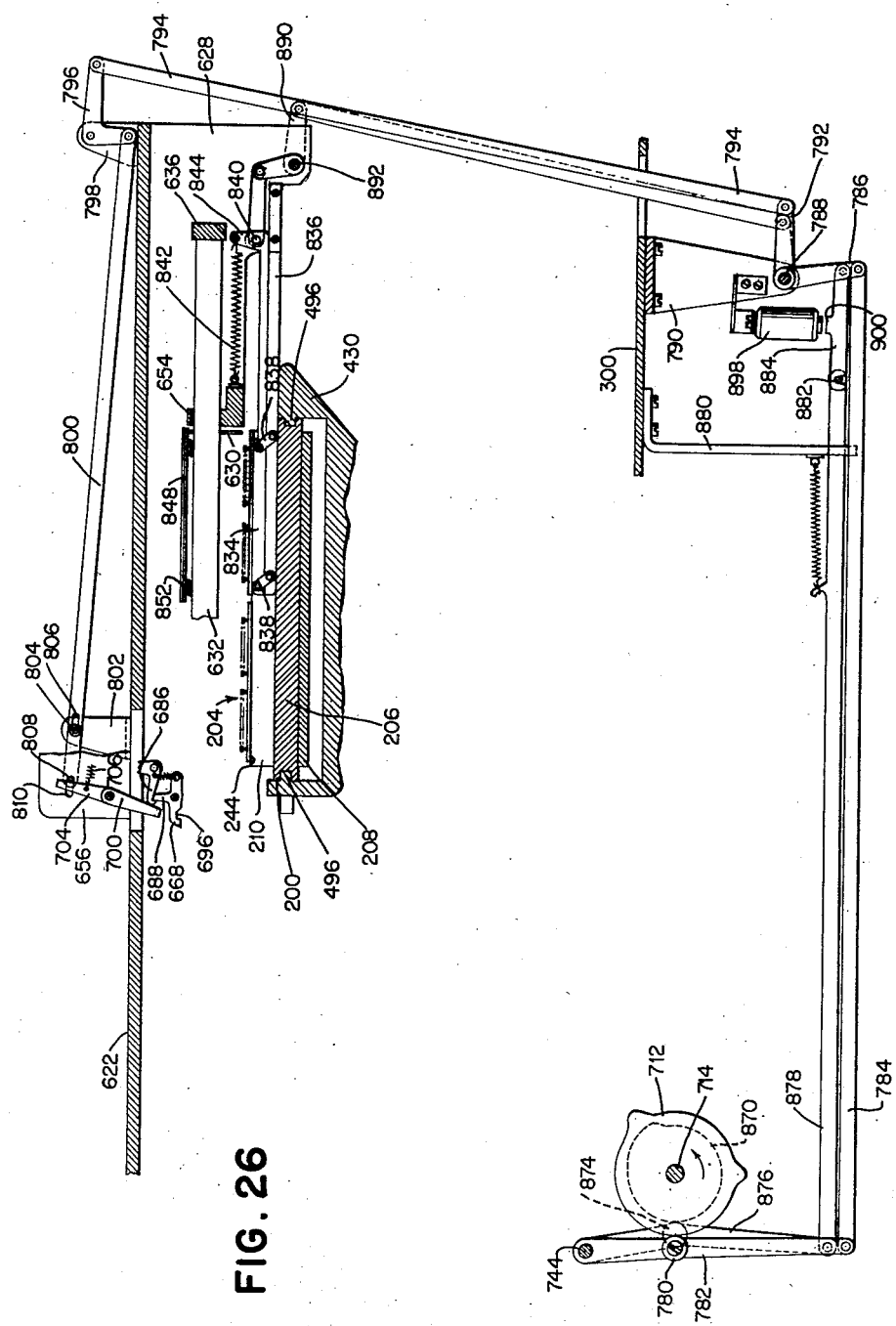

Fig. 26 is a view showing separately other operating linkages disclosed in Fig. 12.

Figure 27:
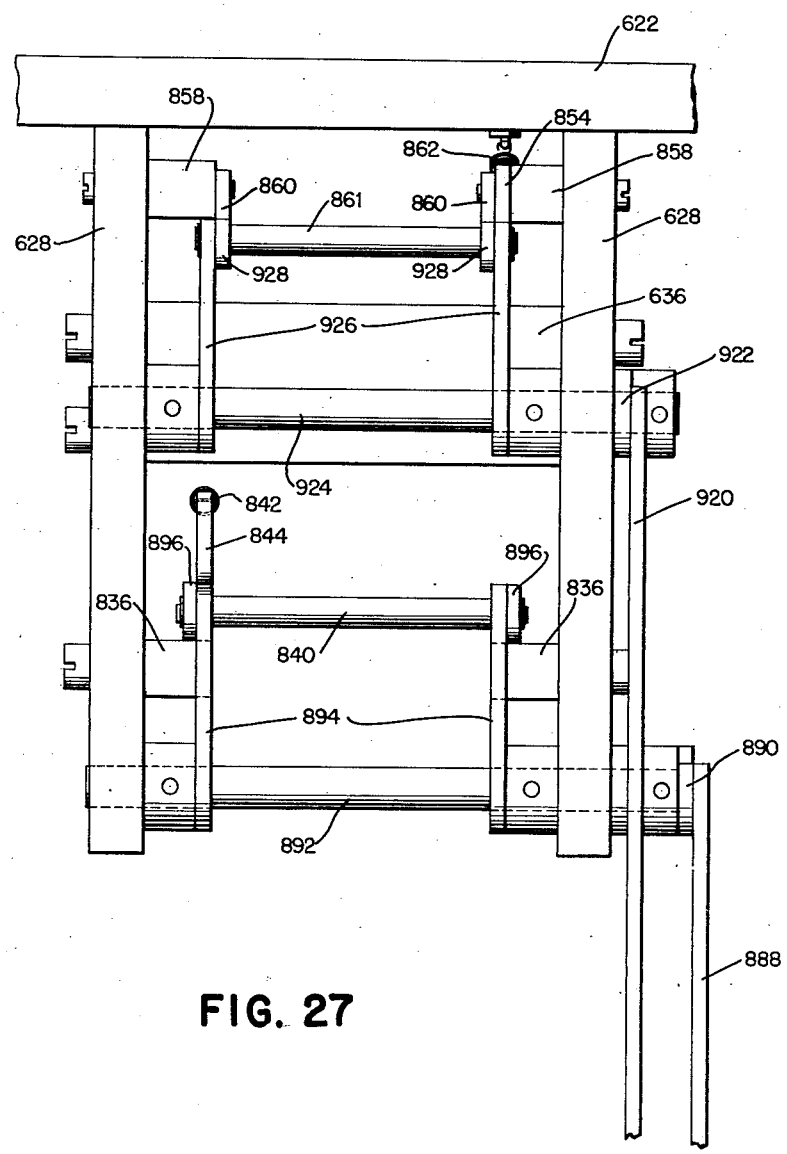

Fig. 27 is a view taken along the line 27—27 of Fig. 12d.

Figs. 28a, 28b, 28c, 28d, and 28e disclose, when assembled vertically one beneath the other in order named, a wiring diagram of the switchboard adjusting machine.

Figure 29:
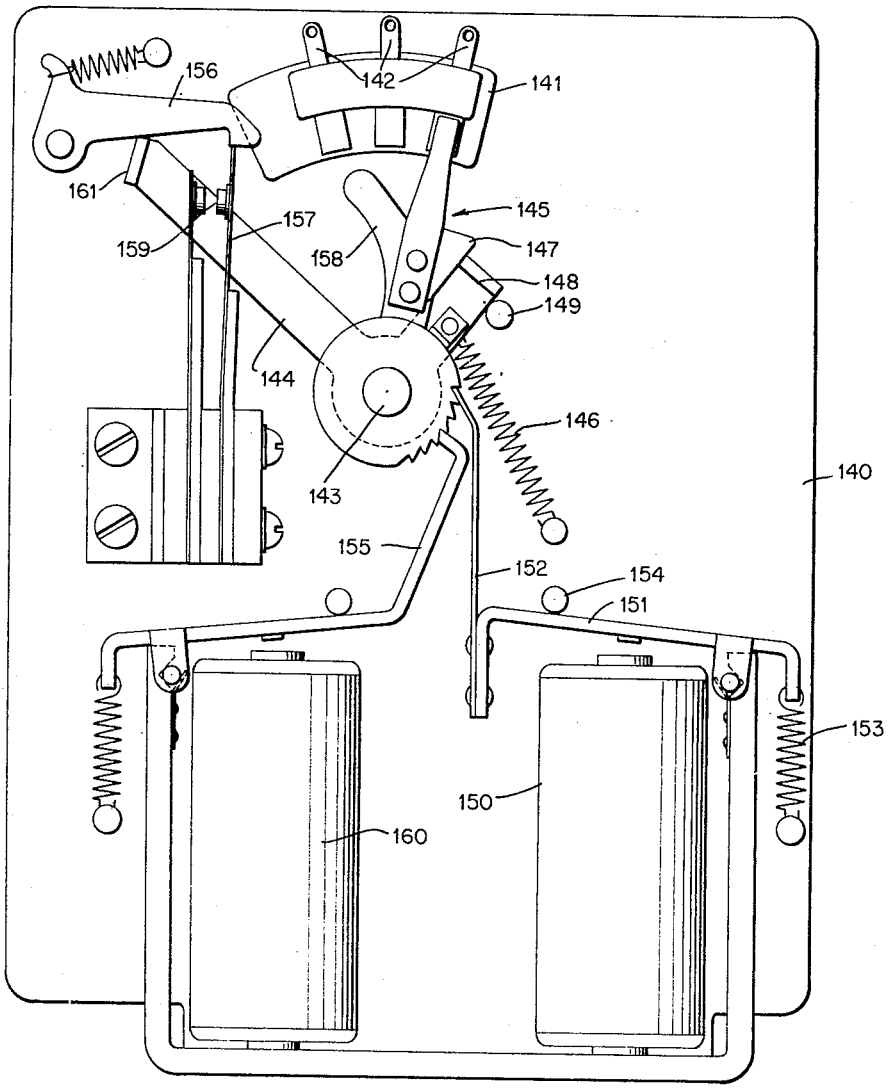

Fig. 29 is a diagrammatic view of a stepping switch employed in the machine.

Figure 30:
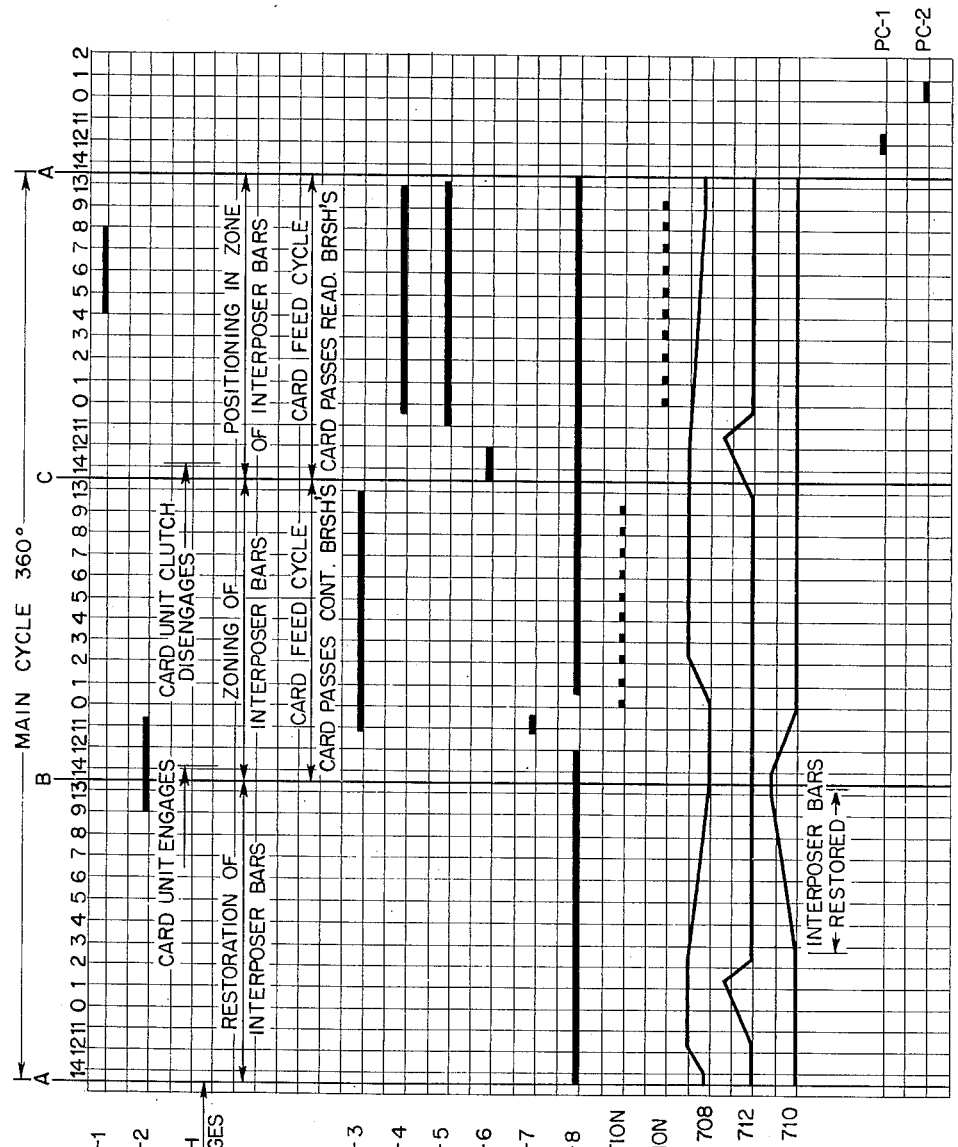

Fig. 30 is a timing chart of the operation of one portion of the machine.

Figure 31:
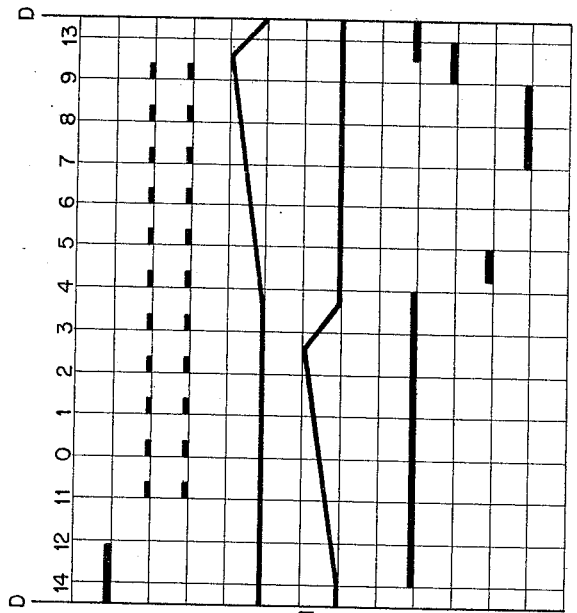

Fig. 31 is a timing chart of the operation of another portion of the machine.

Figure 32:
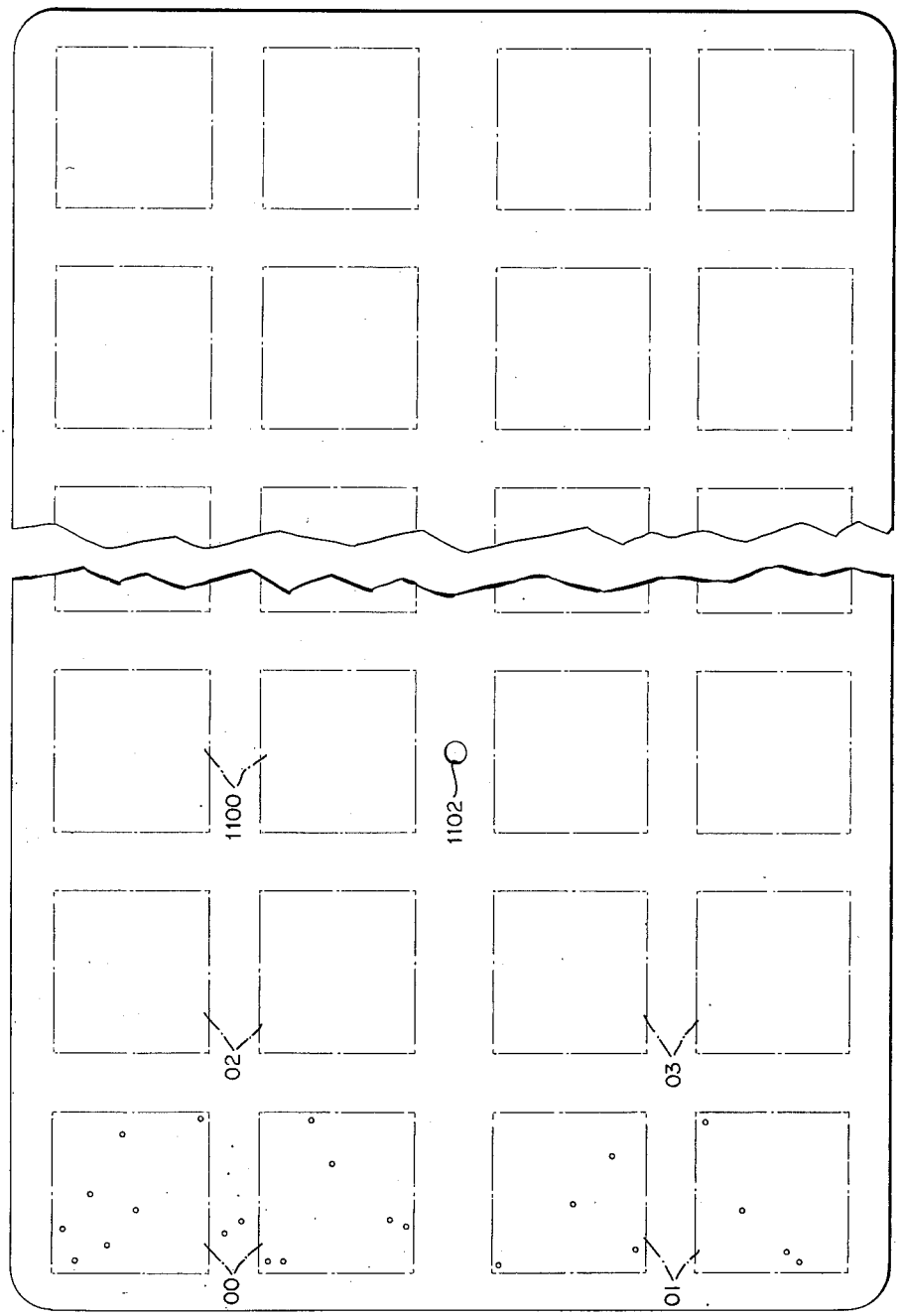

Fig. 32 is a plan view of a template which has been perforated according to the invention.

Fig. 33 is a plan view of a "dummy" switchboard constructed according to the invention.

Fig. 34 is a side view, partially in section, taken along the line 34—34 of Fig. 33.

Fig. 35 is an end view, partially in section, taken along the line 35—35 of Fig. 33.

Fig. 36 is a plan view of a template adapter constructed according to the invention and mounted on a switchboard.

Fig. 37 is a side view, partially in section, taken along the line 37—37 of Fig. 36.

Fig. 38 is an end view, partially in section, taken along the line 38—38 of Fig. 36.

Fig. 39 is a sectional view taken along the line 39—39 of Fig. 36.

As a convenience in understanding the invention described herein and the description of its operation with respect to the wiring diagrams, certain convenient ways have been followed in respect to the designations of the various controlling instrumentalities of the machine such as magnets, contacts, and other parts of the electrical circuits. So far as possible the various electrical elements and certain other parts of the machine have been designated with letters which have been derived from the initials of the words comprising the name of the parts. For example, the hopper in which the record cards are placed has been designated H. Relays generally have been designated with the capital letter R followed by a numeral or set of numerals and the contacts of these relays have been designated with the number of the relay followed by the lower case letters a, b, c, etc. For example, R41 designates a relay and the R41a, R41b, etc., designates its contacts. The exceptions occur when a series of relays are related to a particular function and in these the letter designation has been made indicative of the function. For example, the BF relays are associated with the backward and forward movement of the switchboard cradle of the machine. In order to avoid a maze of wires in the wiring diagram, the contact points of the relays in most cases are shown separated from each other, and where the contacts appear alone, the corresponding coil has been shown in dotted lines. In the present case, a number of relays are provided with two coils which are designated with the capital letters P and H after the number of the relay which signify the initially energized coil, often called a pick-up coil, and the holding coil, respectively. For example, U2P designates the coil which is first energized, that is, picked up, in consequence of a pulse of current from a source, while the U2H designates the coil which is subsequently energized to maintain the relay in an energized condition. The controlling magnets, contacts, leads, line, and bus wires, and other parts are designated according to the plan mentioned above. Thus, HLC designates hopper lever contacts, and CC1 continually operating cam contacts. This terminology will make the wiring diagram as nearly self-explanatory as possible and will facilitate the tracing of circuit with reference to the wiring diagrams.

*Switchboard*

The improved connection board or switchboard herein disclosed (Figs. 1 to 6) has been adapted for use in the control panel mounting arrangement such as that disclosed in the Lake Patent No. 2,111,118. It employs the same type of mounting device and to this end it is provided on opposite edges with longitudinally grooved extensions 200 whereby it may be slidably mounted in the hinged frame 6 of the Lake patent. It is provided on one side with contact terminals 202 which are similar to the contact terminals 5 of the Lake patent to enable the ready making and breaking of contacts with contact members such as the contact members 2 of the Lake patent which may be connected by leads to the various accounting elements of a tabulating machine.

On the other side of the connection board are located the switches 204 by which various terminals are electrically interconnected. For convenience in locating the identifying of the various switches and otherwise effecting the adjustment thereof, the board has been divided into sections each of which comprises a number of switches. While the number of such sections and the number of switches in each section may vary according to the particular requirements of the apparatus in which it is to be employed, a connection board having twenty sections each with four hundred switches has been shown in the drawings to disclose the principles of the present invention. The sections have been arranged in rows of two, and as may be best seen in Fig. 1, have been numbered 00 to 19 inclusive. The first position has been chosen as that in the upper right hand corner and is numbered 00. The number of the other or lefthand section in the upper row is 01 and is considered to be the second section. The third section is the right hand section in the second row from the top and is numbered 02. This system of numbering is continued, with 09 being the tenth position, 10 the eleventh position, and 19 the twentieth position.

Each section has been divided into two zones, a left hand or 0 zone and a right hand or 1 zone. In each zone the switches are arranged in twenty columns of ten switches each. Thus, there are two hundred switches in each zone making for a total of four hundred switches in each section.

The connection board or switchboard consists of a generally hollow main body 206 and a plate 208 which is attached to the bottom of the main body and closes off the interior thereof. The plate mounts the terminals 202 which extend through it and into the interior of the generally hollow main body distances sufficient to enable the attachment of wires to them. The plate is made of a material such as Bakelite to insulate the terminals. It is rigidly secured to the main body in any suitable manner.

The generally hollow main body contains the wiring and mounts the switches. It is formed with a plurality of transverse raised portions 210 equal in number to the rows of section and with a cavity beneath each of the raised portions. These cavities are further separated from each other by depending portions 212 which are formed at an intermediate point with a projection 214 which extends to the bottom of the body member for purposes of reinforcement. The lateral extensions 200 by which the switchboard is mounted in an accounting machine are formed integrally with the main body. The main body is also formed of an insulating material such as Bakelite.

The switches 204 are mounted in the raised portions 210 of the main body 206. Thus one-half of each raised portion is devoted to one section while the other one-half is devoted to another. It will also be evident that the rows of sections are separated from each other by a depression. A thin guide member 216 projects upwardly from the bottom of each depression and from the ends of the board.

The switches each comprise a pair of spaced contact elements 218 and 220 and a slidable connector 222 for electrically interconnecting the contact elements when it is depressed. They are so mounted in the raised portions that the connectors extend above the surface thereof while the contact elements extend beneath the lower surface thereof into the cavity or chambers therebeneath. To this end a hole 224, roughly rectangular in cross section and moulded with inwardly extending tongues 226 on a pair of opposite sides, is provided for each switch. The holes 224 do not extend all the way through the raised portions. Each hole is connected with the cavity or chamber beneath it, however, by two slots 228 and 230 respectively located at the foot of the opposite sides of the hole upon which the inwardly extending tongues 226 are not mounted.

The switch contact elements 218 and 220 are made of resilient metal. Each is originally formed with a straight portion 218a and 220a and a curved portion 218b and 220b, the straight portion of one of the elements 218a of each pair being longer than that of the other. In assembling the switchboard, the metal contact elements of each pair are placed into a hole so that the straight portions are respectively inserted through the slots until the curved portions thereof engage the bottom of the holes. The curved portions of the members are so formed that when the members are properly placed in the hole, their mid-points rest against the inwardly extending tongues 226 which serve to maintain them out of contact with each other. The straight portions of the contact members extend into the chambers a sufficient distance to enable connections to be made between them and wires such as wires 232 and 234. Of course, the contact member of each pair having the longer straight portion 218a extends into the chamber farther than the other.

It is a feature of this invention that the wires connecting the switches in each section are arranged into two sets of generally parallel wires 232 and 234 which intersect each other and that the crossing wires of each intersection are respectively connected to opposite sides of a corresponding switch. Thus one contact member 218 of each switch will be connected to one of the crossing wires 232 while the other contact member 220 is connected to the other wire 234 crossing at that point. Each contact element is perforated at its lower end, and since the contact members were inserted into the hole slots with their broad surfaces disposed in parallel planes, the lower end of the longer member 218a is twisted approximately 90° after installation to line up a perforation formed in the lower end thereof with a wire 232 disposed transversely to the wire 234 to which the other contact member of that pair is connected through a similar perforation. The straight portion of the contact member was made longer not only to accommodate the twisting but also so as to space the wires extending in one direction from those extending in the other direction. In an arrangement as has been described, it will be evident that a wire may be engaged by the similar contact elements of all switches located over it and that the wires will thus be rigidly and firmly secured in the chambers.

The slidable connector 222 of each switch is moved into and out of the respective switch hole 224 to close and open the switch. The connectors in each section are slidably supported by a friction sheet 236 made of a suitable insulating material such as Vinylite and a guide plate 238 formed of a suitable insulating material such as Bakelite. The Bakelite plate is mounted on top of the Vinylite sheet and each has the same outline as the raised portion upon which they are secured by any suitable means. The sheets 236 and the plates 238 are provided with holes at 240 and 242 which coincide with the holes in the raised portions 210. The connectors are a free fit in the holes 242 in Bakelite plate 238 but are a tight fit in the holes 240 in the Vinylite sheet 236.

When a connector 222 is depressed, it is moved down into the corresponding hole 224 to make contact with the two resilient contact elements 218 and 220 therein. To this end the diameters of the connectors have been made greater than the width of the inwardly extending tongues 226 in each hole. Since the mid-points of the curved portions 218b and 220b of each pair of contact elements rest against these tongues, as may be best seen in Fig. 5, they will contact a connector that is depressed into the hole. In this manner an electrical circuit can be completed between each pair of contact members and hence between each pair of crossing wires 232 and 234.

In order to enable the mass opening of every switch in a section, each section has been provided with a movable reset plate 244. These reset plates normally rest upon the Bakelite guide plates 238 but extend beyond the longitudinal side edges thereof to furnish a means whereby they may be engaged and raised. Each reset plate is also formed of a suitable insulating material such as Bakelite to prevent the connectors from being short-circuited and is provided about its edges with a reinforcing and wear resistant metal frame 246. Each plate is formed with holes 248 which coincide with the switch holes in each section and through which the switch connectors extend. The connectors are loose fits in these holes. To enable the reset plate to raise the connectors, each connector is formed with a head 222a at its upper end of greater diameter than the diameter of the holes 248 in the reset plate. Thus the reset plate, when raised, engages the underside of these heads with its upper surface to move each depressed connector out of engagement with its corresponding pair of contact elements.

The movements of each reset plate upon the switchboard are guided vertically by a pair of bushings 250 diagonally located at opposite ends thereof. The bushings are fastened to the reset plates and extend downwardly through holes 252 and 254 formed in the Vinylite sheet and the connector guide plate. A guide pin 256 is mounted vertically in each set of these holes and is fixed at its lower end in the raised portion 210 of the main body. The bushings slidably embrace these pins.

Each reset plate is yieldably urged downward to its normal position of rest upon the guide plate. A pair of tension springs 258, one of which is centrally located at each end of the reset plates, react between each reset plate and the main body. These springs are mounted in aligned holes 260, 262, 264, and 266 formed in the reset plate, the guide plate, the Vinylite sheet, and the body. A cross pin 268, extending across the top of each hole 260 in the reset plate, supports the upper end of a spring 258. The springs are held in tension at their lower ends by anchor pins 270 on the main body. The anchor pins located adjacent the side edges of the body are recessed in a hole 272 so that the same type of spring may be used as at the inner ends of the sections where the springs extend through the raised portion of the main body only.

It should be remembered that the Vinylite sheet 236 acts as a detent on the connectors 222. The action is such that the connector will be held either in its downward or its upward position due to the tight fit between each connector and the corresponding hole 240 in the vinylite.

*Switchboard wiring diagram*

Fig. 10 is illustrative of how a switchboard constructed according to the instant invention would be wired for use in an accounting machine such as that disclosed in the Lake et al. Patent No. 1,976,617. Sections 01 through 19 of the switchboard have been diagrammatically blocked out and are each shown with twenty horizontal lines and twenty vertical lines representative of the two sets of intersecting wires 232 and 234 interconnected by four hundred switches. By depressing the connectors 222 of the various switches 204 in each section, electrical connections can be made between any vertical line and any horizontal line.

Figure 2:
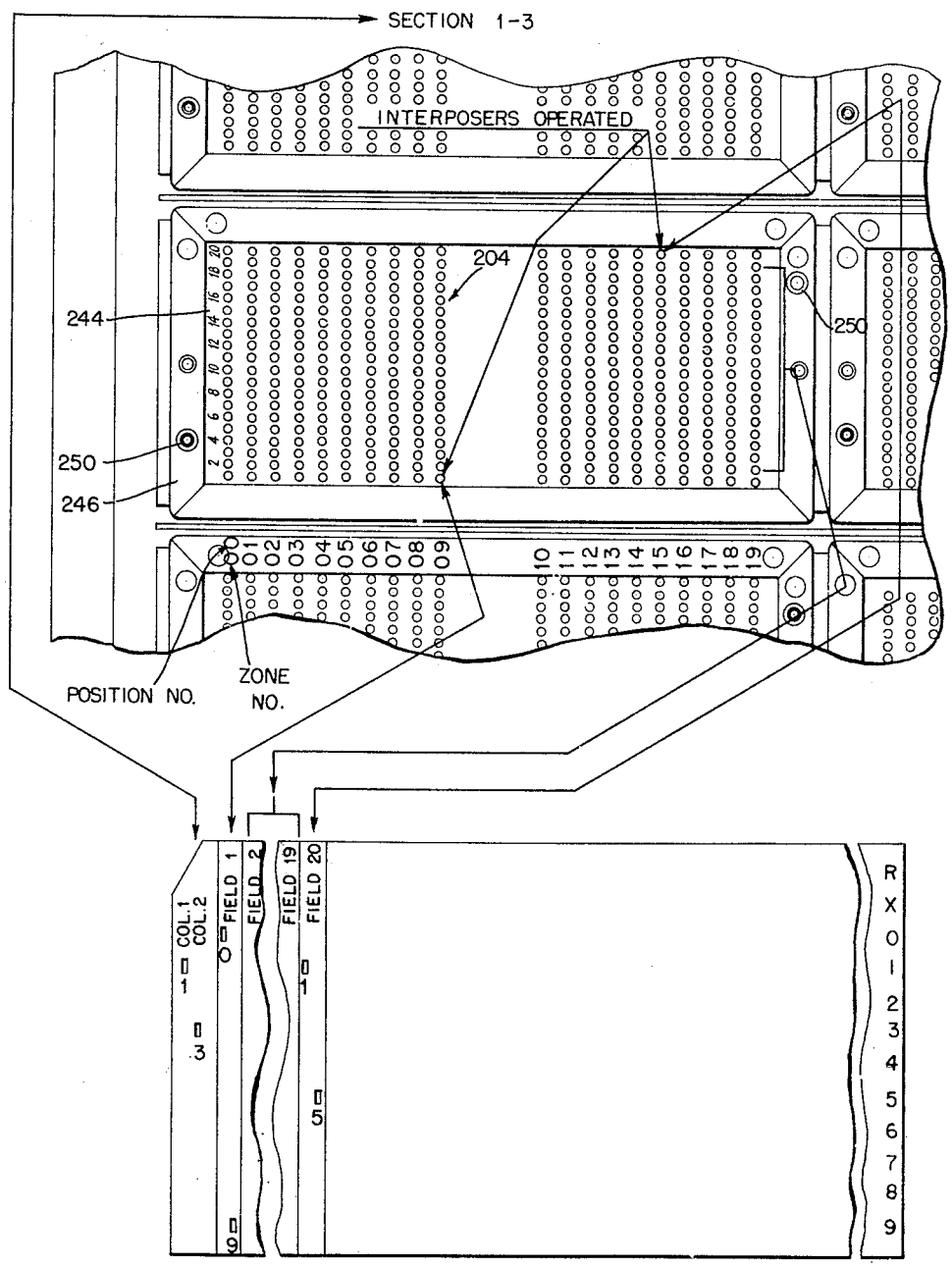
Fig. 2 is a composite view including an enlarged detail view of a portion of the switchboard shown in Fig. 1, a fragmentary view of a perforated record card for the switchboard section shown in the enlarged view, and a diagrammatic illustration of the code employed.
Figure 10C:
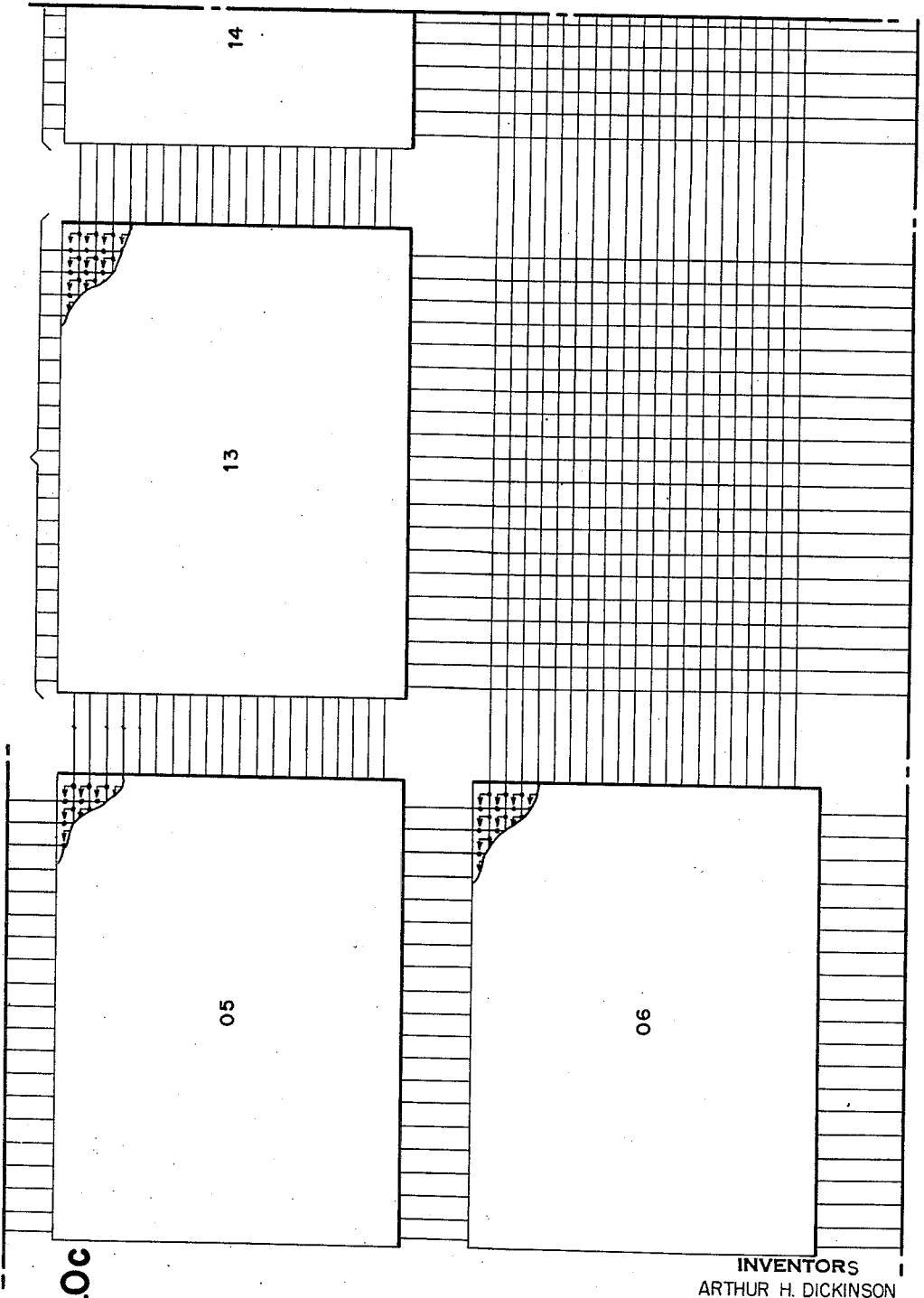
Figure 10D:
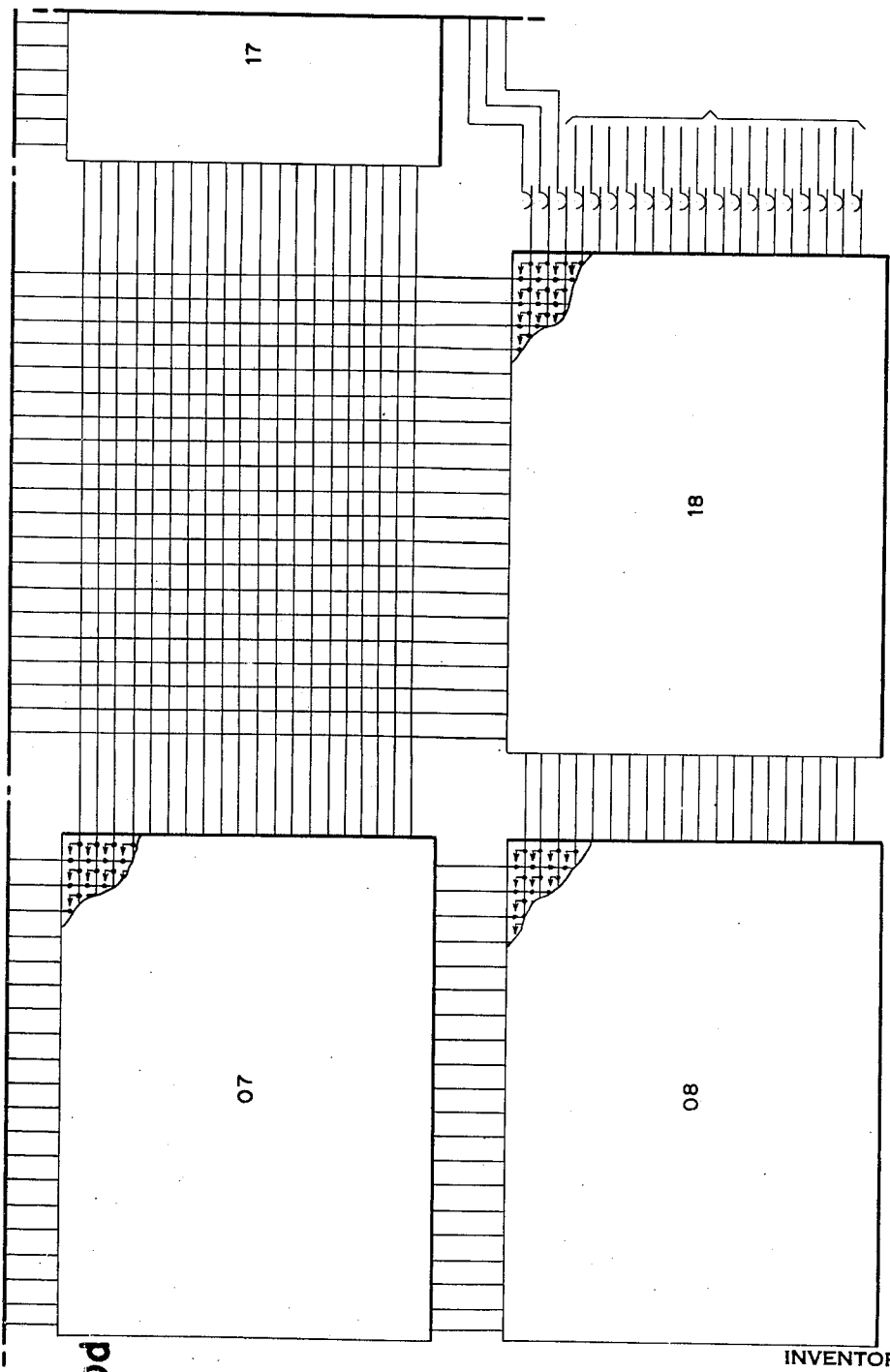
Figure 10G:
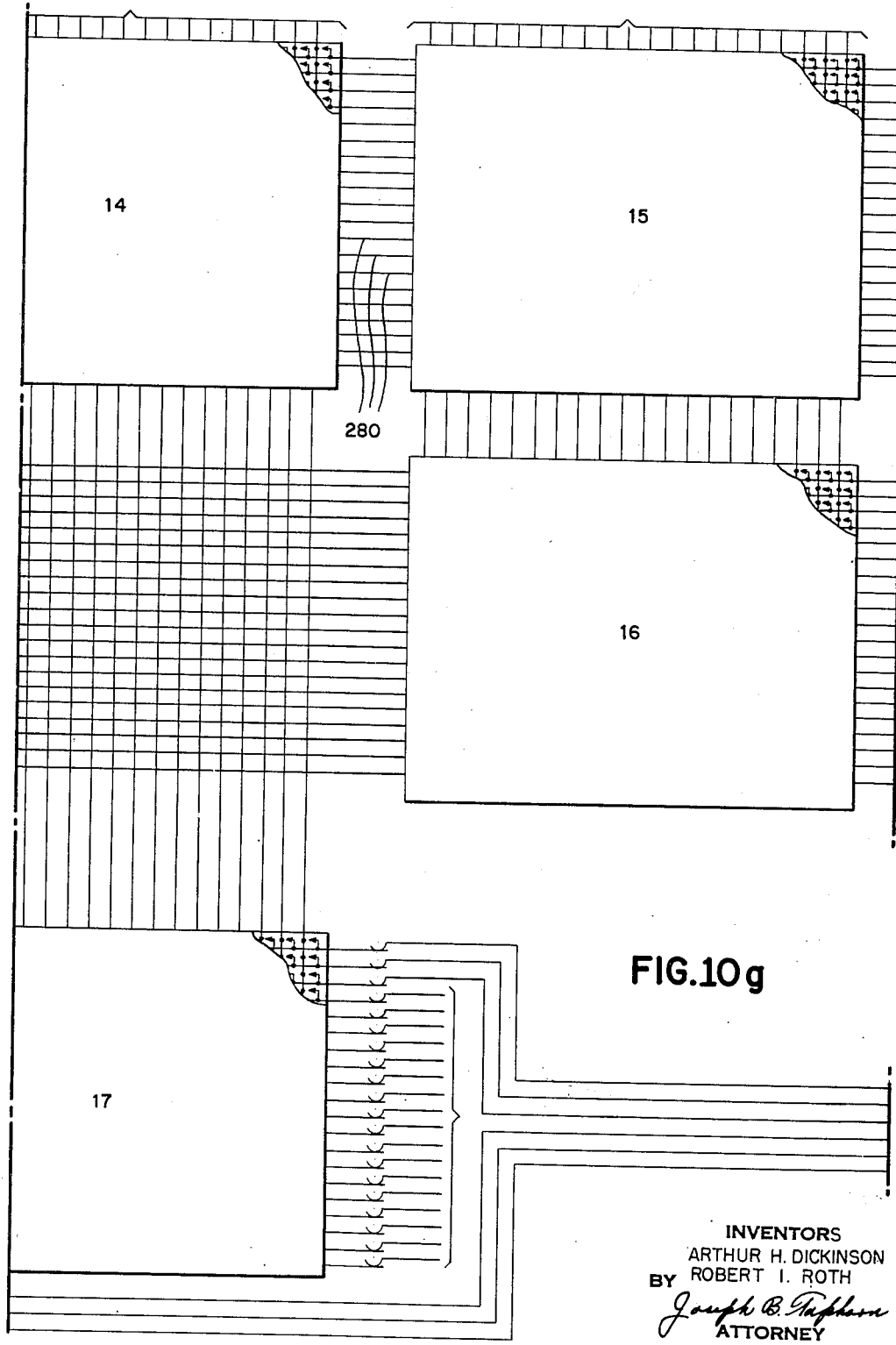
Figure 10H:
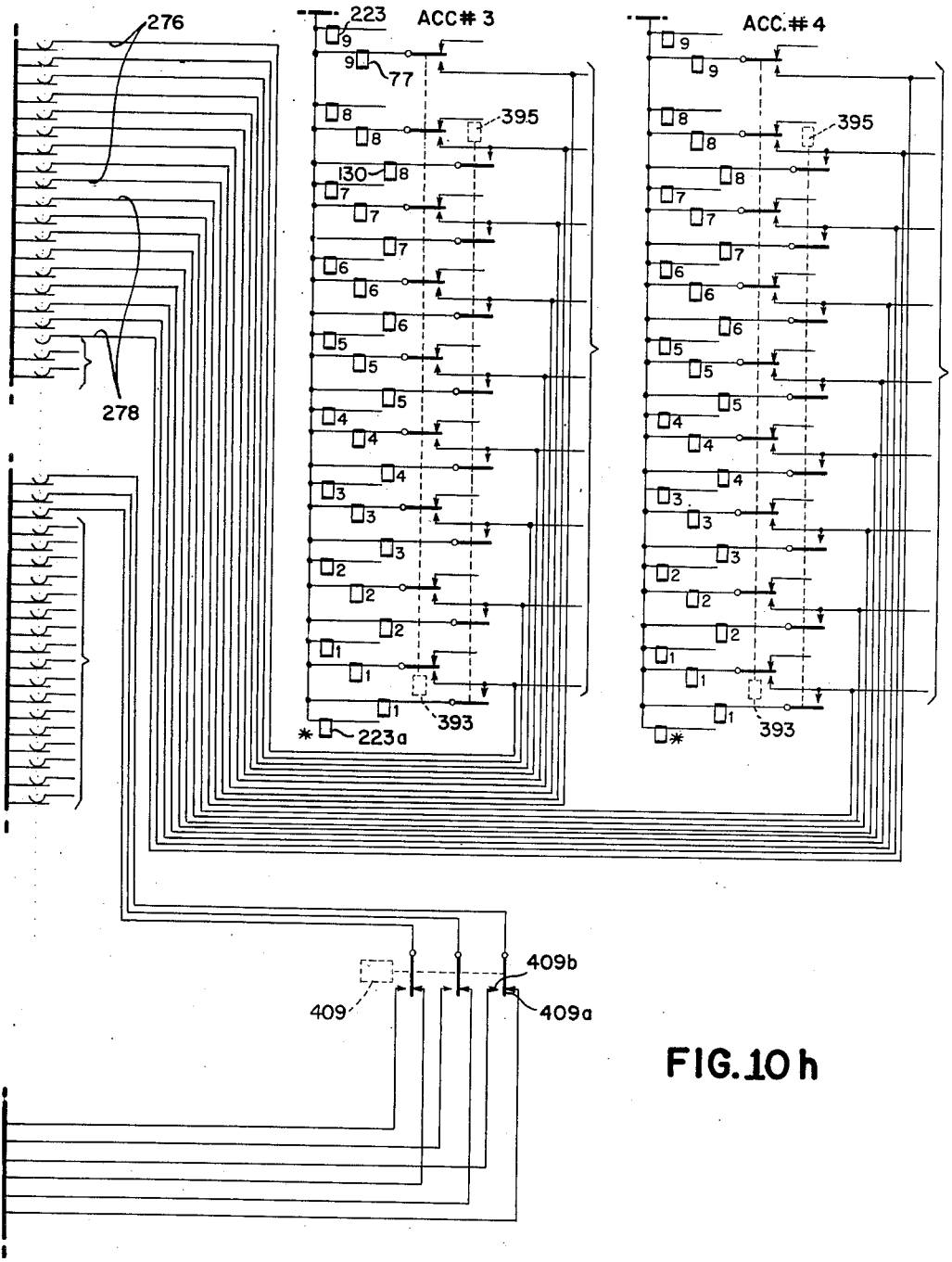

Portions of the machine disclosed in the Lake et al.

patent have been reproduced in Fig. 10 along with the same number designations. These include the second or lower contact roll 56 with its associated lower brushes LB, list relay magnets 223, add accumulator #1, subtract accumulator #2, an auto-control unit generally represented by relay coils 359 and 360, the first or upper contact roll 55 with its associated brushes UB, and minor and major control elements. Sections 01 and 08 are shown as being connected to the lower brushes LB associated with contact roll 56. The vertical lines on sections 01 to 08 are permanently connected together in the structure of the switchboard. The connections from these vertical lines to the lower brushes are made through the connections 274 which are identical with the connections 2 and 5 as shown in Fig. 2 of Lake Patent 2,111,118.

An illustration of switching to list magnets is shown in the upper left corner of Fig. 10. Here, the horizontal lines of section 01 extend through connections to relay points 407A and thence to list magnets 223 as shown in Fig. 29b of Patent No. 1,976,617. By depressing the proper connectors of section 01, the desired connections from the lower brushes to list magnets 223 can be made.

In section 02, the horizontal lines extend through connections to the add magnets 77 of an accumulator such as accumulator #1 shown in Fig. 29 of Patent No. 1,976,617. Depression of the desired connectors in section 02 will connect the desired lower brushes to the desired add magnets 77 of the aforementioned accumulator #1.

In section 03, the horizontal lines extend through connections to lines in a subtract accumulator such as accumulator #2 shown in Fig. 29a of Patent No. 1,976,617. These lines eventually go to the add magnets 77, the subtract magnets 130 and the print magnets 223 associated with accumulator #2.

Section 04 is used to make the desired connections between the lower brushes LB and the auto-control unit generally represented by magnet coils 359 and 360 and shown in Fig. 29 of Patent No. 1,976,617. It can be seen how depression of connectors in section 04 will connect the control columns of the lower brushes to the auto-control unit.

Section 09 and section 10 are connected by the same vertical lines to the upper brushes UB associated with contact roll 55 shown in Patent No. 1,976,617. The horizontal lines in section 09 are connected to the auto-control unit as represented by magnet coils 359 and 360. In this manner, the upper brushes can be properly connected to the auto-control unit.

Section 11 is used to make the desired connections for minor and major control. These connections are shown on Fig. 29 of Patent No. 1,976,617 by the plug connections 320 and 321. Section 11 is the equivalent of plug connections 320 and 321.

As explained in Patent No. 1,976,617, the accumulators, with the exception of accumulator #1, are under control of the upper brushes UB and are caused to add, subtract or eliminate by suitable control punchings in cards which are sensed at the upper brushes. The desired connections between the upper brushes and these accumulators are made through the "X1," "X2," "X3," "X4," and "X5" circuits in the machine; and in Fig. 10 the horizontal lines of section 10 extend through connections to these "X" pickup circuits. In this manner, any upper brush can be connected to any "X" control circuit.

In addition to these accumulator control circuits, provision is made for picking up selector relays such as relay 410 shown in Fig. 29b of Patent No. 1,976,617. One horizontal line in section 10 extends through a connection, to cam contact L23 associated with relay 410. Any upper brush can be connected to this horizontal line and used to control a selector relay.

Again referring to Fig. 29b of Patent No. 1,976,617, the circuitry for accumulators #2 to #5, inclusive, is obtained therein by plug wires 416, 419, 421 and plug connections from plug sockets 418 and 417 and from plug sockets 418 to another plug socket 417. Plug sockets associated with relay points 423a and 423b and also plug sockets 420 are used to control the type of entry into the accumulator and, as explained in the patent, certain control columns can supersede the control of other control columns. To accomplish this control, section 12 is used. In this section the horizontal lines are connected to the points of relays 423 and the UCLg relay points in Fig. 29b of the patent. The vertical lines on section 12 are connected to relay coils 393 and 395 which control the type of entry into the accumulators. Connections can be made between the horizontal lines and the vertical lines of section 12 and these connections will be the equivalent of the plugging shown in Fig. 29b of the patent.

The before-mentioned section 05 has its vertical lines connected to the lower brushes LB of the Lake et al. machine. The horizontal lines on section 05 may be connected to two subtract accumulators which can be, for example, accumulators 3 and 4 of the Lake et al. machine. The first nine horizontal lines 276 are connected to the entry circuits of accumulator #3, and the next nine horizontal lines 278 are connected to the entry circuits of the accumulator #3.

Section 05 is also used along with sections 06, 07, 08, 13, 14, 15, 16, 17, and 18 to illustrate plugging for class selection or field selection. Section 06 has its horizontal lines connected to common straps of class selector relay points. These class selector relay points are shown as 409a and 409b on Fig. 29b of Patent No. 1,976,617. Section 07 has its horizontal lines connected to the normally open straps of the class selector relay points.

Section 08 has its horizontal lines connected to the normally closed straps of the class selector relay points. The horizontal lines of section 05 and the horizontal lines of section 08 can be connected together by means of sections 13 and 18. The horizontal lines of section 05 and section 07 can be connected together by sections 14 and 17. The horizontal lines of section 05 and section 06 can be connected together by means of sections 15 and 16.

To explain class selection, it can be assumed that the first three of the brushes LB at the left of wiring diagram, Fig. 10, are connected by means of switches in section 06 to the top three horizontal lines of section 06. These lines extend to the common straps of the class selector relay points. The normally closed straps for these class selector relay points are connected to the three top horizontal lines of section 18. These three horizontal lines on section 18 can be connected to the three left hand vertical lines of section 18 from where they extend to the three left hand vertical lines on section 13. In section 13 the three left vertical lines can be connected to the top three horizontal lines and these three top horizontal lines extend to three orders of accumulator #3. The normally open points of the class selector relay contacts are connected to the three top horizontal lines of section 17. The three top horizontal lines on section 17 can be connected to the three left vertical lines of section 17. These three vertical lines extend to section 14 where they can be connected to the three lines 280. These lines are connected via three of the lines 278 to three orders of accumulator #4. It can be seen that if the class selector relay points are in the position shown, circuits to the accumulator will extend from the three left lower brushes via the three left vertical lines of section 06, the three top horizontal lines of section 06, common straps of selector relays, normally closed straps of selector relay points, three top horizontal lines of section 18, three left vertical lines of section 18, three left vertical lines of section 13, three top horizontal lines of section 13 to three orders of accumulator #3. Thus these three columns in the card will normally be routed to accumulator #3.

If the selector relay has been picked up the path from the same three lower brushes is changed as follows: Three left lower brushes, three left vertical lines of section 06, three top horizontal lines of section 06, common straps of selector relay, three top horizontal lines of section 17, three left vertical lines of section 17, three left vertical lines of section 14, the three horizontal lines 280 of section 14 to three orders of accumulator #4. Thus, these three columns in cards which have not been specially perforated (X punched) in a control column will be routed to accumulator #3 and these same three columns in cards which do have a suitable perforation (X punch) in a control column will be routed to accumulator #4.

An example of field selection can be shown as follows: Three left hand lower brushes are connected to vertical lines 282 and the next three lower brushes are connected to vertical lines 284. The common straps of class selector relays are connected to the three top horizontal lines of section 16. From here they are connected to the three left vertical lines of section 16 which extend to the three left vertical lines of section 15. These three lines can then be connected to the three top horizontal lines of section 15 from where they extend to three orders of accumulator #3. The three left hand lower brushes, which are connected to lines 282 extend to the three left vertical lines of section 07. Here they are connected to the three top horizontal lines of section 07 and extend to the normally open points of the class selector relays. The three lower brushes which are connected to the three vertical lines 284 extend to the three vertical lines of section 08 where they are connected to the three horizontal lines of section 08. From here they extend to the normally closed straps of the class selector relay points. Accumulator #3 is thus normally connected to the three lower brushes which are connected to lines 284, and the circuit from these lower brushes is as follows: Vertical lines 284, section 08, three top horizontal lines of section 08, normally closed points of selector relays, common straps of selector relays, the three top horizontal lines of section 16, three left vertical lines of section 16, three left vertical lines of section 15, three top horizontal lines of section 15, to three orders of accumulator #3. Thus, the three lower brushes connected to vertical lines 284 will be routed to accumulator #3 when these cards do not bear any special perforation (X punching) in a control column. Cards having a special perforation (X punching) in a control column will cause energization of the class selector relay and the same three orders of accumulator #3 will now be routed to the three lower brushes connected to lines 282. A circuit can be traced as follows: Vertical lines 282, three left vertical lines of section 07, three top horizontal lines of section 07, now closed points of selector relays, common straps of selector relays, three top horizontal lines of section 16, three left vertical lines of section 16, three left vertical lines of section 15, three top horzintal lines of section 16, to the same three orders of accumulator #3.

*Switchboard adjusting machine*

The switchboard adjusting machine is operable under the control of a series of records, such as cards bearing data designations in the form of perforations, to open and close the switches on the type of switchboard disclosed hereinbefore. It adjusts the switches section by section at a switching station and moves a switchboard, which has been removably mounted on it, so as to dispose the different sections at the switching station for adjustment. It processes the record cards, of which different ones pertain to different sections, one at a time so as to enable the switchboard section to which each card pertains to be moved and the switch adjustment to be made before another card is read. The timing of the machine is such that it first undergoes a main cycle during which a card is successively sensed at a control station and at a reading station and the machine is concomitantly conditioned to close those switches in the section which are designated on the card at the same time the number of the designated section is stored. Upon the termination of the main cycle, the machine acts upon the stored number designating the section to move the switchboard, if the designated section is different from that presently at the switching station, so as to dispose the designated section at the switching station. Thereafter the machine undergoes a reset and set cycle in which the switchboard section is normally subjected to an operation opening all of the section switches and thereafter to an operation closing those switches in the section for which the machine has been conditioned. Upon completion of a switch closing operation, the machine starts over again by the processing of the next record card.

The machine generally comprises a record card handling unit and a switchboard handling unit. The switchboard handling unit moves the switchboard so to locate the different switchboard sections singly at a switching station where switching mechanisms open and close the switches. The switching mechanisms include a switch opening mechanism which may be operated to open all of the switches in a section at the switching station, a switch selecting mechanism positionable over switches in the two zones of that section according to the card designations, and a switch closing mechanism operable through the switch selecting mechanism to close the designated switches of that section.

The record card handling unit may be of the type disclosed in the Lake Patent No. 2,032,805. It embodies two sensing stations through which only one card is processed at a time. The cards may be of the common IBM type in which three index point positions, denominated "12" or "R," "11" or "X," "10" or "0," "1," "2," "3," "4," "5," "6," "7," "8," and "9," respectively, are provided in each of eighty vertical columns and data designations, such as numbers and instructions, are obtained by perforating different index point positions in different columns or groups of columns (fields) according to a preselected code. They are fed "12" edge first. The first sensing station constitutes the control station where certain columns are read to effect a switchboard section selection and others are read to effect a zoning of the switch closing mechanism and other control purposes. At the second sensing or reading station various card columns are read to effect a positioning of the switch selecting mechanism over the positions occupied or to be occupied by the switches of the respective zones of the section disposed or being disposed at the switching station.

The switchboard is supported in the switchboard handling section by a cradle or carriage which is reciprocable both lengthwise and crosswise, that is, in the direction of the section columns and rows of the switchboard. The cradle has a home position in which none of the columns and rows of a mounted switchboard are aligned with the switching station to facilitate the loading and unloading of switchboards. Due to the construction of the switch closing mechanism, which limits the direction of movement of a section into and out of the switching station to the direction of the section rows, the cradle is moved in only one direction at a time. Thus when a section is already at the switching station, the designation of a section in another row requires that the cradle be first moved to the left in the direction of said section rows to a position in which all of the sections are clear of the switching station, that is, none of the section columns are in alignment with it; then in the direction of said columns until the row of the newly designated section is aligned with the switching station; and finally, in the direction of said section rows until the designated section is disposed in the switching station. When the first card is processed through the record handling section, the cradle is already in a position in which all of the sections are clear of the switching station and hence the cradle moves directly backward in the lengthwise direction until the row containing the designated section is disposed in alignment with the switching station. When the newly designated section is in the same row as that presently in alignment with the switching station, the cradle is merely shifted crosswise, that is, to the right or left. After the last card has been processed by the record handling unit, the cradle is automatically returned to the home position to dispose a set-up switchboard for convenient removal from the machine.

The switch selecting mechanism comprises a number of interposer elements equal in number to the columns of switches in each section. Since twenty switch columns are provided in each section of the embodiment disclosed, twenty interposer bars are provided to close various switches in each column. The interposer elements have a normal condition in which they are reciprocable over the respective columns for disposition over one of the switches therein. They are moved in one direction over the columns while a card passes through the control station and are individually disposed at the head of one or the other zone of a section according to presence or absence of a perforation in a corresponding column on the card. Thereafter while the card passes through the reading station they are moved over the columns of switches in the respective zones until they are stopped by the presence of perforations in the corresponding card columns over switches bearing the same relation to the other switches in the respective columns as the perforated index point positions bear to the other index point positions in their respective columns. If no perforation appears in the card column, the respective interposer element is disposed in a position beyond the end of the left zone.

The switch opening mechanism is operated during the first portion of a switching cycle which automatically begins after the newly designated switchboard section has been disposed at the switching station and the interposer elements have been positioned. It acts to raise the reset plate of the section at the switching station to open all the switches in that section. Whenever two or more cards pertain to the same section, it is necessary that the switch opening mechanism be prevented from operating when the second card is processed through the machine so as not to disturb the switches set by the previous card. To this end provision is made for inactivating the switch opening mechanism by suitably perforating the second card for reading at the control station.

The switch closing mechanism is operated during the last portion of the switching cycle. It includes an element that is movable from a normal position to shift the positioned interposer elements so as to force the connectors of the designated switches into the openings formed in the switchboard. The element is then permitted to restore to the normal position, and, in so doing, it withdraws the interposer elements with it.

Operation of a machine embodying the type of card handling mechanism disclosed in the Lake Patent 2,032,805 is dependent upon the placement of record cards in its hopper. Depression of a start key thereafter causes one card to be fed from the bottom of a hopper to a position in front of the first sensing or control station whereupon the machine stops. The presence of the card at the control station conditions the machine for continuous operation and a second depression of the start key initiates an operation called the main cycle in which the card in front of the control station is moved successively through the control and reading stations, the interposer elements are positioned, and a switchboard cradle movement, if any, is begun. During the first portion of the main cycle, the interposer elements are all returned to a position at one end of the switching station. During the second portion of this operation the card is moved through the control station simultaneously with a movement of the interposer elements across the switching station. If a perforation appears at a selected index point position in the corresponding card column of an interposer element, the movement of that particular interposer element is arrested over a position occupied by the head or interior end of the corresponding column of the right hand zone of a section in the switching station. If there is no such perforation, the respective interposer element is moved clear across the switching station to where it overlies a position occupied by the head or exterior end of the corresponding column of a left hand zone of a section in the switching station. The number of the switchboard section to be disposed at the switching station, recorded as perforations of index point positions in two card columns, is also read as the card passes through the control station. The designated section is analyzed as to section and row and this information is stored.

Upon leaving the control station, the card passes through the reading station during what may be termed the third and final portion of the aforementioned cycle. No card will follow it through the control station, as only one card is processed at a time. The interposer elements are moved over their respective columns in the zones at the head of which they were earlier disposed in step with the passage of the index point positions of the card columns through the reading station. If a perforation appears, the corresponding interposer element is stopped over the switch whose location in the zone corresponds with that of the index point position in its column. If no perforation is present in a column, the interposer element is moved across the zone to a position beyond the end of the zone.

The movement of the cradle to dispose the newly designated switchboard section at the switching station follows the main cycle. It is initiated in the third portion of the main cycle after the last index point position indicative of a section number could have been sensed at the control station and analyzed as to column and row. The initiation is effected through the pulsing of a magnet of a clutch which engages at the end of the main cycle. After the designated switchboard section has been disposed at the switching station, the operation of the switch opening and switch closing mechanisms is effected.

The operation of the switch opening or reset mechanism and of the switch closing or set mechanism is sequentially effected during what has been termed a reset and set or RS&S cycle. During the first half of this cycle, the switch opening mechanism normally acts upon the reset plate of the designated section to raise it to a position in which the slidable connectors of all set switches are moved to an unset or open condition. When two or more cards pertain to the same section, all but the first card are provided with a perforation which acts to render the operation of the switch opening mechanism ineffective.

The switch closing mechanism is operated during the second half of the RS&S cycle. It normally effects a depression of the positioned interposer elements which in turn move the connectors of the designated switches downward to a switch closing condition. During the RS&S cycle, action is also taken to effect a following operation of the machine through another main cycle. This repetition of main cycles and reset and set cycles continues until the last card has been fed from the hopper and disposed in front of the control station. The machine will not of itself undergo a main cycle in which the last card is processed, but will come to a stop upon the completion of the RS&S cycle for the second-last card.

To process this last card through the machine, it is necessary that the start key is depressed again. The machine thereafter goes through a main and an RS&S cycle as before. However, when this RS&S cycle has been completed, the cradle is automatically returned to its unloading position in which the set-up switchboard may be removed and another installed conveniently.

It may be desirable to have the machine open the switches in all of the sections of the switchboard before it is operated under the control of record cards as, for example, when the number of sections to be used on the switchboard is less than those previously used. Machine controls have been provided for this type of operation which cause the machine to dispose systematically at the switching station the switchboard sections and to operate the switch opening mechanism while the section is at the switching station. The switch closing mechanism is also operated but it is rendered ineffective. It is, of course, possible to operate the machine in the normal manner under the control of record cards and to open the switches in those sections which are not to be used by providing cards which are perforated only with the number of the section and are otherwise blank. In such an arrangement the interposers will all be positioned beyond the interior ends of the left hand zones, and the machine will effect switch opening and switch closing operations for cards bearing section and switch designations and switch opening operations only for cards bearing section designations only.

*Mechanical description*

The general mechanical features of the switchboard adjusting machine can best be described with reference to Figs. 11a–11d, 12a–12d, and 16a–16c. The record card handling or feeding and sensing unit and the switchboard handling unit are mounted together in a compact organization upon the base casting 300. The card handling unit, which as has been pointed out is similar to the read unit disclosed in the Lake Patent No. 2,032,805, is located at the left hand end of the base as viewed in Figs. 11 and 12. The elements of the switchboard handling unit which includes the switchboard moving mechanism along with the switch opening and the switch closing mechanism and the switch selecting mechanism are mounted to the right of the card handling unit.

*Card handling unit*

The card feeding and sensing unit (Figs. 11a and 12a) reads the information recorded in the form of punched holes in a record card by moving the card past brushes capable of making electrical contact through the punched holes to close electrical circuits. The card feeding and sensing unit includes a feed hopper H, feed knife assemblies 302, a first set of upper and lower feed rolls 304 and 306, a first sensing or control station comprising a set of electrical brushes 308 and an associated contact roll 310, a second set of upper and lower feed rolls 312 and 314, a second sensing or reading station similar to the first sensing or control station and including a set of electrical brushes 316 and a contact roll 318, a third set of upper and lower feed rolls 320 and 322, a card deflecting eject roller 324, and a stacker or unloading magazine. An oscillatable gear segment 326 mounted on a shaft 328 reciprocates the knife assemblies 302 in synchronism with the rotation of the first pair of feed rolls 304 and 306 and the contact roll 310 of the control station. When actuated, the feed knives move the bottom card in the feed hopper into the grasp of the first pair of feed rolls which move the card to a position just in front of the control station. At the same time the first set of feed rolls 304 and 306 will move a card which had been disposed just in front of the control station through it to where it is grasped by the second pair of feed rolls 312 and 314 which are rotatable continuously. The reading station contact roll 318, the third pair of feed rolls 320 and 322, and the stacker roll 324 also rotate continuously at a uniform peripheral speed coincident with that of the second pair of feed rolls 312 and 314 and assist in moving a card which has been passed through the control station on through the reading station and into the stacker or unloading magazines.

The duration of movement of a card through a sensing station is termed a card feed cycle. Thus three card feed cycles are necessary to move a card from the hopper H to the stacker S. During the first feed cycle, the first set of feed rolls 304 and 306 will be rotated and the feed knife assemblies 326 reciprocated to advance the bottom card from the hopper H to a position just in front of the contact roll 310 in which it is partially through the first set of feed rolls 304 and 306. During the next card feed cycle, the first set of feed rolls will again be actuated to advance the card through the control station to a point where it will be engaged by the continuously rotating second set of feed rollers 312 and 314. At about this time the feed knife assemblies 302 will have advanced the next bottom hopper card to the feed rolls 304 and 306 which will move it to the position just in front of the contact roll 310. In the meantime the second set of feed rolls 312 and 314 will complete the movement of the first card through the control station. Unlike the first set of feed rolls, the second set does not stop when the first card has been brought to a position before the read station; instead they continue to rotate and advance the card partially through the read station to where it is engaged by the third set of feed rollers. The movement of the card through the read station comprises the third cycle. After the card leaves the read station it is passed on into the stacker S by further rotation of the third set of feed rolls and the stacker roll 324. Actuation of the first set of feed rolls 304 and 306 and the feed knife assemblies 302 is controlled externally of the card feed unit.

A cam bearing shaft 330 is continuously rotated in synchronism with the second and third sets of feed rolls and the contact rolls to open and close circuits at fixed times during each card feed cycle. Operated by the cams on this shaft are a pair of cam contacts CC1 and two pairs of circuit breaker contacts CC2 and CC3.

*Drive to card handling unit*

As may be best seen in Figs. 11a and 11b and Figs. 15a and 15b, the card feeding and sensing unit is driven by an electric motor 332 securely mounted upon an extension 334 of the base casting 300. The motor 332, which may contain an integral speed reduction device, is coupled through a flexible coupling 338 to a shaft 336 mounted in an upstanding bracket 337 secured to the base casting 300 and an ear 339 of a bracket 594 suitably fixed upon the machine. A gear 340 is fastened to the shaft 336 and drives an idler gear 342 rotatably mounted on a stud 344 fixed upon the bracket 337, and this idler gear drives a gear 346 which is integral with a sleeve 348 rotatably mounted on a stud 350 also fixed upon the bracket 337. A second gear 352 is rigidly fixed to the sleeve 348 and drives an idler gear 354 rotatably mounted on a stud 356 fixed upon the rear side wall 357 of the card feed unit, and this idler gear 354 in turn drives a gear 358 which is fastened to the upper roll 320 of the third pair of feed rolls. This gear 358 drives an idler gear 360 which is integral with a sleeve 362 and a gear 364 rotatably mounted on a stud 366. The last mentioned gear 364 drives gear 368 fastened to the upper roll 312 of the second pair of feed rolls. Also fastened to this upper roll 312 is a gear 370 which drives a gear 372 fastened to the lower feed roll 314 of that pair. The gear 370 also drives an idler gear 374 which in turn drives a gear 376 fastened to the contact roll 318 at the reading station.

The upper roll 320 of the third pair of feed rolls has a second gear 378 rigidly mounted upon it. This gear 378 drives a gear 380 fastened to the lower feed roll 322 of that pair. The gear 378 also drives an idler gear 382 mounted on a suitable stud 384 and which in turn drives a gear 386 fastened to the stacker roll 324. It will be evident that since the electric motor 332 is continuously rotatable that the second and third pair of feed rolls, the contact roll at the reading station, and the stacker shaft will be rotated continuously during the operation of the machine.

*Drive to first pair of feed rolls, contact roll at the control station, and the card feed knife assemblies*

These elements (Figs. 11a, 11b, 15a and 15b) are also driven by the motor 332, though not continuously. A single revolution clutch, generally indicated by the numeral 388 is interposed in the gear train to the driving motor and acts, when engaged, to drivingly connect it with the first pair of feed rolls 304 and 306 and the contact roll 310 and the feed knife assemblies. The clutch is of the conventional positive-drive pawl and square tooth ratchet type and includes a driving element or ratchet 390 (Fig. 11a) formed with a single tooth or notch 390a (Fig. 12a) and fixed to a sleeve 392 formed integral with a gear 394. The gear 394 is connected in driven relationship to the motor 332 through a gear 396 mounted upon a suitable stud 398 and drivenly connected with the continuously rotatable gear 354.

The ratchet 390 is rotatably mounted upon a shaft 400 with which it may be drivingly connected. The shaft 400 has pinned to it the usual single revolution clutch arm 402 provided with a biased pivoted pawl 404 adapted to engage in the tooth 390a of the continuously rotatable ratchet. The pawl is normally latched out of engagement by the armature 406 of a magnet 408. The armature also holds the clutch arm in place. Energization of the magnet will release clutch arm and pawl and permit the biased pawl to engage the driving element to cause the shaft to rotate. The clutch is latched up at the end of one revolution of the shaft 400 if the magnet has been deenergized.

Fastened to the shaft 400 is a gear 410 which drives a gear 412 fastened to the upper feed roll 304 of the first pair of feed rolls. The upper feed roll 304 has a second gear 414 fastened to it which drives a gear 416 fastened to the lower feed roll 306 of that pair. The second gear 414 also drives an idler gear 418 mounted for rotation on a suitable stud 420 and this idler gear in turn drives a gear 422 fastened to the contact roll 310 at the control station.

The gear 394 on the ratchet sleeve 392 also drives a second gear 424. Gear 424 is fastened to the circuit breaker and contact cam bearing shaft 330. Thus shaft 330 is continuously rotatable by the motor 332. Suitable mechanism is also provided to oscillate the shaft 328 and gear segment 326 so as to reciprocate the feed knife assemblies in synchronism with the rotation of the first pair of feed rolls 304 and 306 and the contact roll 310 at the control station.

*Switchboard shifting mechanism*

This unit (see Figs. 11, 12, 16, 17, 18, and 24) carries the multisection switchboard. It is operative to dispose the different sections of the switchboard singly at a switching station for switch opening and switch closing operations. Since, as has been pointed out hereinbefore, a switchboard section may be moved into and out of the switching station in the direction of the section rows only, the switchboard shifting mechanism effects switchboard movement in only one direction at a time. These movements take place transversely of the machine or in the right-left or RL direction and longitudinally of the machine or in the backward-forward or BF direction. The switchboard is placed in the machine so that the direction of the section rows is that of the RL direction and the direction of the section columns is that of the BF direction.

The switchboard shifting mechanism includes a generally transversely extending horizontal frame 426 fixedly mounted upon the base casting 300. Upon this fixed frame, a rearwardly extending horizontal frame 428 is transversely reciprocable. A switchboard carrying frame or cradle or carriage 430 is mounted upon this rearwardly extending frame 428 and is reciprocable backward and forward thereon. The size of these parts and their ranges of movement is such that any switchboard section may be disposed at the switching station.

The fixed frame is disposed in spaced relation above the base casting for four pedestals 432 engaging it at each of its four corners. The upper surface of the fixed frame is formed with a transversely extending cavity 434 and in this cavity a drum cam 436 having a helical slot 438 is rotatably mounted by means of a shaft 440 extending through the end walls of the frame. Bearing blocks 442 and 444 support the shaft 440 in the end walls. The upper surface of the fixed frame is also provided upon its front and rear parts with a pair of parallel transversely extending smooth surfaces or tracks 446 (Fig. 16b), and the sides of the frame are incurved and bear, on the underside of the upper portions of the incurved sides, smooth surfaces or tracks 448 which are parallel to the smooth surfaces 446 on the upper surface of the frame.

The rearwardly extending transversely reciprocable frame 428 is slidably mounted upon the fixed frame 426. Its lower generally flat surface is provided with a pair of transversely-extending projecting smooth surfaces or tracks 450 which are so spaced as to slidably engage the smooth surfaces 446 on the upper side of the fixed frame 426. The transversely reciprocable frame 428 is also provided with downwardly and inwardly directed extensions 452, of which one is provided with an integral upwardly and inwardly directed smooth surface or track 454 for engaging the smooth surface 448 on the corresponding incurved side of the fixed frame. The other extension is slotted on its upward and inwardly facing side and adjustably receives a bar or rail 456 having a smooth surface 458 for engaging the smooth surface 448 on the other incurved side of the fixed frame. The adjustable bar 456 is movable in a plane perpendicular to the smooth surface on the incurved side by three set screws 460 tapped into the extension. These set screws can be locked by nuts 462. It will be evident that by the proper adjustment of the set screws, the transversely reciprocable frame may be prevented from having other than transverse sliding motion relative to the fixed frame.

Transverse reciprocation is imparted to the rearwardly extending frame 428 through a pin 464 which is mounted on its lower surface and engages the helical groove 438 in the drum cam 436. Rotation of the drum cam will cause the rearwardly extending frame to slide upon the fixed frame. The helical groove in the drum cam is so formed that four revolutions of the cam are necessary to move the transversely reciprocable frame from one to the other end of the fixed frame. Thus two revolutions of the drum cam are necessary to move a section of a two column switchboard in or out of the switching station in the direction of the section rows.

The upper portion of the rearwardly extending frame 428 is formed with a longitudinally extending cavity 466 (Fig. 12c). A drum cam 468 having a helical groove 470 is rotatably mounted in this longitudinally extending cavity by means of a shaft 472 extending through the end walls thereof. The shaft is supported in these end walls by bearing blocks 474. The frame 428 is also provided upon its right and left hand parts with parallel raised smooth surfaces or tracks 476, and the lateral sides of the frame are incurved and bear on the underside of their upper portions smooth surfaces or tracks 478 parallel to the tracks 476 on their upper surfaces.

The switchboard-carrying frame 430 is slidably mounted for backward and forward movement upon the rearwardly-extending transversely-reciprocable frame 428. On its bottom side it is provided with a pair of projecting smooth surfaces 480 which mate with the raised surfaces 476 on the upper side of the frame 428. It is also provided with a pair of downwardly and inwardly directed extensions 482, of which one is provided with an integral raised smooth surface 484 for engaging the track 478 on the corresponding side of the frame 428. The other extension is provided with a longitudinally extending slot which adjustably receives a bar 486 having a smooth surface 488 for engaging the smooth surface on the other incurved side of the frame 428. Set screws 490, tapped into the other extension, are provided for adjusting the bar to eliminate free play of the switchboard carrying frame 430 upon the transversely reciprocable frame 428.

The backward and forward reciprocation of the switchboard carrying frame 430 upon the frame 428 is accomplished through a pin 492 mounted on the lower surface of the frame 430. The pin 492 projects into the helical groove 470 formed in the drum cam 468 carried by the frame 428, and rotation of the drum cam will obviously effect a sliding of the upper frames relative to each other. The helical groove is so formed that ten revolutions of the cam are necessary to move the switchboard carrying frame from one to the other end of the transversely reciprocable frame 428. Thus one revolution of the drum cam 468 will move a ten row switchboard backward or forward one row so as to align an adjacent section row with the switching station.

It will be evident that the rotation of the drum cam 436 in the fixed frame 426 will shift the switchboard carrying frame 430 transversely with respect to the switching station and that rotation of the drum cam 468 in the transversely reciprocable frame 428 will shift the switchboard carrying frame 430 backward and forward with respect to the switching station. Thus by a proper combination of rotations on the part of the drum cams, any switchboard section will be disposable at the switching station. To accurately center the switchboard sections in both the transverse and the longitudinal directions, the slots in the drum cams depart from a true helical line, as at 494, at each point where the corresponding pin engages the cam when a column or row of sections of the switchboard is aligned with the switching station. In the case of the cam 468, this point appears at the end of each revolution whereas in the case of the cam 436 it occurs at the end of every two revolutions.

The upper surface of the switchboard carrying frame 430 is generally hollow and of such size as to receive a switchboard within its confines. To this end one end of the frame is open and opposite side walls of the frame are provided wtih rails 496 upon which the grooved extensions 200 on the sides of the switchboard may be slidably mounted. This switchboard is inserted and removed from the machine through the open end of the switchboard carrying frame 430. The switchboard is so inserted in the frame that its switches 204 face upwardly and its plate 208 bearing the contacting members or terminals 202 is disposed downwardly within the frame.

The drive for the drum cam 468 which effects the backward-forward reciprocation of the switchboard-carrying frame 430 is carried by the transversely-reciprocable frame 428. It may be best seen in Figs. 11c and 11d, Fig. 16, and Fig. 17. It originates at a motor 498 which rests upon a bracket 500 fixed to the frame 428. Thus the transverse reciprocation of the frame 428 will not affect the drive for the switchboard carrying frame, as power may be supplied to the electric motor through flexible wires or other similar connections (not shown). The motor 498 is provided with a counterclockwise rotating shaft 502 (as seen from the front of the machine) which has a gear 504 fastened to it. This gear meshes with a larger gear 506 to effect speed reduction and to drive a main shaft 508 to which the gear 506 is fixed. The main shaft is rotatably supported upon the bracket 500 by spaced bearing members 510 and 512.

From an inspection of the drawings it will be evident that rotation of the drum cam in a counter-clockwise direction as seen in Fig. 12c moves the switchboard carrying frame rearwardly and that rotation in the opposite or clockwise direction moves the switchboard carrying frame forwardly. To this end two trains of gearing have been provided to the drum shaft; one for rotating it counterclockwise so as to advance the switchboard carrying frame rearwardly, the other for rotating it clockwise so as to advance the switchboard carrying frame forwardly.

The gear train (Figs. 11c, 16c, and 17) for moving the switchboard carrying frame rearwardly is drivenly connected to the motor 498 through a single revolution positive drive ratchet and pawl clutch of a well known type. It originates with a single notched clutch driving element or ratchet 514 pinned to the main shaft 508. Fastened to a sleeve 516 which has a free fit on the main shaft 508, is a clutch arm 518, and carried by and pivoted to this arm is the usual clutch dog or pawl 520. The clutch arm and dog are held from rotation by a latch 522 and a keeper 524 pivoted on a stud 526. Energization of a clutch magnet 528 will cause the latch 522 to release the arm 518 and the dog 520. A spring 530 will then pull the dog into engagement with the notch in the driving element 514 to cause the sleeve 516 to rotate with the main shaft 508.

The sleeve 516 is fastened to a gear 532 which meshes with a gear 534 integral with the miter gear 536 and free to rotate upon a secondary shaft 538 supported on the bracket 500 by bearing members 512 and 540. The miter gear 536 forms one side of a well known differential gear assembly which includes a cross shaft 542 pinned to the secondary shaft 538. The cross shaft 542 has the usual miter gears 544 mounted for rotation on its opposite ends. The miter gears 544 mesh with the miter gear 536 integral with the gear 534 and also mesh with a miter gear 546 which is mounted on a sleeve 548 freely rotatable upon the secondary shaft 538. This sleeve 548 carries a gear 550 which meshes with a gear 552 mounted on a sleeve 554 which is a free fit on the main shaft 508. This sleeve 554 has fastened to it a clutch arm 556 to which is pivoted the usual clutch dog 558. The clutch arm may be held against rotation by the usual biased latch 560 and keeper 562. When the clutch arm 556 is prevented from rotating by the latch 560 and the associated keeper 562, the gear 552 is also held against rotation. As gear 552 meshes with the gear 550 integral with the sleeve 548, the other gear 546 integral with this sleeve will also be held against rotation.

In operation, if the clutch arm 518 and the dog 520 are released due to energization of the magnet 528 the clutch driving element will cause the clutch arm 518, the sleeve 516 and the gear 532 to rotate in unison with the main shaft 508. As the last mentioned gear meshes with the gear 534, the miter gear 536 will also rotate. The differential miter gears 544 must also rotate, but, as miter gear 546 is held against rotation, the result of the rotation of the miter gears 544 of the differential assembly will be to rotate the secondary shaft 538 to which the cross shaft 542 is pinned. The secondary shaft has a gear 564 pinned to one end of it, and this gear meshes with the gear 566 fastened to the drum cam shaft 472. Thus, by holding the clutch arm 556 against rotation and releasing the other clutch arm 518 for rotation, the drum cam 468 will be turned in a clockwise direction as viewed in Fig. 12c to cause forward movement of the switchboard carrying frame 430 upon the longitudinally-extending transversely reciprocable frame 428. It should be remembered that energization of the magnet 528 results in a forward shifting of the switchboard.

The gear train for rotating the drum cam 468 counterclockwise so as to cause the switchboard carrying frame 430 to move backward is drivenly connected to the motor 498 through another single revolution clutch of which arm 556 and dog 558 are parts. The driving element or ratchet 568 is a free fit on the main shaft 508 and is formed integral with a miter gear 570. Miter gear 570 meshes with a miter gear 572 mounted for rotation on a suitable stud 574 fastened to an upwardly extending lug 576 integral with the bracket 500. Miter gear 572 meshes with a miter gear 574 which is keyed to the main shaft 508 and continuously rotatable therewith. The miter gear 570 and the clutch driving element 568 are free to rotate on the main shaft, and as long as the electric motor 498 is kept running, they will be continuously rotated in a counterclockwise direction which is opposite to that of the main shaft.

The counterclockwise rotation of the drum shaft 468 is effected by holding the clutch arm 518 against rotation while rotating the clutch arm 556. Rotation of the clutch arm 556 is effected by moving the latch 560 which releases the clutch arm and the associated dog 568 for driving by the single tooth driving element 568. The latch 560 constitutes the armature of a magnet 578 by which it is normally unlatched. Rotation of the clutch arm causes the sleeve 554 integral with it to be rotated. The gear 552 integral with this sleeve will also be rotated and in turn will rotate the gear 550 integral with the sleeve 548 mounted on the secondary shaft 538 and the miter gear 546 integral with this sleeve. As the miter gear 536 forming the other side of the differential gearing is held against rotation because the clutch arm 518 is held against rotation, the result of the rotation of the miter gear 546 will be to rotate the differential miter gears 544 so as to rotate the cross shaft 542 in the opposite direction to that heretofore described. As the secondary shaft 538 drives the drum cam shaft 472 through the gears 564 and 566, the drum shaft will be rotated counterclockwise and the switchboard carrying frame 430 will be moved in a backward direction. Thus, energization of the magnet 578 effects a backward shifting of a mounted switchboard.

The sleeve 516 on the main shaft 508 has an integral cam portion 580 which closes a set of biased to open contacts 582 at the end of each complete revolution of the sleeve, and hence, when a switchboard row has been aligned with the switching station. Therefore, these contacts are opened only when the switchboard carrying frame 430 is being moved forwardly. The other sleeve 554 on the main shaft has an integral cam portion 584 which closes a similar set of biased to open contacts 586 at the end of each revolution of the driven clutch element 556. These contacts thus are open when the switchboard carrying frame is being moved backwardly.

The shifting of a mounted switchboard in the direction of its section rows is obtained by the transverse reciprocation of the longitudinally extending frame 428 which carries with it the switchboard carrying frame 430. The transverse reciprocation is obtained by rotation of the drum cam 436. As may be best seen in Fig. 12, the drive for this drum is located to its left upon a frame 587 fixed on the base casting 300. The drive originates (see also Figs. 11 and 18) with the electric motor 332 mounted on the offset 334 of the base casting 300. A miter gear 588 fastened to the shaft 336, driven counterclockwise (as seen in Fig. 12b) by the electric motor, effects the connection with the drum cam drive. The miter gear 588 meshes with a miter gear 590 fixed to a main shaft 592 from which the drum cam 436 is rotated in one direction or the other. The main shaft 592 is supported on the frame 587 by upstanding fixed brackets 594 and 596.

The gear trains for operating this drum cam are identical with the gear trains employed to rotate the drum cam 468 for the switchboard carrying frame 430 in one direction or the other. When it is desired to shift the longitudinally extending frame 428 and the switchboard carrying frame 430 to the right as seen in Fig. 12, the drum cam 468 must be rotated clockwise as seen in Fig. 16b. This clockwise rotation is effected by energizing a magnet 598 which unlatches the single revolution clutch on the main shaft 592 to rotate the secondary shaft 600 counterclockwise when viewed from the right of the machine. One end of the secondary shaft 600 is rotatably supported on the frame 587 by the bracket 596 while the other end is journaled in an upstanding bracket 602. The rotating secondary shaft 600 acts through a gear 604 fixed to its end and meshing with a gear 606 fixed on the shaft 440 to rotate the drum cam 436 clockwise. Magnet 598, therefore, is the shift right magnet.

When it is desired to shift the switchboard carrying frame 430 and the longitudinally extending frame 428 to the left as seen in Fig. 12, it is necessary to rotate the drum cam 436 counterclockwise as seen in Fig. 16b. This is accomplished by energizing a magnet 608 which unlatches the single revolution clutch, mounted on sleeves on the main shaft 592, to rotate the secondary shaft 600 clockwise. The secondary shaft in turn drives the drum cam 436 counterclockwise through the gears 604 and 607. Magnet 608 is, therefore, the shift left magnet.

Each of the gear drives has associated with it a pair of biased to open contacts which it closes at the end of each complete revolution of the respective single revolution clutch. In the drive controlled by the shift right magnet 598, a cam 610 mounted on the sleeve 612 driven by the respective clutch controls a pair of contacts 614. In the drive controlled by the shift left magnet 608, a cam 616 mounted on a sleeve 618 driven by the respective clutch, controls the pair of contacts 620. The contacts thus are closed whenever a switchboard section column is aligned with the switching station and when all of the section columns are disposed completely clear of the station.

It should be borne in mind that to operate a ratchet and pawl type of clutch through one revolution, the associated magnet must be deenergized before the end of the revolution. If more than one revolution of the clutch is needed, the corresponding magnet is maintained in an energized condition until after the start of the final revolution. De-energization of the magnet at any time thereafter but before the end of the revolution, will enable the clutch to latch up at the end of the revolution.

*Switch selecting mechanism*

This mechanism (Figs. 11, 12, 16, 19, 20, 21, 22, and 24) is set up according to the switch designations on the record card being processed through the control and reading stations to operatively connect in the switching station the switch closing mechanism with the designated switches of the appropriate switchboard section. It includes a plurality of interposer elements which are movable over the position occupied by a switchboard section in the switching station. The area in which the interposer elements are movable fixes the switching station and the position to which the pertinent switchboard section must be moved for adjustment.

The number of interposer elements is equal to the number of switch columns in each section. One interposer element is thus provided for each switch column. Each interposer element is reciprocable over the position occupied by the respective switch column of a section in the switching station and disposable over the position occupied by any switch of that column.

The disposition of the interposer elements over the various switches in the respective switch columns is effected through a fixed series of operations carried out during the main cycle and in step with the passage of the record card through the control and reading stations. During the first operation of this series, the interposer elements are restored to the right beyond the ends of the switch columns from their previous dispositions over various switch positions to align all of them. This first operation takes place immediately before the card is fed into the control station, that is, during the first third portion of the main cycle. Thereafter, during the second third portion of the main cycle, the interposer elements are yieldably moved to the left across the switching station in step with the movement of the record card through the control station for disposal over positions occupied by the head or left hand end of one or the other of the zones of a switchboard section in the switching station. If perforations appear at the proper places in the corresponding card columns sensed at the control station, the interposer elements are stopped over positions corresponding to the head of the second or right hand zones. The interposer elements, whose corresponding card columns sensed at the control station bear no such perforations, move clear across the switching station until they are disposed over positions corresponding to the head of the first or left hand zone.

The final or third operation of the interposer elements takes place during the last third portion of the main cycle and in step with the movement of the record card through the reading station. In this operation the interposer elements are moved to the right across the positions occupied by the zone at the head of which they were stopped during the second operation. If perforations appear in the corresponding card columns read at the reading station, the interposer elements will be stopped over the positions occupied in the selected zone portions of the corresponding switch columns by the switches bearing the same relation to the other switches in that zone portion of the switch column that the perforated index point position bears to the other index point positions of the card column. Thus, if the "0" index point position is perforated, the corresponding interposer element will be held over the position occupied by the first or left hand switch in the corresponding column of the appropriate zone. If the "9" index point position is perforated, the interposer element will be stopped over the position occupied by the tenth or last or right hand switch in the corresponding column of the appropriate zone. If no perforation appears in the corresponding card column, the interposer element is disposed beyond the ends of the positions occupied by the zones of a section at the switching station.

The switch selecting mechanism is mounted above the switchboard handling unit. The frame work for mounting it, as may be best seen in Figs. 11b and 11d, Figs. 12b, 12c, and 12d, and Fig. 16b, includes a flat rectangular plate 622 which is supported at its four corners in spaced relation upon the base casting 300 by columns 624. Mounted on the underside of the plate 622, by means of L-shaped brackets 626, are two spaced transversely-extending vertical plates 628. It is between these plates that the interposer elements are movably mounted.

The interposer elements are constituted of pins 630 mounted for vertical sliding movement in individual transversely extending bars 632. These interposer bars 632 are reciprocable respectively over the positions occupied by the switch columns of a switchboard section at the switching station. To this end they are supported near each of their ends by slotted or comb members 634 which extend between and are secured to the downwardly extending vertical plates 628. A cross bar 636 (Fig. 12c), also mounted between these downwardly extending vertical plates, serves as a stop to limit the movement of the interposer bars to the right.

Each interposer bar 632 is driven through a member 638 slidably mounted upon one side of it through inturned openings 640 on its adjacent side cooperating with outturned portions 642 on the adjacent side of the member. The slidable member 638 is normally held in one or the other of two positions with respect to the interposer bar 632 by a detent member 644 pivoted on a lug 646 depending from the forward end of the slidable member 638. The detent member 644 is urged upwardly for seating in one of two notches 648 and 650 on the underside of the bar 632 by a finger spring 652 fixedly inserted in a hole in bottom of the slidable member.

In the operation of the switch selecting mechanism, it will be remembered that the interposer elements undergo a series of three operations or movements, and that in the first of these they are restored to the right for alignment. This movement to the right is obtained by applying a force to the slidable member 638 which acts through its detent 644 to move the bar 632 to the right until it engages the stop bar 636. All interposer pins are mounted at the same distance from the right hand end of the respective interposer bars and thus will be aligned when the interposer bars are stopped by the cross bar. The interposer pins will also be disposed over positions beyond the right hand end of those occupied by the second or right hand zone of a section at the switching station, as may be best seen in Figs. 12 and 20.

The slidable member 638 may continue further movement to the right after the respective interposer bar has been stopped. The range of movement of the slidable member is such that when its detent 644 is engaged in the right hand notch 650 of the interposer bar, it comes to a stop simultaneously with the engagement of the interposer bar with the cross bar. Thus the detent remains seated in the notch 650. If, however, the detent was engaged in the left hand notch 648, it is forced thereout upon the striking of the cross bar by the interposer bar and the slidable member continues movement to the right to where the detent 644 seats itself in the right hand notch 650. Hence, not only are the interposer elements aligned each time they are restored to the right, but the relationships between the interposer bars and the slidable members are also shortened.

During the second of the series of three operations undergone by the interposer elements, they are zoned, that is, moved to the left and disposed over positions at the head of those occupied by the left hand ends of the zones of a switchboard section in the switching station. In the normal course of events, if nothing is done to the interposer bar the interposer pin will be moved clear across the switching station to where it is disposed over a position at the head of that occupied by the left hand end of the first or left hand zone. However, as has been pointed out, if a perforation is suitably placed in the corresponding card column read at the control station, the interposer pin will be stopped over an intermediate position located at the head of the left hand end of the second or right hand zone. The presence of the perforation results in a properly timed electrical pulse which is used to stop the corresponding interposer elements in the intermediate positions.

These timed pulses are directed to operate a series of magnets 654 of which there is one for each interposer bar. The magnets are assembled in a unit which is mounted above the interposer bars on the top of the horizontal support plate 622. The magnet unit includes a pair of spaced transversely-extending vertical plates 656 by which they are secured at one end to the plate 622 by L-shaped brackets 658 and at their other end by a U-shaped member 660. A plurality of vertical boards 662 are mounted between the vertical plates 656, and two magnets are supported on each such board in spaced relation to the plate 622 by horizontally turned portions 664 on the lower ends thereof. Each magnet is provided with an L-shaped armature 666 which is pivoted at its bend upon the upper end of the associated board 662. The lower end of the armature terminates in the space between the lower ends of the magnets and the upper surface of the horizontal plate 622.

Each magnet effects a disposition of the corresponding interposer pin over the intermediate position by releasing, when it is energized, a stop pawl 668 to engage a lug 670 formed on the upper edge of the respective interposer bar 632. As may be best seen in Figs. 12, 20, 21, and 22; the pawls extend generally horizontally and are pivoted on a shaft 672 supported at its ends by arms 674 projecting laterally from a cross member 676 mounted at its ends upon extensions 678 of the magnet unit vertical plates 656 projecting downward through a hole 680 formed in the support plate 622. The pawls are biased toward the interposer bars by springs 682 acting upon pawl lugs 684 and are normally held in an inoperative condition by latches 686 having hook portions disposable in the paths of biased movement of second pawl lugs 688. The latches are pivoted at their right hand ends on a shaft 690 mounted also at its ends on the arms 674 of the cross member 676. The latches are formed with upwardly projecting lugs 692 which are connected by links 694 to the lower ends of the respective magnet armatures 666. The latches are biased to latching positions, in which the magnet armatures are also held away from the magnet cores, by the stop pawl springs 682. When a magnet is energized it rotates its armature which pulls its associated link 694 and in turn pivots the latch 686 to a point where it releases the stop pawl 668. The stop pawl then rotates clockwise under the bias of the spring 682 until its pointed end rests on the associated interposer bar. Each pawl is notched on its underside at 696, and when the lug 670 on the corresponding interposer bar passes beneath the pawl, it is received in the notch. This stops the movement of the interposer bar at a point where the associated interposer pin is disposed over the immediate position.

The slidable member 638 on an interposer bar which has been stopped to dispose its interposer pin in an intermediate position continues movement, however, to the end of its normal range. This results in an unseating of the detent 644 from the right hand notch 650 and a reseating thereof in the left hand notch 648. The range of movement of the slidable member is such that it ends at the point where the detent is reseated. All the slidable members are moved left to the same line, whether or not the interposer bar was stopped and the detent 644 unseated.

As has been pointed out, during the third of the series of operations undergone by the interposer bars, they are moved to the right for disposition over the positions occupied by the switches in the respective columns in the zones over the head of which they were stopped. This movement takes place simultaneously with the passage of the record card through the reading station so that when a perforation appears in the corresponding card column read at the reading station, the interposer bar can be stopped to dispose its interposer pin over the switch in the corresponding switch column having the same relation to the other switches in that zone column that the perforated index point position has to the other index point positions in the card column.

In the embodiment shown, the interposer pins are stopped over the proper switch positions by connecting the sensing brushes 316 for the card columns at the reading station with the magnets 654 for the corresponding interposer bars and adapting the stop pawls 668 to cooperate with a series of notches 698 formed on each of the slidable members 638. The notches 698 formed on each of the members are equal in number to the number of switches in each zone column and are adapted to receive the free ends, which have been formed into points, of the corresponding stop pawls 668. The notches are so spaced on each member 638 that when the point of a corresponding stop pawl is received in one of them, the associated interposer pin is disposed over the corresponding switch position of the zone from which the slidable member had previously been set relative to the interposer bar. The stop pawls are released in the same manner as before upon energization of the coresponding magnets 654.

A bail 700 is provided to restore the stop pawls which have been released by their corresponding magnets. The bail traverses the distance between the vertical plates 656 upstanding from the horizontal plate 622, and the bail swings in the opening 680 formed in the horizontal plates. The bail is mounted on a shaft 702 which is supported at its ends in the vertical plates 656. A lever 704, formed as an extension of the rear side arm of the bail, constitutes the means by which the bail is moved to restore the released stop pawls. A spring 706 biases the bail to a normal inoperative position. When the bail is swung through the action of the lever 704, its bight portion engages the upstanding lugs 688 formed on the released stop pawls 668 and rotates them until they are relatched by the biased latches 686.

*Switch selecting mechanism operating mechanism*

This operating mechanism (Figs. 11, 12, and 25) effects the timed sequential operation of the various components of the switch selecting mechanism. It includes an interposer bar positioning cam 708 which yieldably moves the interposer bars at the times that they may be operated upon by the stop pawls, an interposer bar restoring cam 710 which aligns the interposer elements and moves the slidable members 638 to the right until the detents 644 are seated in the right hand interposer bar notches 650, and a stop pawl restoring cam 712 which swings the restoring bail 700. Each of these cams is mounted upon a shaft 714, supported on the underside of the base casting 200 by bearing brackets 715. The period of revolution of the shaft 714 constitutes the main cycle of the machine. The shaft 714 is connected in driven relationship with the electric motor 332 upon the energization of a magnet 716 controlling a single revolution clutch.

The linkage (Figs. 12 and 25) by which the interposer bar positioning cam 708 operates the interposer bars includes a following roller 736 pivoted to a bell crank 738. The bell crank is fastened to the rear end of a sleeve 740 which is rotatably mounted on a second sleeve 742 rotatable on a shaft 744 supported upon the base casting 300 by brackets 746. Fastened to the front end of the sleeve 740 is a lever 748. A cross bar 750 extends between the upper ends of the bell crank 738 and the lever 748 to form a bail. The bail operates upon the right side of a plurality of levers 752 which are pivoted at their lower ends on the sleeve 740. The levers are urged against the cross bar 750 of the bail by individual tension springs 754. One end of each spring 754 is fastened to a corresponding lever 752 while the other end is attached to a cross member 756 mounted on offset portions of the bell crank 738 and lever 748 so as to be parallel with the cross bar 750.

The upper end of each lever 752 is connected to the slidable member 638 on each of the interposer bars 632 through a link 758. Each link is pivotally connected at its ends to the corresponding lever and slidable member and is guided by an upwardly projecting lug 760 which is slidably received within a corresponding slot formed in a horizontal plate or comblike member 762 secured in spaced relation beneath the horizontal plate 622 by rods 764.

The interposer bar restoring cam 710 also is operatively connected with the interposer bars through the levers 752. It operates a linkage which includes a follower 766 attached to a lever 768. This lever is fastened to the front end of the sleeve 742 while another lever 770 is fastened to the rear end thereof. These levers mount a cross bar 772 which is disposed to the left of the levers 752.

The bails continuously follow the contour of their respective cams. To this end a spring 774 is stretched between a lug 776 formed on the crank 738 and a lug 778 formed on a lower extension of the lever 770. The spring urges the bail having the cross bar 750 clockwise (as seen in Figs. 12b and 25) and the bail having the cross bar 772 counterclockwise. In each case the cross bars are biased away from the levers 752. It will be noted, however, that the springs 754 individually urge each of these levers 752 toward the cross bar 750. The strength of the spring 774 is greater than the combined pull of all of the springs 754 so that the roller 736 will always position the cross bar 750 according to the contour of the cam 708. Of course, the cams are so formed that the operations of the respective bails do not interfere with each other.

From a consideration of the structure described, it will be apparent that a high point on the cam 708 will force the interposer bars to the left and that a high point on the cam 710 will force the bars to the right. It will also be evident that a low point on the cam 708 will result in a yieldable movement of the interposer bars to the right. Therefore, while there can be no stopping of the slidable members 638 when they are being moved to the right by the cam 710 and when they are being moved to the left by the cam 708 if no damage to the apparatus is to take place, they may be stopped while the interposer bars are being yieldably urged to the right through the action of the spring 774 causing the roller 736 to follow a low point on the cam 708. It is during such a movement that the stop pawls 668 position the interposer pins over the positions occupied by the switches of a section in the switching station by engaging the notches 698 on the slidable members. The zoning of the interposer bars does not interfere with the movement to the left of the slidable members as the detents 644 unseat from the notches 650 in the bars 632 to allow continued movement of the slidable member after the interposer bar has been stopped.

The linkage by which the stop pawl restoring cam 712 acts to swing the restoring bail 700 so as to restore released stop pawls 668 to an inactive position in which they are latched up includes a follower 780 attached to a lever 782. This lever is pivoted on the fixed shaft 744 and is pivotally connected at its lower end (as viewed in Figs. 12 and 26) to a horizontally extending link 784. The right hand end of this link is pivoted to a lever 786 which is fastened to the front end of a shaft 788 rotatably supported in brackets 790 extending downwardly from the base casting 300 of the machine. The rear end of this shaft has fastened to it a lever 792 which is pivotally connected at its free end with the lower end of a link 794. The upper end of this link is connected to the bent horizontal arm of a bell crank 796 which is mounted on a bracket 798 fixed upon the flat plate 622. The other arm of the bell crank 796 extends downwardly and has pivoted to it the right hand end of the shiftable member 800. The shiftable member 800 is slidably supported near its left hand end by a bracket 802 fixed upon the plate 622 and having a stud 804 which projects through a slot 806 formed in the member 800. At its end the shiftable member 800 is provided with a stud 808 which extends forwardly through the slot 810 formed in the rear vertical plate 256. The lever 704 fixed to the restoring bail 700 is held against the stud by the spring 706. The spring 706 not only holds the restoring bail 700 in an inoperative position but also acts through the shiftable member 800 and the rest of the associated linkage to hold the cam follower 780 against the stop pawl restoring cam 712 at all times. When a high point on the cam 712 engages the roller 780, it effects a shifting to the left of the member 800 which acts through its stud 808 to swing the restoring bail so as to latch up any released stop pawls 668. There are two such high points on the cam 712 as the restoring bail must be operated twice each time the interposer bars undergo the series of three operations.

The cam shaft 714 has been denominated the main cycle shaft since the period of its revolution coincides with the main cycle of the machine one revolution. To effect the proper timing of the machine components, shaft 714 has associated with it a series of cam operated contacts which open and close circuits at fixed times during the main cycle. More specifically, eight bakelite cams are fixed on the shaft, and they respectively operate eight contacts designated MC1, MC2, MC3, MC4, MC5, MC6, MC7, and MC8.

The timing of the switch selecting mechanism operating mechanism may be seen in Fig. 30. The main cycle begins with the engagement of the single revolution clutch on the shaft 714 and has a duration equal to that of three card feed cycles. Fig. 30 has been conveniently divided through the use of vertical lines A, B, and C to show the three card feed cycles or thirds of periods of the main cycle. The latch point of the shaft 714 is along the line A. The three operations undergone by the interposer bars occur respectively in the three periods of the main cycle.

Thus, in the first period of the main cycle, the interposers are restored to the right and into positions of alignment which correspond with that shown in Fig. 12. The start of the main cycle finds the interposer bars disposed according to the designations of the last preceding card. Early in the first third period of the main cycle, a high point on the cam 708 engages the roller 736 to effect a movement of all the slidable members 638 on interposer bars 632 to their extreme left hand position in order that every stop pawl 668, which had been seated in a notch 698 in the slidable members in the previous main cycle, will be free for latching up. Thereafter, the first high point on the stop pawl restoring cam 712 moves the follower 780 to swing the bail 700 so as to restore all of the released stop pawls 668 to a position in which they are latched up by the latch 686. Following that, all of the interposer bars are moved to the right by the interposer bar restoring cam 710 to align the interposer pins 630 by engaging the interposer bars with the cross piece 636 and forcing all of the detents 644 which were seated in the left hand notches 648 thereout and reseating them in the right hand notches 650 after the corresponding slidable members 638 on the interposer bars have been moved. The alignment of the interposer elements is completed before the end of the first third period or card feed cycle and thus they are ready for zoning during the second third period.

The second third period of the main cycle takes place simultaneously with the control station card feed cycle. This is effected by having one of the cam operated contacts, MC2, on the shaft 714 close a circuit energizing the magnet 408 of the card feeding and sensing unit at the close of the first third period. This causes the clutch 388 to engage at the beginning of the second third period to start a card through the control station. Thereafter, the interposer bars are moved to the left by one of the high points on the cam 708. Since in the embodiment shown, there are but two zones in each switchboard section, namely, the left hand or "0" zone and the right hand or "1" zone, this leftward interposer movement is timed so that the interposer pins 630 pass over the positions occupied by the heads of the "1" zone of a section at the switch station at about the time the "1" index point position on the cards passes the sensing brushes 308 at the control station. Now if the "1" index point position on one of the card columns read at the control station is perforated, the respective magnet 654 will be energized to release the stop pawl 668 in time to engage in its notch 696 the upwardly projecting lug 670 on the corresponding interposer bar. This will stop the associated interposer pin 630 over the head of the first zone. The corresponding slidable member 638 will continue movement to the left, along with the other interposer bars whose corresponding card columns contained no perforation at the "1" index point position because the detent 644 unseats itself from the right hand notch 650. The cam 708 stops moving the slidable members when the interposer pins which were not stopped earlier are disposed over the head of the left hand or "0" zone and the unseated detents 644 associated with the arrested interposer bars engage in the left hand notches 648.

Once the interposer bar positioning cam 708 has effected a disposition of the interposer pins 630 in their positions over the heads of the respective zones, it is also operative through a dwell portion to hold them there during the remainder of the second period and part of the first portion of the third period. The stop pawls 668 thus are no longer needed and a second high point on the stop pawl restoring cam 712 engages the follower 780 at the end of the second period to operate the bail 700.

At this time the card fed at the start of the second period will have completed its passage (card feed cycle) through the control station and begun its passage through the reading station.

Before the "0" index point positions in the card columns pass the reading brushes 316, the stop pawl restoring bail 700 will have been allowed by the cam 712 to return to its normal position in which it is out of the path of the upstanding lugs 688 on the stop pawls, and the interposer bar positioning cam 708 will have begun to recede from the high point which included the dwell. This allows the bail, of which the cross bar 750 is a part, to rotate clockwise gradually under the influence of the spring 774. Since the levers 752 are urged toward the cross bar 750 by the springs 754, they will also be moved clockwise gradually, though yieldably, and will in turn move the interposer bars slowly to the right. The range of uninterrupted interposer bar movement will be such as to move the associated pins 630 across their particular zones. The movement of the interposer pins over the positions occupied by the switches in the respective columns of the particular zone of a section at the switching station is in step with the movement of the "0" to "9" index point positions on the card passed the sensing brushes 316 in the reading station. Now, if a perforation occurs in a card column at one of these index point positions, the corresponding magnet 654 will be energized to release the associated stop pawl 668 so that the latter will engage a notch 698 on the corresponding slidable member 638. As the bar was moving in step with the card, it will have been stopped so that its pin 630 is disposed over the position occupied by the switch having the same relation to the other switches in its zone column that the perforated index point position has to the other index point positions in its card column. If no perforation occurs in the card column for the particular interposer pin, the bar will be moved so as to dispose its pin beyond the end of the zone at head of which it was stopped. It will be observed that the interposer bar restoring cam 710 which forcefully moved the interposer bars to the right during the first period to align them does not move the bars to the right during the third period, and that the resilient urging by the springs 754 associated with the interposer bar positioning cam bail enabled the stop pawls 668 to fixedly hold the interposer pins over the respective switches.

The end of the main cycle finds the interposer pins over the positions occupied by the switches they are to close. The record card will have been disposed in the stacker S of the card feed unit and the released stop pawls will be left in engagement with the respective slidable members 638. They will be restored in a succeeding main cycle.

*Drive to the main cycle shaft*

As has already been stated, the shaft 714 may be drivenly connected with the electric motor 332 mounted on the extension 334 of the base casting 300 upon energization of the magnet 716. As may be best seen in Figs. 11, 12, 15, and 18, the drive includes an idler gear 812 mounted on a suitable stud 814 so as to mesh with the gear 340 fixed to the shaft 336 continuously rotatable by the electric motor 332. The idler gear 812 also meshes with a gear 816 rotatably mounted on the main cycle shaft 714 and which thus rotates continuously. The gear 816 is fastened to a sleeve 818 which carries the usual single notched driving element 820 of the single revolution clutch. Pinned to the shaft 714 is the usual clutch arm 822 to which is pivoted the usual dog 824. The dog 824 is normally held out of engagement with the driving element 820, toward which it is biased by a spring 823, by a pivoted latch 826 pivoted on a suitable stud 828. The latch 826 also cooperates with a keeper 830 to hold the clutch arm 822 and thus the shaft 714 against rotation when the dog 824 is latched up. Energization of magnet 716 attracts the latch 826 which also constitutes the magnet armature. This allows the spring 823 to pull the dog 824 into engagement with the driving element 820. In this way, if the magnet 716 is pulsed, the shaft 714 will be rotated for one revolution as the latch 826 will be biased to a position by the spring 832 in which it will disengage the dog 824 after one revolution of the clutch arm 822.

It will be observed that both the main cycle shaft 714 and the elements of the card feeding and sensing unit are driven through toothed gearing from one motor. Hence, the parts may be so designed that they operate in a fixed relation to each other even though the parts are operated only intermittently, since the clutch elements, that is, the single notched ratchets and the pawls, engage only when the ratchet reaches a fixed point in its revolution.

*Switch opening mechanism*

The switch opening or reset mechanism is operable upon a switchboard section that has been moved to the switching station. It acts to raise the reset plate 244 of that section so that the latter engages the underside of the heads 222a of the connectors 222 of the switches 204 which had been closed and moves the connectors upward to a switch opening position. In this way all of the switches in the section may be restored to an open condition before any switches are closed by the switch closing mechanism.

The switch opening mechanism includes, as may be best seen in Figs. 12, 20, 21, 22, 23, 24, and 26, a pair of vertically-movable horizontally-extending bars 834 between which the raised portion 210 of a switchboard bearing the section is received as the section is moved into the switching station. These bars normally rest beneath the extensions of the reset plate 244 upon a pair of horizontally extending members 836 secured to the adjacent sides of the vertical plates 628 depending from the horizontal support plate 622. These members 836 are received in the depressions formed on each side of the section by the guide members 216 (Fig. 4) and the raised portion 210 so as to locate the movable bars 834 beneath the respective lateral edges of the section reset plate. The bars 834 are movably supported upon the respective members 836 by pairs of parallel links 838 so mounted that when an endwise force is applied to the bars tending to move them to the right, they undergo vertical translation and engage the underside of the reset plate extensions to raise the reset plate to the position shown in Fig. 23. The right hand ends of the bars 834 are interconnected by a rod 840, and a spring 842 reacts between a lug 844 on one of the bars and the right hand interposer bar support 654 to bias the bars to the left to the position in which they rest upon the members 836. The bars 834 have the upper surfaces of their right hand extensions cut away at 846 so that when a left hand section of the switchboard is at the switching station, the bars do not engage the underside of the reset plate of the corresponding right hand section.

*Switch closing mechanism*

The switch closing or set mechanism acts to depress all of the interposer pins 630 carried by the interposer bars 632. If the vertically slidable pin of a bar was disposed over the position occupied by one of the connectors in a corresponding switch column during the main cycle, its depression, when the section is at the switching station, will cause its lower end to engage the head 222a of the connector 222 to depress it and close the corresponding switch 204. While it also operates those interposer pins which were not stopped by the action of a stop pawl 668 but rather were disposed beyond the position occupied by the end of the particular zone, no damage arises therefrom as space is provided beneath those pins to allow for the free movement thereof.

The switch closing mechanism includes as may best be seen from a consideration of Figs. 12, 19, 20, 21, 22, 24 and 26, an upwardly biased plate-like member 848 which is movable downwardly to depress the interposer pins 630. A support member 850 is mounted above each of the switch opening mechanism support members 836 on the vertical plates 628 and supports at each of its ends a vertically extending stud 852. The upwardly biased plate-like member 848 is perforated at each of its four corners and through these perforations is mounted for vertical reciprocatory movement upon the studs 852. A compression coil spring 854 surrounds each of the studs and reacts between the upper surface of the corresponding support member 850 and the bottom surface of the plate-like member 848 to yieldably urge the latter upwardly.

This upwardly biased condition of the plate-like member 848 is utilized to bias to a restored condition each of the interposer pins 630 passing through the interposer bars 632. The biased plate-like member is slotted transversely on its lower side to slidably accommodate the shanks of the interposer pins 630 and is provided with enlarged hollow interiors in which the headed ends of the interposer pins are received. The headed ends of the interposer pins are made greater in diameter than the width of the slot so that the interposer pins must necessarily follow the upward and downward movement of the biased member 848. However, the transverse slots are of such size as to readily accommodate the horizontal movement that the interposer pins undergo when the interposer bars are reciprocated across the switching station.

The downward movement of the plate-like member 848 over the resistance of the compression coil springs 854 is effected by a pair of bars 856 movably mounted upon support members 858 secured to the vertical side plates 628 above the support members 850 on which the plate-like member 848 is mounted. These bars 856 are movably supported by pairs of parallel links 860 interconnecting them with the respective support members 858. The bars are interconnected with each other at their right hand ends by a rod 861. A spring 862 reacting between a lug 864 on one of the bars 856 and a hook 866 attached to the bottom surface of the plate 622 urges the bars to the left until they rest against the bottom surface of the respective support members 858 as shown in Fig. 21. Thus the bars are moved downward when a force is applied tending to move them to the right to a position shown in Fig. 22. In this position, the bars will have depressed the plate-like member 648 and all of the interposer pins.

*Operating mechanism for the switch opening and closing mechanisms*

The switch opening and switch closing mechanisms are sequentially operable in the order named. In the normal course of machine operations, their operation is effected immediately after the main cycle has been completed and the switchboard section has been located at the switching station during what has been termed the reset and set or RS&S cycle. The RS&S cycle is determined by one revolution of a sleeve member 868 formed integrally with two cams 870 and 872 (see Figs. 11, 12, 16, 25, and 26). Cam 870 acts during the first half of the sleeve revolution or RS&S cycle to operate the switch opening or reset mechanism, and cam 872 acts during the final half of the revolution or RS&S cycle to operate the switch closing mechanism.

The cam 870 for operating the switch opening mechanism is a single lobed one. It operates upon a follower 874 rotatably mounted on a pivoted arm 876. The lower end of this arm is pivotally connected to the left end of a link 878 (Fig. 24), the other end of which passes through a slot formed in a bracket 880 depending from the bottom of the base casting 300. The right hand end of this link is formed with a laterally projecting pin 882 which is normally engaged with the hook formed on the left hand end of a bar 884 pivotally connected at its right hand end to the depending arm of a bell crank 886 pivotally mounted on the shaft 788. The other or horizontally extending arm of the bell crank 886 is pivotally connected to a lower end of a link 888 which is pivotally connected at its upper end to the free end of a horizontally extending arm 890 fixed to a shaft 892. A pair of parallel arms 894 are also fixed to the shaft 892 and extend upwardly therefrom. The free ends of these parallel arms are pivotally connected to the right hand ends of links 896 which are pivotally connected at their left hand ends to reset plate raising bars 834 through the interconnecting rod 840. In operation, when the cam 870 is rotated, the lever 876 is pivoted clockwise to pull the link 878 and bar 884 to the left and rotate the bell crank 886 clockwise. This moves the link 888 downward and rotates the levers 890 and 894 clockwise to pull the links 896 to the right and thus the reset plate raising arms 834 to the right which will then rock about their pivotal connections on the parallel links 838 to raise the reset plate 244 of a section in the switching station.

The link 878 is connected with the bell crank 886 through the bar 884 to permit the elimination of the switch opening operation without disturbing the switch closing operation, as when a second card pertains to the same section for the purpose of closing additional switches. It will be evident that a readily separable connection has been provided between the link 878 and the bar 884 which can be broken by merely raising the bar, thus rendering movement of the link 878 ineffective upon the switch opening or reset mechanism.

The raising of the bar 884 is effected by a magnet 898 supported above the bar on a bracket 899 attached to the depending bracket 790. The armature for this magnet is embodied as an offset portion 900 of the bar 884. Thus when the magnet 898 is energized and attracts its armature 900, the bar 884 will be raised to disconnect its hooked end from the laterally extending pin 882 on the end of the link 878 extending through the bracket 880. The bracket 880 acts to support the link in a position in which the laterally extending pin may be re-engaged by the hooked end of the bar 884, and spring 902 reacting between an eyebolt 904 on the bracket and a lug 906 on the horizontal link acts to hold the follower arm 876 against the cam and thus the link in a position in which it is accessible to the hooked bar.

The linkage for operating the switch closing mechanism is generally similar to that of the switch opening mechanism. Its operating cam 872 is also of the single lobe type and acts upon a follower 908 mounted on an arm 910 depending from and pivotally mounted on the shaft 744. The lower end of this arm is pivotally connected to the left hand end of a link 912 slidably supported at its right hand end in a slot formed in the bracket 880 depending from the base casting 300. The extreme right hand end of the link is provided with a laterally extending pin 914 which is normally engaged by the hooked end of a bar 916 pivoted at its other or right hand end to the depending arm of a bell crank 918. The bell crank 918 is pivotally mounted on the shaft 788 supported by the bracket 790 and has its other or horizontally extending arm pivotally connected to the lower end of a generally vertical link 920. The upper end of this link 920 is pivotally connected to the free end of a horizontal arm 922 fixed to a shaft 924 supported by the vertically depending side plates 628. A pair of parallel arms 926 are fixed to the shaft 924 and extend upwardly therefrom to where they are respectively connected to a pair of generally horizontal links 928. The left hand ends of these links are pivotally connected to the interposer plate depressing gears 856 through their interconnecting cross member 861.

In operation, the cam 872 is rotated, the lobe thereon forces the follower 908 to the left. The arm 910 is thus swung to the left about its pivot on the shaft 744 to pull the link 912 and bar 916 to the left. This rotates the bell crank 918 clockwise and pulls the vertical link 920 downward to rotate the arms 922 and 926 clockwise. Links 928 will thus be moved to the right and will in turn move the bars 856 of the switch closing or setting mechanism to the right and downwards to operate the interposer plate 848.

The bar 916 is used to connect the link 912 with the bell crank 918 to permit the elimination of the switch closing or setting operation without disturbing the operation of the switch opening mechanism as when it is desired to open the switches in all of the sections before closing them in any one section. Like the bar 884 in the linkage for operating the switch opening or resetting mechanism, the bar 916 is readily uncoupled from its associated link, and movement, thereafter, of the link 912 can have no effect upon the switch closing or resetting mechanism.

The bar 916 is raised upon the energization of a magnet 930. The magnet is supported above the bar 916 by a bracket 931 attached to the depending bracket 790. The armature of the magnet is an offset portion 932 of the bar 916. Thus when the magnet 930 is energized and attracts its armature, the bar 916 will be pivoted about its connection with the bell crank 918 so that its hooked end will be uncoupled from the pin 914 on the link 912. A spring 934 reacting between an eyebolt 936 on the bracket 880 and a lug 938 on the link 912 maintains the cam follower 908 against the cam 872 and, thus, the link 912 projecting through its slot in the bracket 880 so that the pin 914 thereon may be reengaged by the hooked end of the bar 916 dropping when the magnet 930 is deenergized.

The period of revolution of the sleeve 868 bearing the cams 870 and 872 is equal to one card feed cycle. Thus the duration of the reset and set or RS&S cycle is one card feed cycle. As shown in Fig. 31, the lobe on the reset cam 870 is operative during the first half of the RS&S cycle while the lobe on the set cam is operative during the last half of that cycle.

Drive to the operating mechanism for the switch opening and switch closing mechanism This operating mechanism (Figs. 11, 12, 15, and 18) is driven by the electric motor 332 through the continuously rotatable gear 816 in the drive for the operating mechanism for the switch selecting mechanism. A gear 940 is mounted integrally and coaxially with the gear 816 and in turn drives a gear 942 which is rotatably mounted on a shaft 944 supported in the base casting 300 by suitable brackets (not shown). The gear 942 is formed integral with a sleeve 946 and a single notched ratchet or driving element 948 of a single revolution clutch. A clutch arm 950 is pinned to the shaft 944 and the usual biased clutch pawl 952 is pivoted to the clutch arm. The clutch pawl is held out of engagement with ratchet 948 by a latch 954. A keeper 956 cooperates with the latch to hold the shaft 944 against rotation while the pawl is latched up. The latch 954 constitutes the armature of a magnet 958 which when energized attracts the latch and allows the biased pawl 952 to engage the driving element 948. It the magnet is pulsed, the shaft 944 will be rotated through one revolution. A gear 960 is fastened to the shaft 944 and meshes with a similarly toothed gear 962 coaxial and integral with the cam bearing sleeve 868 rotatably mounted on the shaft 114. Hence the cams 870 and 872 are rotated through one revolution when the magnet 958 is pulsed.

For the purpose of making and breaking circuits at fixed times during the reset and set cycle, the shaft 944 is also provided with a plurality of cams. As may be best seen in Fig. 11, these cams operate four contacts which have been respectively designated RS&S1, RS&S2, RS&S3, and RS&S4.

Switchboard movement control mechanisms

These mechanisms initiate, direct and end the movements of the switchboard cradle 430 in the machine. It will be remembered that, during the second period of the main cycle when the record card moved through the control station, the section number was read and stored. It is upon the information stored that the switchboard movement control mechanisms act to effect movement of the mounted switchboard so as to dispose, by the most direct route within the mechanical limitations of the machine, the designated section at the switching station. They also act to effect a return of the switchboard to the unloading position after the last card has been processed through the machine. They include direction and incidence commutators which indicate the column and row, if any, of the switchboard section presently aligned with the switching station and the direction of the column and the row containing the designated section; limit switches which indicate whether or not the mounted switchboard is in the "home" position in the different directions; and pulse contacts which are operated to initiate the movements in the different directions.

RL direction and incidence commutator

This commutator (Figs. 12, 13 and 14) indicates the present position of the switchboard in the RL direction and the course that the switchboard must undergo in that direction to dispose the designated section at the switching station. The commutator is controlled by the drum cam shaft 440 which carries at its right end a worm gear 964. This worm gear meshes with a worm wheel 966 fastened to a shaft 968 which is journalled in a bracket 970 fastened upon the base casting 300. This shaft drives a helical gear 972 which meshes with an identical helical gear 974 fastened to a shaft 976 also journalled in the bracket. This shaft has fastened to it a disc 978 upon which is fixed a radially extending conducting finger or distributor 980 and an arcuate conducting segment 982. A ring 984 made of a suitable insulating material is fastened to the bracket 970 by means of screws 986. The ring has fixed upon it a brush or wiper 988 which bears against the center and generally circular portion of the conducting finger or distributor 980 and a series of four brushes 990 which may be contacted by the outer end of the conducting finger or distributor 980 and/or by the arcuate conducting segment 982 depending upon the position of the disc 978. The gearing between the drum cam shaft 440 and the disc 978 is such that two revolutions of the drum cam shaft are required to move the conducting finger or distributor from one brush to an adjacent brush. This same movement will cause the arcuate conducting segment 982 to contact one more or one less of the series of four brushes. The arcuate conducting segment is of such length that, when the switchboard cradle is in a home position in the RL direction and the conducting finger or distributor engages the right hand brush as seen in Fig. 13, it will contact the other three of the series of four brushes 970.

RL limit contacts

These contacts are provided for the purpose of opening and closing various circuits as the switchboard cradle is moved into and out of the home position in the transverse direction. A series of contacts have been placed under the control of a cam 992, which is geared to the RL drum shaft in such a manner that as the switchboard cradle approaches the home position in the RL direction it will first open normally closed contacts 994 and later, when it arrives in the home position, normally closed contacts 996. It will also transfer points 998 and 999 to open the former and close the latter. The contacts are supported by a bracket 1000 mounted upon the base casting 300 so that an extension of one of the contacts 994 is disposed in the path of a lobe formed on the cam 992.

The drive for the cam 992 is as follows: A gear 1002, fastened to the shaft 968 which drives the commutator in step with the movement of the RL drum cam 436, drives a gear 1004 rotatably about a stud 1006 fastened in the bracket 970. The cam 962 is fixed to the gear 1004 and rotates therewith.

BF direction and incidence commutator

Figure 28C:
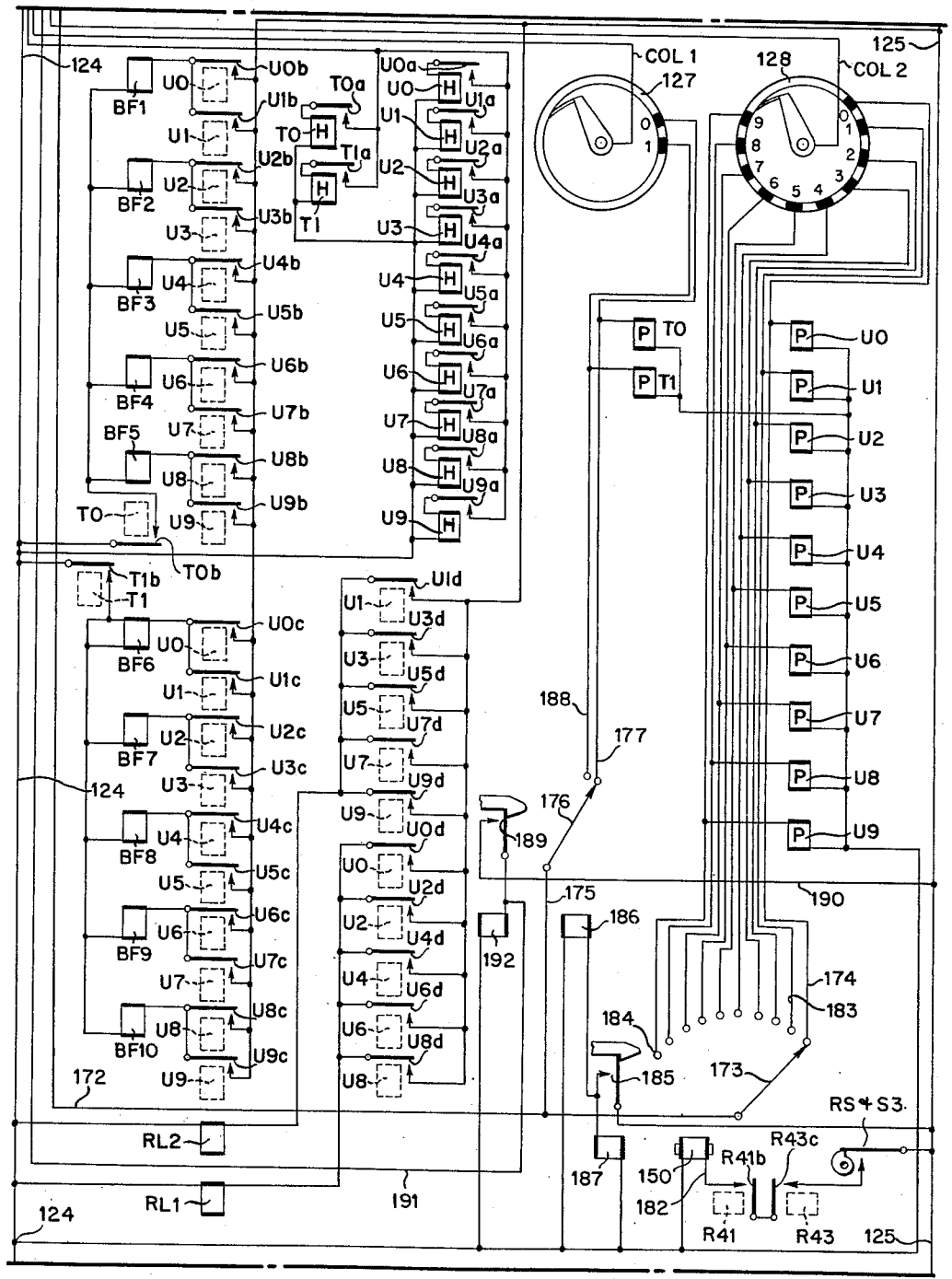
Figure 28D:
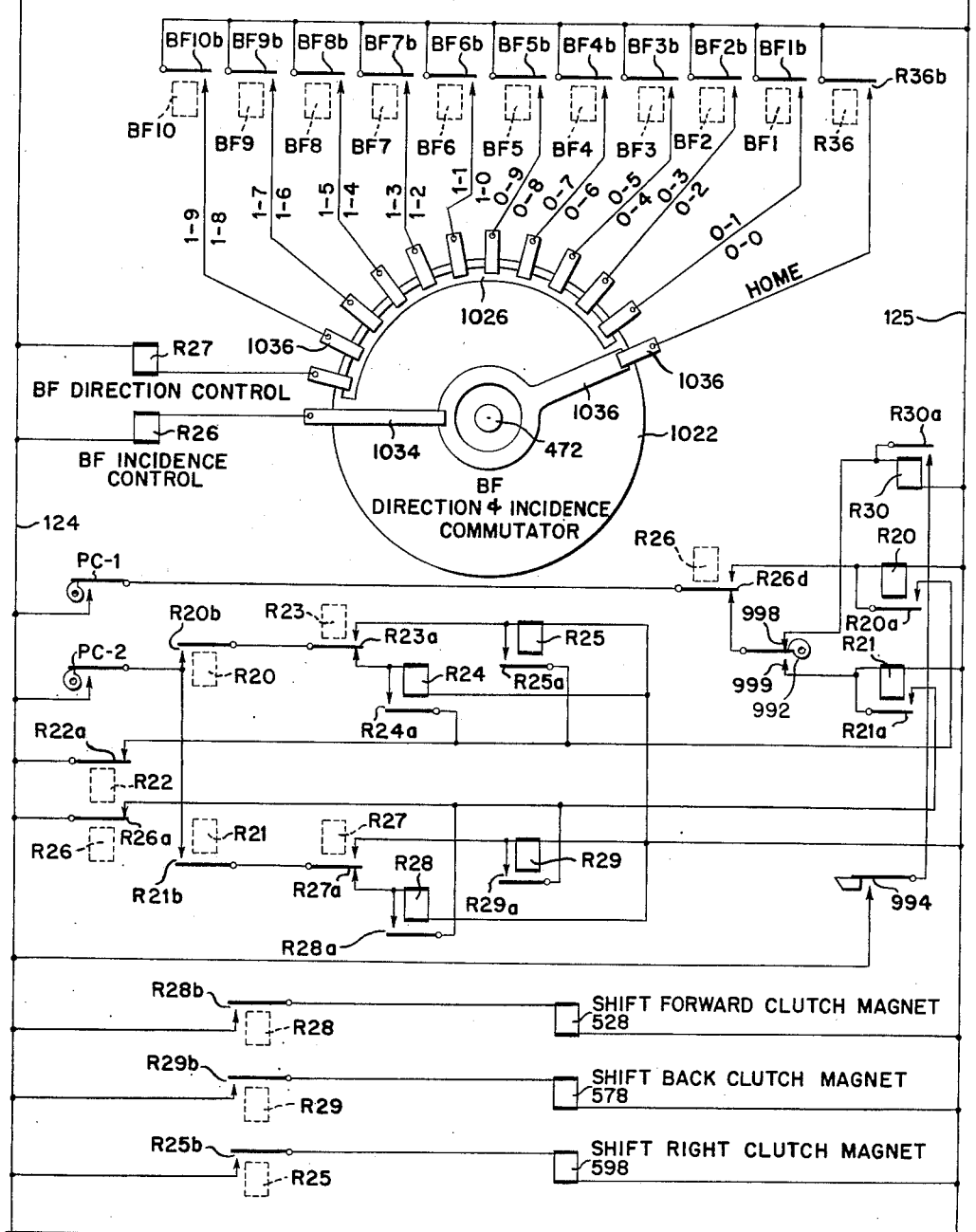
Figure 28E:
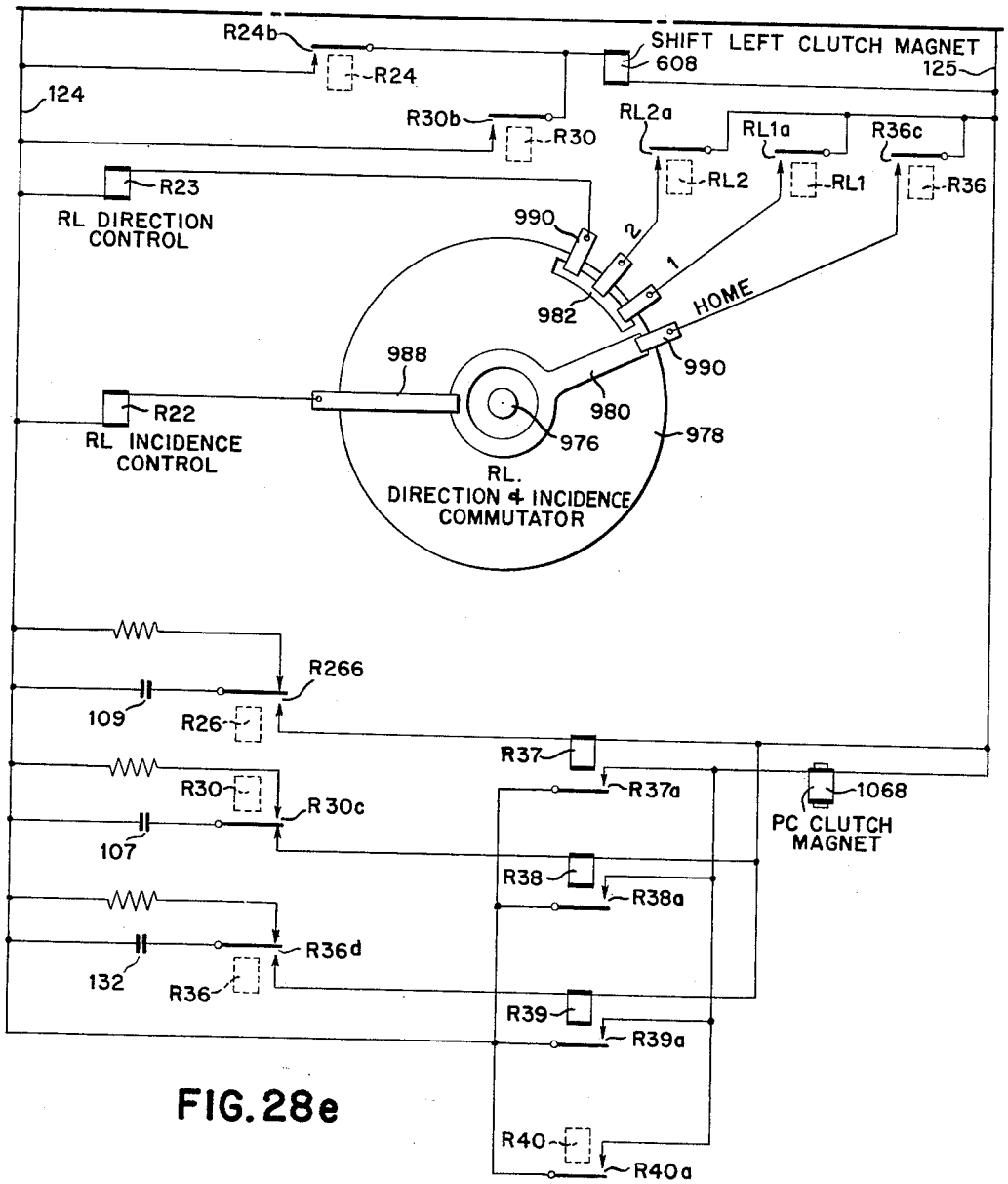

This commutator (Fig. 16) is moved in step with the BF drum cam 468. The drum cam shaft 472 has fastened to it at its left end a worm gear 1008 which meshes with a worm wheel 1010 fastened to the upper end of or vertical shaft 1012. This shaft is journalled in a bracket 1014 secured to the transversely movable frame 428 and drives a helical gear 1016 which meshes with a helical gear 1018 fastened to a horizontal shaft 1020 also journalled in the bracket 1014. This shaft has fastened to it a disc 1022 (Fig. 28d) made of suitable insulating material. A conducting finger or distributor 1024 and a conducting segment 1026 are mounted upon it in a manner similar to that of the RL direction and incidence commutator. The disc rotates in a ring 1028 made of a suitable insulating material and fastened to a movable frame 428 by posts 1030 and screws 1032. Like the RL commutator, the ring 1028 has fastened to it a brush or wiper 1034 which makes electrical contact with the center and circular portion of the conducting finger or distributor 1024. Instead of four brushes as on the RL commutator, twelve brushes 1036 are provided here which can make contact with the conducting finger 1024 and/or conducting segment 1026 depending upon the position of the disc as determined by the drum cam. The relationship between the disc 1022 and the drum cam shaft 472 is such that one revolution of the shaft is required to move the conducting finger and the conducting segment from one brush to an adjacent brush. Thus when the switchboard is moved backwards or forward so as to dispose an adjacent transverse row in alignment with the switching station, the conducting finger 1024 will be moved to the adjacent brush and the conducting segment 1026 will contact either one more or one less of the brushes 1036. When the switchboard is in a home position in the BF direction the conducting finger engages an end brush as seen in Fig. 28d and the conducting segment contacts all of the remaining brushes.

BF limit contacts

These contacts are provided for the purpose of stopping the switchboard cradle movement when the cradle arrives in the home position in the BF direction. It includes a pair of normally closed contacts 1038 (Fig. 16a) which are opened by a cam 1040 when the cradle is disposed in the "home" position.

The cam 1040 is moved in step with the drum cam shaft 472. A gear 1042 is fastened to the lower end of the shaft 1012 used to drive the BF direction and incidence commutator and drives a gear 1044 rotatably about a stud 1046 fastened in the transversely movable frame 428. The cam 1040 is attached to the gear 1044 and rotates therewith. A lobe formed on the cam 1040 will engage an extension of one of the contact members 1038 to open them. The gearing between the drum cam shaft and the cam is such that the cam will open the contacts only when the switchboard is in its home position.

Pulse contacts

The pulse contacts (Fig. 11b) provide when operated a pair of pulses separated by a fixed time interval. They include a pair of normally open contacts, PC1 and PC2, which are successively closed by a pair of cams 1048 and 1050. The cams are the usual Bakelite contact operating cams which momentarily close the respective contacts, and they are attached to sleeve 1052 rotatably mounted upon the main driving shaft 336. Also attached to the sleeve is the usual clutch arm 1054 (Fig. 15a) of a single revolution clutch of well known form previously described. A clutch dog 1056 is pivoted to the clutch arm and is normally held, by a latch 1058 and a keeper 1060 pivoted on a stud 1062 mounted on a bracket 1064, out of engagement with the usual single notched clutch driving element 1066 fastened to the main driving shaft 336. Energization of the usual clutch magnet 1068 attracts the latch 1058 which also serves as the magnet's armature and allows a spring 1070 to pull the dog 1056 into engagement with the driving element.

Switchboard positioning circuits

The electric circuits of the machine are diagrammatically shown in Figs. 28a through 28e. For the purposes of clarity, the description of the circuits has been divided on the basis of the functions performed by the different circuits, namely, switchboard positioning, machine driving, resetting and setting of the switchboard, and selective resetting and initial resetting of the complete switchboard. The circuits which control the shift forward clutch magnet 528, the shift back clutch magnet 578, the shift right clutch magnet 598, and the shift left clutch magnet 608 and thus the positioning of a mounted switchboard are discussed first.

The section number is sensed at the control station and thus during the second third period or card cycle of the main cycle. Two card columns are employed to record the section number as the number of sections on the switchboard is greater than the number of perforated index point positions in a card column. The two card columns may conveniently be those which are perforated at the "1" and "3" index point positions at the left hand edge of the record card shown in Fig. 2. The right hand one of these two columns may be used to indicate the unit order of the section number while the column to the left of it may be used to indicate the tens order. Thus by properly punching the card, two different electrical impulses may be generated which by the time of their occurrence indicate the section number. The timing of the impulses which may occur at the control station during the second third period because of perforations at different index point positions are shown in Fig. 30.

To sense the section number, two of the brushes 308 at the control station must be employed, and in Fig. 28b, these are shown as being the two left hand ones of the brushes 308. Associated with these brushes are emitters 127 and 128. The emitter 127 is connected to the brush for the tens order column while the emitter 128 is connected to the brush for the units order column. The movements of the distributor fingers of the emitters are synchronized with that of the card through the control station so that conducting segments in each emitter which correspond with the index point positions used in the respective card columns may be engaged by the respective distributor fingers when the corresponding index point positions pass the control brush positions. Emitter 127 is provided with but two such conducting segments, one of which is engaged by the distributor finger when the "0" index point position is at the control brush and the second of which is engaged when the "1" index point position is thereat. Emitter 128 is provided with ten conducting segments which are so disposed as to be respectively engaged by the distributor finger as the "0" to "9" index points in the unit columns pass the control brushes.

The different segments are disposed in different circuits which are utilized to energize the pickup coils of certain relays, the relays associated with the emitter 127 being designated as the "T" relays because they represent the tens orders whereas those associated with the emitter 128 are designated as the "U" relays because they represent the units orders. There are but two relays associated with the emitter 127 and they are designated T0 and T1 and are respectively energized when the "0" and the "1" index point positions of the control cards are perforated. The ten U relays are designated U0, U1, U2, U3, U4, U5, U6, U7, U8, and U9; and they are respectively energized when the "0" through "9" index point positions in the units column are perforated.

It will be appreciated that the energization of the "T" relays and the "U" relays because of the perforated index point positions is but momentary. To store the information which has been sensed, these relays are provided with hold coils H in addition to their pickup coils P. The holding coils H are placed in holding circuits by "a" contacts which are in series with the respective holding coils and are closed when the corresponding pickup coils are energized. Thus the "T" relays are respectively held energized by contacts T0a and T1a whereas the U relays are respectively held energized by the contacts U0a through U9a.

Each of the U relays operates three additional sets of contacts which are designated as the "b" contacts, "c" contacts and the "d" contacts. The "T" relays respectively close one other set of contacts designated as the "b" contacts. The operation of these contacts is used to energize relays representative of the row and column in which the designated section occurs and designated respectively as the backward-forward or "BF" relays and the right-left or "RL" relays.

Figure 1:
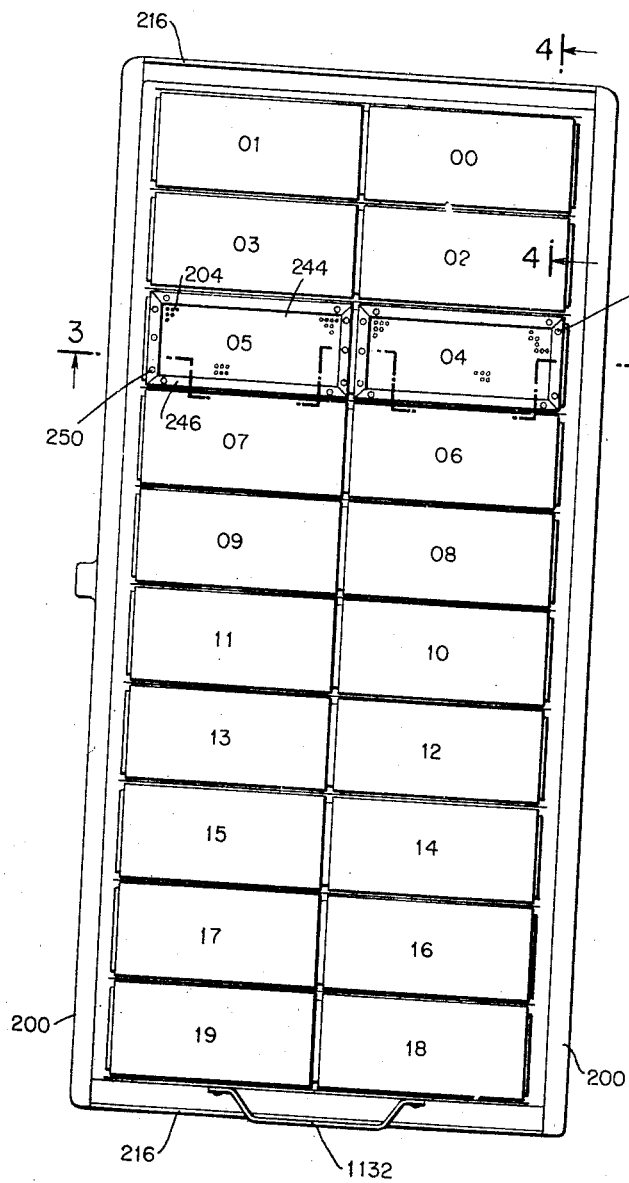
Fig. 1 is a plan view of a removable switchboard constructed according to the invention.
Figure 4:
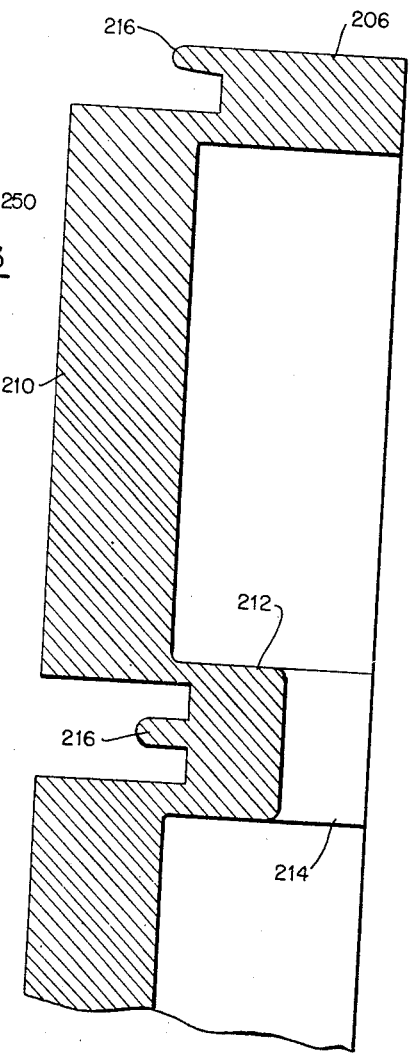
Fig. 4 is a fragmentary sectional view taken along the line 4—4 of Fig. 1.

Referring to Figs. 1 and 11d, it will be evident that the switchboard sections have been numbered in an orderly fashion from right to left and from rear to front. It will also be seen that the numbers of all of the sections in the right hand column have an even units numeral while the numbers of all of the sections in the left hand column have an odd units numeral and that the sections whose numbers have a "0" in the tens order are in the rear half of the switchboard while those whose numbers have a "1" in the tens order are in the front half of the switchboard.

From the above it is manifest that the energization of the "RL" relay representative of the column containing the designated section may be obtained by placing the "RL" relays respectively under the control of the even numbered unit relays and the odd numbered unit relays. Thus, the relay RL1, representative of the right hand column, has been placed in series parallel with the "d" contacts of relays U0, U2, U4, U6, and U8, and hence will be energized whenever one of these relays is energized. Relay RL2, representative of the left hand column is in series parallel with the contacts U1d, U3d, U5d, U7d, and U9d, and will be energized whenever one of the corresponding relays is energized.

Since the units order numerals are repeated in the section numbering and the tens order numerals each pertain to more than one row, the energization of the "BF" relay representative of the row containing the designated section cannot be determined only by the operation of one of the tens or units order relays. However, as a units numeral appears but once in the numbering of the sections in the back half of the switchboard and similarly in the numbering of the sections in the front half of the switchboard, the energization of the "BF" relay representative of the row containing the designated section may be had by placing the "BF" relays under the joint control of the tens and units order relays. Thus the "BF" relays representative of the rows in the back half of the switchboard may be respectively energized by a joint operation of the T0 relay and the relay of one of the two unit numerals occurring in the numbers of the sections in the respective rows. Similarly, the "BF" relays representative of the rows in the front half of the switchboard may be respectively energized by a joint operation of the T1 relay and the relay of one of the two unit numerals occurring in the numbers of the sections in the respective rows. Relays BF1, BF2, BF3, BF4, and BF5, have been disposed in series with the T0b contacts and respectively with the U0b and U1b contacts, the U2b and U3b contacts, the U4b and U5b contacts, the U6b and U7b contacts, and the U8b and U9b contacts. Similarly relays BF6 through BF10 have been placed in series parallel with the appropriate "c" contacts of the unit relays and in series with the contacts T1b.

The right-left or "RL" relays respectively operate to close pairs of "a" contacts connecting the corresponding segments 990 of the RL direction and incidence commutator representative of the different columns of a switchboard to one side of a power source, specifically line 125. Similarly, the backward-forward or "BF" relays respectively operate to close pairs of "b" contacts connecting the corresponding segments of the BF direction and incidence commutator representative of the different section rows of a switchboard to the power line 125. It will be evident that a pair of the "a" contacts and a pair of the "b" contacts will be held closed as long as the hold coils of corresponding "T" and "U" relays are held energized. As will become apparent later, the circuits through these hold coils are broken only after the indicated switchboard section has been disposed at the switching station.

It will be recalled that the movements of the switchboard cradle along both directions are effected mechanically upon the energization of certain clutch magnets and that the amount of a movement is dependent on the length of time that the corresponding magnet is held energized. The movements are not precisely related to length of time that the magnets are energized, as the clutches controlled by the magnets operate through at least one revolution or cycle whether or not the corresponding magnet is immediately deenergized and through additional revolutions if the corresponding magnets are still energized at the completion of the prior revolutions. Each clutch revolution produces an increment of movement sufficient to dispose an adjacent column or row of the switchboard sections in alignment with the switching station. Thus the magnets may be de-energized at any time after the start of the first revolution without interfering with the eventual alignment of a corresponding switchboard section column or row with the switching station.

The clutch magnets are disposed in individual circuits. Each magnet is disposed in series with at least one switch which, when closed, completes the circuit through the magnet. The shift forward clutch magnet 528 is disposed in series with a pair of contacts R28b, the shift back clutch magnet 578 with a pair of contacts R29b, and the shift right clutch magnet 598 with a pair of contacts R25b. The shift left clutch magnet 608 is disposed in series parallel with two pairs of contacts R24b and R30b, either of which, when closed, completes the circuit through the magnet. Hence, it will be evident that by providing a suitable control for these contacts, any desired switchboard cradle movement may be obtained.

The control of the contacts in the clutch magnet circuits is effected through the "RL" and the "BF" direction and incidence commutators. Each of these commutators, as has been pointed out, is provided with a common brush and additionally, with a brush for each position that the switchboard cradle may occupy along the direction of which it is representative, namely, one for each column or row of sections of a switchboard and one for the home position in which none of the columns or none of the rows is aligned with the switching station. The position brushes of each commutator are arranged in the order in which the respective positions may be occupied by the switchboard cradle in moving from the home positions and in which they will be engaged by the fingers 980 and 1024 of the assiciated commutators. The common brush of each commutator is located next to the last position brush to be engaged by the respective finger.

The common brush of each commutator, it will be recalled, is continuously engaged by the respective conducting segment 982 or 1026 which also engages all of the brushes which lie behind that engaged by the respective conductive finger. Thus whenever the pair of RLa contacts, in the case of the "RL" commutator, or the pair of BFb contacts, in the case of the "BF" commutator, of a brush located behind the brush presently engaged by the respective finger are closed, a potential circuit will be set up through the corresponding common brush and conducting segment. It should be observed that such a circuit is set up whenever the indicated switchboard section lies in a column or row to the left or fore of those presently aligned with the switching station and that thus the switchboard cradle must undergo movement to the right or rear in order to align the column or row with the switching station. Conversely, when the indicated switchboard section lies in a column or row to the right or rear of those presently aligned with the switching station, no circuit will be set up through the common brush even though the switchboard section must undergo movement to the left or fore. Summarizing, whenever the switchboard cradle must be moved to the right or rear a potential circuit will be setup through the common brush of the respective commutator; and when it must be moved to the left or fore, no such circuit will be set up.

On the other hand, since the finger of the corresponding commutator will already be in engagement with the brush whose associated RLa or BFb contacts are closed to connect it to one side of the power source when a column or row of the indicated section corresponds with that presently aligned with the switching station, a potential circuit will be set up through the corresponding finger wiper 986 or 1034. The potential circuit will also be set up through the wipers when a column or row of the indicated section is brought into alignment with the switching station.

The commutators exercise their control through a series of four relays. The course of movement in the right-left or "RL" direction is determined by the RL direction control relay R23 in series with the common brush of the "RL" direction and incidence commutator. Relay R23 controls a set of transfer contacts R23a in series parallel with relays R24 and R25. Relay R24 controls the set of transfer contacts R24b in the shift left magnet 574 circuit, and, hence, leftward movement of the switchboard cradle. It is disposed in series with the normally closed points of the transfer contacts R23a, and so unless relay R23 is energized, a potential circuit for effecting leftward movement is set up in the machine. Thus the machine is normally disposed to move the switchboard cradle to the left.

As has been stated, when the cradle should undergo a movement to the right, a potential circuit will be set up through the common brush. This will energize relay R23. A potential circuit will now be set up through the normally open points of transfer contacts R23a and the relay R25. Relay R25 controls the normally open contacts R25b in the circuit of the shift right clutch magnet 598, and hence, the machine will be disposed to move the switchboard cradle to the right whenever the column of the indicated switchboard section is presently disposed to the left of the switching station.

The "BF" direction and incidence commutator controls the course of movement in the backward-forward or "BF" direction through a relay R27 in series with its common segment. Relay R27 effects the "BF" direction control through a set of transfer contacts R27a in series parallel with relays R28 and R29. Relay R28 controls the contacts R28b in the circuit of the shift forward clutch magnet 528 and is in series with the normally closed points of the transfer contacts R27a. Thus the machine is normally conditioned to effect a forward shifting of the switchboard cradle.

The relay R27 is picked up when a potential circuit is set up in the common one of the brushes 1036. This results in a transfer of the contacts R27a and set up a potential circuit through a relay R29 instead of the relay R28. Relay R29 controls the normally open contacts R29b in circuit with the shift back clutch magnet 578, and, hence, the machine will be conditioned to move the switchboard cradle to the rear whenever the row of the indicated switchboard section is presently disposed in front of the switching station.

The other two of the four relays through which the commutators exercise control over the shifting of the switchboard cradle are respectively connected in series with the wipers 988 and 1034 of the commutators. Relay R22 is associated with the wiper 988 and hence will be energized whenever the column of a switchboard containing the designated section comes into alignment or incidence with the switching station. Relay R22 controls a normally closed switch R22a in the holding circuits for relays R24 and R25 which control the circuits through the shift left and shift right clutch magnets 608 and 598. Relays R24 and R25 are picked up by a pulse, as will be explained later, and held by respectively closing normally open contacts R24a and R25a in series with their respective relays and the normally closed switch R22a. Thus it will be seen that, as the switchboard column containing the designated section enters the switching station and the conducting finger 980 engages the corresponding brush, the relay R22 will be picked up, the energized one of relays R24 or R25 will be dropped, the energized one of the shift left or shift right clutch magnets will be dropped, and the RL movement of the switchboard cradle will be stopped at the end of the clutch cycle, at which point the column containing the indicated section will be also aligned with the switching station.

The incidence relay R22 also prevents the momentary energization of the relay R24 in series with the normally closed points of the transfer contacts R23a when the column of the switchboard containing the designated section is already aligned with the switching station, as otherwise the shift left clutch magnet 608 might be operated, thus releasing that clutch for one cycle. To this end the normally closed contacts R22a are also disposed in the holding circuit of a relay R20. Relay R20, in addition to controlling a pair of normally open contacts R20a in its holding circuit, also controls a normally open switch R20b in series with the transfer contacts R23 which, it will be recalled, are in series parallel with the relays R24 and R25. Relay R20 is picked up by a pulse, which occurs, as will be explained later, before that to which the relays R24 and R25 are subjected, and hence, unless relay R20 is being held up by its holding circuit through the contacts R22a, the second pulse will not reach either of the relays R24 and R25 because the contacts R20b will be open. Thus the normal disposition of the machine to effect a leftward movement of the switchboard cradle is prevented from taking effect even though no circuit was set up through the common brush 990 and relay R23.

The last of the four relays through which the commutators control the shifting of the switchboard cradle is the BF incidence control relay R26. Relay R26 is in series with the wiper 1034 and hence will be energized whenever the row of a switchboard containing the designated section comes into alignment or incidence with the switching station. It controls a normally closed switch R26a in the holding circuits for the relays R28 and R29 which control the circuits through the shift fore and shift back clutch magnets 528 and 578. Like relays R24 and R25, relays R28 and R29 are picked up by a pulse and held by respectively closing normally open contacts R28a and R29a in series with their respective relays and the normally closed contacts R26a. Since the conducting finger 1024 engages the corresponding brush 1036, as the switchboard row containing the designated section comes into alignment or incidence with the switching station, the relay R26 will be picked up in time to open the contacts R26a and drop the energized one of the relays R28 and R29 which will in turn open the respective one of the pairs of contacts R28b and R29b and thus drop out the shift fore clutch magnet 528 or the shift back clutch magnet 578. The switchboard cradle movement will be stopped as the corresponding clutch latches up and the row of the indicated section is fully aligned with the switching station.

Relay R26 also checks the normal inclination of the machine to effect a forward shift of the switchboard cradle when the switchboard row containing the indicated section is already aligned with the switching station. This is accomplished by also disposing the normally closed R26a contacts in the holding circuit of a relay R21. Relay R21, in addition to controlling a pair of normally open contacts R21a in its holding circuit, also controls a normally open pair of contacts R21b in series with the transfer contacts R27a which are in series parallel with the relays R28 and R29. Like relay R20 which controls the contacts R20b in series parallel with the relays R24 and R25, R21 is picked up by a pulse which occurs before that to which the relays R28 and R29 are subjected, and hence, unless relay R21 is being held up through the contacts R26a, the second pulse will not reach either of relays R28 or R29 because the contracts R21b will be open. Thus there will be no energization of the shift fore or shift back clutch magnets when the row containing the designated section is already aligned with the switching station.

The sources of the spaced pulses for operating the relays R20 and R21 and the relays R24, R25, R28, and R29 are the cam controlled pulse contacts PC1 and PC2. The sequential closing of these contacts, it will be remembered, are effected once each time the PC clutch magnet 1068 is pulsed, because the clutch sleeve 1052 Fig. 11b) on which the cams 1048 and 1050 controlling the normally open contacts PC1 and PC2 are mounted, is rotated once each time the clutch is tripped. As is evident from an inspection of the timing chart shown in Fig. 30, the pulse contacts PC1 and PC2 are closed at fixed points in the main cycle MC so as to initiate movement of the switchboard cradle on the basis of the information which was sensed and analyzed during the second portion thereof. To close the contacts at those points, a pair of normally open contacts R40a disposed in series with the PC clutch magnet 1068 are closed. The control for the contacts R40a will be explained later.

The pulse contacts PC1, which are closed first, are disposed in series with the common element of a set of transfer contacts R26d. The normally open points of the transfer contacts are connected in series with the relay R20, while the normally closed points are connected in series with the common element of the set of transfer contacts having the normally closed points 999 and the normally open points 998. The latter are connected in series with the relay R30 while the former are connected in series with the relay R21.

The pulse contacts PC2 are connected in series parallel with the normally open contact elements R20b and R21b, the closure of which determines along what direction the switchboard cradle will undergo movement. Thus, if one or the other of relays R20 or R21 is being held when the contacts PC2 close, a cradle movement will be effected.

Returning to the transfer contacts R26d, they are transferred whenever the relay R26 is energized. Thus, when the row of the indicated section corresponds with that presently aligned with the switching station, no backward or forward movement of the cradle is necessary, and the pulse emanating from the contacts PC1 is directed to the relay R20 which controls the contacts R20b in series with the PC2 contacts. Relay R20 will hold through the closing of its contacts R20a if the contacts R22a are closed. Therefore, the pulse which emanates from the contacts PC2 will be directed through the transfer contacts R23a to one or the other of the relays R24 and R25 depending on the location of the designated section with respect to that presently at the switching station. The energized one of the relays R24 and R25 will hold by closing its contacts R24a or R25a in circuit with the closed R22a points. The energized relay will also close the contacts R24b or R25b in the shift left clutch magnet or the shift right clutch magnet circuits, thereby effecting a leftward or rightward switchboard cradle movement according to whether or not the relay R23 was energized. The movement will be terminated by the picking up of relay R22 which will open up the contacts R22a in the holding circuits of the relays R24 and R25, thus dropping the energized relay. The closed contacts in the shift left or shift right clutch magnet circuits will be opened to drop the corresponding magnet and permit the corresponding clutch to latch up at the end of its cycle.

On the other hand, if the column of the indicated section was also aligned with the switching station, that is, if the indicated section was that presently disposed thereat, relay R22 would have been energized and the contacts R22a would have been open. Thus, the relay R20 would not have held after being pulsed by the closing of contacts PC1, and when the contacts PC2 closed, the contacts R20b would have been open. Hence, neither of the relays R24 or R25 would have been picked up and no cradle movement would have ensued.

When the row of the designated section is other than that presently aligned with the switching station, relay R26 will be in a deenergized condition and the common element of the transfer contacts having points 998 and 999 will be in circuit with the pulse contacts PC1. The transfer contacts, it will be recalled, are operated by the cam 992 so that the points 998 are closed when the cradle is not at "home" in the "RL" direction and the points 999 are closed when the cradle is "home" in that direction. These points, along with relay R30 and associated instrumentalities, are necessary because the sections of a mounted switchboard cannot be moved through the switching station in the "BF" direction but must be moved through it in the "RL" direction for the reason that the reset plate raising bars 834 (Fig. 26) are disposed along the side of the section in the switching station so as to be beneath the reset plate 244 thereof. Hence, when the row of the designated section is other than that of a section presently aligned with the switching station, the PC1 pulse is delivered to the relay R30.

The relay R30 effects the necessary leftward movement of the switchboard cradle to the "RL" home position by closing the normally open contacts R30b in the circuit of the shift left clutch magnet 608. A holding circuit is provided for the relay R30 as otherwise the shift left clutch magnet would be latched up at the end of one cycle without the switchboard cradle necessarily being "home" in the "RL" direction. The holding circuit includes the normally closed contacts 994 which are operated by cam 992 so as to open when the cradle approaches the "RL" home position thus enabling the relay R30 to hold the shift left clutch magnet energized until some time after the clutch enters the last cycle necessary to dispose the cradle in the "RL" home position. The relay R30 picked up the holding circuit by closing its contacts R30a.

Now that the switchboard cradle has been moved to a home position in the "RL" direction, it can be moved backward or forward to align the row containing the designated section at the switching station. This requires another operation of the PC clutch magnet 1068 which is effected this time by the relay R30 when it is deenergized. Relay R30 controls a pair of transfer contacts R30c, the common element of which is connected to a capacitor 107. When the relay 30 was energized, the transferred points of the contacts R30 connected the capacitor in series with a resistor which permitted it to discharge. Upon the dropping of relay R30, the normally closed points of the contacts R30c are connected in series with a relay R38. The capacitor charges up and produces a pulse through the relay R38. Relay R38 then momentarily closes a set of contacts R38a in series with the PC clutch magnet. The PC clutch magnet will be momentarily picked up, thus releasing the PC clutch for one cycle again.

This time the pulse from the PC1 contacts is directed to the relay R21 because relay R26 will not as yet have been energized to pick up relay R26 and the transfer points 999 are closed when the cradle is home in the RL direction. Relay R21 will hold upon closing its contacts R21a because the contacts R26a in series with them will not have been opened by relay R26 as no switchboard column is aligned with the switching station. Thus, the contacts R21b will be closed when the PC2 contacts are closed and one or the other of the relays R28 or R29 will be energized according to whether or not the row of the designated section is rearward or forward of the switching station as explained above.

The ensuing cradle movement in the "BF" direction is brought to a halt upon thte picking up of relay R26 which occurs, as has been explained, as the row comes into alignment with the switching station. Relay R26 opens the contacts R26a in the holding circuit for each of the relays R28 and R29, the energized one of which is thus dropped and breaks the circuit through the shift forward or shift backward clutch magnets 528 and 578. The corresponding clutch, of course, latches up at the end of its revolution or cycle at which time the row will be in perfect alignment with the switching station.

The switchboard cradle is now in a condition for a shift right movement aligning the column containing the designated section with the switching station. With both the row and the column containing the designated section in alignment with the switching station, the designated section will be thereat.

This final shift right movement is initiated by the relay 26 at the same time that it acts to stop the movement in the "BF" direction. Relay 26 also controls transfer contacts R26b, the common element of which is in series with a capacitor 109. The normally closed points of these contacts are in series with a resistor enabling the capacitor to discharge while the relay R26 is deenergized. Thus, when relay R26 is picked up and transfers contacts R26b, the capacitor charges up through a relay R37 thereby pulsing it. Relay R37 thus momentarily closes a set of normally open contacts R37a in series with the PC clutch magnet to pulse the latter. Contacts PC1 and PC2 will then be operated again.

The picking up of relay R26 will also have transferred contacts R26d with the result that the PC1 pulse is delivered to relay R20. Relay R20 will hold by the closing of its contacts R20a because the normally closed contacts R22a in series therewith will not have been opened by relay R22 for the reasons explained hereinbefore. Thus the PC2 pulse will be delivered to relay R25 because contacts R23a will have been transferred when the colournn containing the designated section was moved to the left of the switching station during the shift left movement and a circuit was completed through the corresponding one of the brushes 990, the conducting segment 982, the common one of the brushes 990, and the relay R23. Relay R25, of course, closes the contacts R25b in the circuit of the shift right clutch magnet 598 to energize the magnet which then unlatches and maintains unlatched the associated clutch. A movement of the cradle to the right ensues.

The shift right movement terminates as the column containing the designated section comes into alignment with the switching station. At this time relay R22 is energized, as hereinbefore explained, and it opens the normally closed contacts R22a to drop the relay R25. This permits the contacts R25b to open, thus dropping the magnet 598. The shift right clutch then latches up at the end of its cycle with the column containing the designated section aligned with the switching station. The designated section is now at the switching station and may be operated upon by the switch opening and switch closing mechanisms.

It may be observed at this point that if the switchboard cradle had already been home in the "RL" direction, a condition which occurs when the cradle is home in both directions, that is, in the loading and unloading position, there is no need for an initial shift left movement, and that, therefore, a backward movement of the cradle may be initiated by the contacts PC1 and PC2 the first time they are operated. The PC1 pulse will be directed to the relay R21 instead of relay R30 as the points 999 will be closed instead of points 998. The cradle will be shifted thereafter in the same manner that it would have been had the shift left movement necessary to permit another row to be aligned with the switching station taken place first.

Specific illustrations of the operation of the switchboard shift circuits will now be set forth. Since the cradle is normally disposed in the position in which it is home in both directions when the switchboard is inserted into the machine, the movements undergone from the loading and unloading position to dispose a designated section at the switching station will be described first.

Let it be assumed that the first card fed through the machine is perforated at the zero index point positions in the two card columns read by the control brushes 308 associated with the emitters 127 and 128. Thus, the card calls for the disposition at the switching station of the switchboard section 00 in the first or rearmost row and the first or righthand column. It will be appreciated that to move section 00 into the switching station a shift to the rear followed by a shift to the right is required.

As the card passes through the control station, a circuit will be momentarily completed from line 125 which constitutes one side of the power source, through the circuit breakers CC2 and CC3, the card lever contact CLC2, the main cycle cam operated contacts MC3, the common brush 308 for roll 310, common roll 310, the zero perforation in card column 1, control brush 308 in column 1, rotating brush of emitter 127, the zero segment of that emitter, the pickup coil P of relay T0, to line 124 which constitutes the other side of the power source. A second circuit will be completed from the common roll 310 through the zero perforation in card column 2, control brush 308 in column 2, rotating brush of emitter 128, the zero segment of that emitter, the pickup coil P of relay U0, to line 124. The relays T0 and U0 will hold through the closing of their "a" contacts which complete circuits extending from line 124, the respective hold coils, the respective "a" contacts, the normally closed cam contacts RS&S1, to line 125. The combination of relays T0 and U0 being energized results in relay BF1 being energized. The circuit through relay BF1 extends from line 124 through the now closed T0b contacts, relay BF1, contacts U0b now closed, to line 125. Relay RL1 is also energized because the U0d points have been closed. The circuit through relay RL1 extends from line 124, relay RL1, now closed contacts U0d, to line 125. Accordingly, the contacts RL1a associated with the RL direction and incidence commutator will be closed. The BF1b contacts associated with the BF direction and incidence commutator are also closed. Because the cradle is home in both the "BF" and "RL" directions, the fingers 980 and 1024 on the RL and BF direction and incidence commutators are on the brushes 990 and 1036 corresponding to the home positions. Contacts 999 are closed due to the carriage being in the home position in the RL direction.

Thereafter, at a fixed point in the main cycle MC, the contacts R40a are closed to pick up the PC clutch magnet 1068. The pulse contacts PC1 and PC2 will then be closed at the points indicated in the timing chart of Fig. 30. The pulse circuit for cam contacts PC1 now extends from line 124, contacts PC1, nontransferred points of contacts R26d, closed contacts 999, relay R21, to line 125. Relay R27 is energized because conducting segment 1026 bridges the common one of the brushes 1036 which is connected to relay R27 and the brush connected to the now closed BF1b contacts. Relay R23 is energized because the conducting segment 982 bridges the common one of the brushes 990 connected to relay R23 and the brush connected to the now closed RL1a contacts. Relay R21 holds up through its now closed R21a contacts and the now closed R26a contacts.

When cam contact PC2 closes a circuit will be completed from line 124 through the now closed R21b contacts and the now transferred R27a contacts, relay R29, to line 125. Relay R29 holds through its R29a contacts and the now closed R26a contacts. The closure of the R29b contacts energizes clutch magnet 578 which, as explained previously, will cause a shift backward of the switchboard cradle and counterclockwise rotation of the shaft 472 and disk 1022 as viewed in Fig. 28d.

When the finger 1024 on the BF direction and incidence commutator makes contact with the brush 1036 connected to the BF1b contacts, relay R26 becomes energized, thus opening the R26a contacts and dropping out relays R21 and R29. The R26b contacts will transfer and connect the capacitor 109 in series with relay R37 thus causing it to become energized momentarily. The R37a contacts will thus close and momentarily energize the PC clutch magent 1068 again.

This time when cam contact PC1 makes, it will complete a circuit from line 124 through the now transferred R26d contacts and relay coil R20 to line 125. Relay R20 holds through the now closed R20a contacts and the now closed R22a contacts.

The closure of cam contacts PC2 will complete a circuit from line 124 through the now closed R20b contacts, the now transferred R23a contacts, and relay coil R25 to line 125. Relay R25 holds through the now closed R25a contacts and the now closed R22a contacts. Relay points R25b will close, energizing clutch magnet 598 which will cause the switchboard cradle to make a shift to the right and also cause counterclockwise rotation of shaft 976 and disk 978 as viewed in Fig. 28e. When the finger 980 contacts the brush 990 connected to the RL1a contacts, relay R22 becomes energized and opens the contacts R22a to drop relay R25 which in turn permits contacts R25b in the shift left clutch magnet circuits to open. With both relays R22 and R26 energized, the switchboard will come to rest with the section 00 at the switching station.

To demonstrate moving of the switchboard so as to dispose another section in the same row at the switching station, let it be assumed that with the cradle in the 00 position, the next card calls for section 01. For this type of operation no BF shift is required and it is necessary only to move the cradle to the right. In this case relays T0 and U1 will be energized as were relays T0 and U0 in the case before. The combination of relays T0 and U1 causes energization of relay BF1. Relay RL2 will be energized due to the now closed U1d points. As the finger 1024 is on the brush 1036 connected to the now closed BF1b contacts, the relay R26 will be energized and the R26b and R26d contacts will be transferred.

Thereafter, the PC clutch magnet 1068 becomes energized due to the closing of the contacts R40a at the fixed point in the main cycle MC. When the contacts PC1 close, they complete a circuit from line 124 through contacts PC1, now transferred R26d contacts, and relay R20 to line 125. Relay R20 holds through the now closed R20a contacts and the now closed R22a contacts. Relay R22 is not energized because the finger 980 is on the brush 990 connected to contacts RL1a and these contacts are not closed. Relay R23 is energized because the conducting segment 982 bridges the common brush 990 connected to relay R23 and the brush 990 connected to the now closed RL2a contacts.

When contacts PC2 close, a circuit will be completed from line 124 through the PC2 contacts, now closed R20b contacts and the now transferred R23a contacts, and relay R25 to line 25. Relay R25 will hold through the now closed R25a contacts and the now closed R22a contacts. The R25b contacts will complete a circuit from line 125 through the R25b contacts, and the clutch magnet 598, to the line 125. The picking up of magnet 598 will cause the switchboard cradle to make a shift to the right. When the finger 980 contacts the brush 990 connected to the now closed RL2a contacts, a circuit will be completed through relay R22 thus opening the points R22a and dropping out relays R20 and R25. The dropping of relay R25 will drop the magnet 598 and the switchboard will come to rest with the 01 section at the switching station.

An example of the movement undergone by the switchboard when the next section to be disposed at the switching station is in another row is as follows: With the cradle positioned in the 01 position, assume that the next card calls for section 12. Relays T1 and U2 will thus be energized. Because the T1b contacts and U2c contacts are now closed, relay BF7 will be energized. Due to the closure of the U2d contacts, relay RL1 will also be energized. The RL1a contacts will be closed and the BF7b contacts will also be closed. Relay R27 will be energized because the brush 1036 connected to the relay R27 contacts the conducting segment 1026 on which the brush 1036 connected to the BF7b contacts rests. Relay R23 will not be energized because at the start of this cradle positioning operation, finger 980 is in contact with the brush 990 connected to the RL2a contacts. The conducting segment 982 will thus be in its extreme counterclockwise position as viewed in Fig. 28e and cannot complete a circuit to relay R23.

To move the section 12 into the switching station, it is first necessary to move the cradle to the home position in the RL direction. When the pulse contacts PC1 close, they will complete a circuit from line 124, through the PC1 contacts, the nontransferred points of contacts R26d, now closed contacts 998, and relay R30, to line 125. Relay R30 holds through its R30a contacts and the now closed contacts 994. Points R30c transfer to discharge capacitor 107. The R30b contacts complete a circuit from line 124 through the contacts R30b, and the clutch magnet 608, to line 125. The picking up of magnet 608 causes the cradle to shift to the left as viewed in Fig. 12c.

The cradle is stopped in the RL home position by the opening of contacts 994 slightly before the cradle reaches the home position. The opening of contacts 994 drops out relay R30. The R30b contacts open to deenergize clutch magnet 608 and stop the cradle movement to the left.

When relay R30 was dropped out, the transfer contacts R30c restored to the position shown in the wiring diagram (Fig. 28e), and completed a circuit from line 124, through capacitor 107, normally closed points of contacts R30c, and relay R38, to line 125. Relay R38 is thus momentarily energized to close the contacts R38a and cause momentary energization of the PC clutch magnet 1068.

When the contacts PC1 close, a circuit will be completed through the transfer points 999 as these points were closed when the carriage reached the home position in the RL direction and through relay R21. The energization of relay R21 causes the R21a contacts to close and set up the holding circuit for relay R21 through the now closed R26a contacts. Relay R21 also closes the R21b contacts; and when cam contacts PC2 make, a circuit will be completed from line 124, contacts PC2, now closed R21b contacts, transferred points of contacts R27a, and relay R29, to line 125. Relay R29 holds through the R29a contacts and the now closed R26a contacts. The R29b contacts close and cause a circuit to be completed through clutch magnet 578. The energization of clutch magnet 579 causes the cradle to shift to the rear as viewed in Fig. 12c. This backward shift will continue until the finger 1024 on the BF direction and incidence commutator contacts the brush 1036 connected to the now closed BF7b contacts. When this happens, relay R26 becomes energized and opens the R26a contacts to drop out relays R21 and R29. The dropping of relay R29 permits the R29b contacts to open and effect a deenergization of the clutch magnet 578.

The energization of relay R26 also initiates movement of the cradle to the right. The R26b contacts transfer and connect capacitor 109 in series with relay R37 thus causing momentary energization of that relay. The R37a contacts close momentarily causing energization of the PC clutch magnet 1068. When the pulse contacts PC1 close, a circuit will be completed from line 124, through contacts PC1, now transferred contacts R26d, and the relay R20, to line 125. Relay R20 holds through the R20a contacts and the now closed R22a contacts.

It should have been observed that when the cradle returned to the home position in the RL direction, relay R23 became energized due to the action of the conducting segment 982 bridging the common brush 990 connected to the relay R23 and the brush 990 connected to the now closed RL1a contacts. Consequently, when the pulse contacts PC2 close, a circuit will be completed from line 124, contacts PC2, now closed R20b contacts, transferred points of contacts R23a, and relay R25, to line 125. Relay R25 holds through the R25a contacts and the now closed R22a contacts. The R25b contacts also were closed to energize clutch magnet 598 which caused the cradle to shift to the right as shown in Fig. 12c. This shift to the right will continue until the finger 980 contacts the brush 990 connected to the RL1a contacts at which time a circuit will be completed to energize relay R22. The opening of the R22a contacts will drop out relays R21 and R25 and the switchboard cradle will thus be disposed in the 12 position, that is, the position in which the 12 section is at the switching station.

*Machine driving or motor circuits*

The machine is placed in an operating condition with the closing of a sentinel switch 115. Conventionally, 110 volts A. C. is applied to this sentinel switch 115, and when it is closed, this A. C. voltage is applied to lines 116 and 117. A pair of heavy duty relays HD1 and HD2 are connected across these lines and are energized when the switch is closed. The heavy duty relay HD1 is adapted to close a pair of normally open contacts HD1a to provide a circuit through the drive motors 332 and 492 disposed in parallel with each other. The heavy duty relay HD2 closes a pair of normally open contacts HD2a to provide a circuit through the driving motor 120 of a D. C. generating unit 123. This circuit extends from line 117, through motor 120, contacts HD2a and line 121, to the other side of the A. C. line on the supply side of the sentinel switch 115. The motor 120 drives the generator 123 which applies D. C. to lines 124 and 125.

*Start and stop circuits*

The operation of the card feeding and sensing section and hence of the whole machine is dependent on the presence of cards in the hopper H (Fig. 12a). When cards are placed in the hopper, they engage the hopper lever HL to close the hopper lever contacts HLC and energize a relay R31. Relay R31 remains energized, as long as cards are in the magazine, to hold closed a pair of normally open contacts R31b in a circuit which must remain completed as long as all the cards in the hopper H are to be methodically processed past the control and reading stations. This is the same circuit in which the stop key is located.

Depression of the start key at this time will not result in a continuous operation of the machine; instead, it will merely effect one card feed cycle involving a transfer of the bottom record card in the hopper H to a position in front of the control station. The start key circuit extends from line 125 through the start key ST, normally closed contacts R41f, and relay R34, to line 124. Relay R34 controls a pair of normally open contacts R34a in series with the card unit clutch magnet 408 and with the machine cycle clutch magnet 716. Thus, it is necessary that relay R34 remain energized if the machine is to be placed on a self-running basis.

The holding circuit for relay R34 includes in addition to relay R34 and contacts R34b controlled by it, normally open contacts R31b and R32b, stacker switch SS which opens only when the stacker S is loaded, and stop key SP. Thus, even though contacts R31b have been closed because of the presence of cards in the hopper H, the machine cannot be put on a self-running basis the first time the start key ST is depressed because the closing of the contacts R32a is dependent on the presence of the card, yet to arrive, in front of the control station, as will be explained.

The closing of the contacts R34a completes a circuit through the normally closed points of transfer contacts R32a, cam contacts CC3, and the card unit clutch magnet 408 to initiate the card feed cycle. The energization of the clutch magnet 408 will cause the bottom card in the hopper H to be fed up to the control brushes where it engages a card lever CL1 to close the card lever contacts CLC1. The closure of contacts CLC1 completes a circuit through a relay R32 to energize it. The picking up of relay R32 transfers the contacts R32a to interrupt the circuit through cam contacts CC3 and the clutch magnet 408 thus causing the card unit clutch to latch up at the end of the first revolution. At the end of the card feed cycle, the card will be positioned with the leading edge about to pass the control brushes.

The machine may now be placed in continuous operation since a hold circuit for relay R34 may now be completed from line 124 through relay R34, the R34b contacts, the now closed R31b contacts, the now closed R32b contacts, the stacker switch SS, and the stop key SP. It will be evident that unless the start key ST is held depressed for a period of time, two depressions thereof are necessary to place the machine in continuous operation. It will also be evident that the operation of the machine will automatically be stopped whenever all the cards have been fed from the hopper H because relay R31 will be dropped and permit the contacts R31b in the hold circuit for relay R31 to open and also whenever the feed knives fail to deliver a card to the position in front of the control station as then the relay R32 will drop out and open contacts R32b in the relay R34 hold circuit. It results that the machine stops when the last card has been removed from the hopper H and disposed in front of the control station and that a depression of the start key is necessary to effect a processing of the last card through the machine. The stacker switch SS, of course, effects an opening of the relay R34 holding circuit in the event that the stacker S is overloaded with cards.

The second time that the start key ST is depressed, it initiates the main cycle instead of just another card feed cycle. The transfer of the contacts R32a provides a circuit through the main cycle clutch magnet 716 instead of the card unit feed clutch 408 which is as follows: Line 125, now closed contacts R34a, transferred points of contacts R32a, normally closed R33b contacts, and the main cycle clutch magnet 716, to line 124. Thus, a machine clutch cycle is initiated if a card is in front of the control station.

In the first third portion or 120 degrees of the main cycle, the interposer bars are restored and the main cycle clutch magnet 716 is dropped to prevent a repetition of the cycle. The cam shaft 714 is rotated through one revolution during this cycle, and near the end of the first third portion thereof it rotates a cam to where it closes contacts MC2. This results in the energization of the magnet 408 which unlatches the card unit clutch. The card unit clutch will engage at the start of the second third portion of the main cycle so as to effect a card feed cycle during the second third portion or 120 degrees of the main cycle. The picking up of the magnet 408 is obtained by the closing of the cam contacts MC2 which complete a temporary circuit through the magnet 408 independently of the transfer contacts R32a and contacts R34a. The circuit is opened before the end of the card feed cycle so that the card unit clutch latches up at the end of the second third portion of the main cycle.

The card feed cycle occurs only during the second third portion of the main cycle once the machine has been placed on a self-running basis. Its period is equal to the length of the 2nd portion of the main cycle with which it coincides. During this card cycle, the first pair of card feed rollers 304 and 306 are rotated and the card feed knives 302 are reciprocated so that the card which was disposed in front of the control station by the initial depression of the start key ST is started on its way through the control station and a new card is removed from the bottom of the hopper H and disposed in front of the control station. The first pair of feed rollers advance the card through the control station to where it is grabbed by the second pair of the feed rollers 312 and 314 which rotate continuously so as to draw the card completely through the control station and advance it to the reading station. The speed of the first and second set of rollers is such that the card's movement through the control station coincides with the second third portion of the main cycle.

The concurrence of a card in the control station and of the second third portion of the main cycle conditions the control station for perforation sensing by making the contact roll 310 "hot." It will be remembered that when the card is between the contact roll 310 and the control brushes 308, it operates the control station card lever CL2 which closes a pair of contacts CLC2. This pair of contacts is in series with the pair of cam contacts MC3 which are closed during the time that the index point positions on the card pass between the contact roller 310 and the control brushes 308. Circuits will then be completed as follows through the perforated index point positions in the card columns which respectively designate the tens and units orders of a section number and have been arbitrarily chosen as columns 1 and 2 as may be seen in Fig. 2: From line 125 through conventional circuit breaker contacts CC2 and CC3 operated in step with the movement of the index point positions past the control brushes to close and open the circuits after the brushes contact the roller through the perforations and before they break contact so that no arcing will occur at the brushes, contacts CLC2, common roll 310, perforation in card column 1, control brush 308 for column 1, rotating brush of emitter 127, pickup coil of one of relays T0 or T1, to line 124. A parallel circuit extends from control brush 308 in card column 2 through the rotating brush of emitter 128, pickup coil P of one of relays U0 and U9 inclusive, to line 124.

The section number is thus transferred to the T and U relays. Relays T0 and T1 and relays U0 to U9 inclusive, are equipped with hold coils H, as pointed out in the discussion of the switchboard shift circuits, through which they store the transferred number. The coils H hold through their "a" points which extend to line 125 through the closed RS&S1 cam contact. The setup section number will be held stored in these relays until such time as the stored information may be acted upon to dispose the indicated switchboard section at the switching station.

Also during the second third portion of the main cycle, circuits may be completed through perforations in the card passing the control station to effect a zoning of the interposer bars. It will be remembered that after the interposer bars 632 (Fig. 12c) have been restored to the right, an event which took place in the first third portion of the main cycle, they are moved back (to the left as seen in Fig. 12c) across the switching station and if the projections 670 formed on the bars are not engaged by the stops 668 releasable by the magnets 654, the interposer pins will be moved clear across the section at the switching station for eventual disposition in the left or "0" zone of that section. On the other hand, if a magnet 654 is operated at the proper time, the corresponding interposer pin 630 will be stopped at the start (left end) of the right hand or "1" zone.

Returning to the record card shown in Fig. 2, it will be recalled that in the code employed, two card columns, preferably grouped together, are needed to designate the switch which is to be closed in a switch column. Since in the embodiment shown there are twenty columns of switches, there must necessarily be twenty groups of two card columns or fields as they are sometimes called. The left hand column of each field is perforated at the index point position corresponding to the zone of the switch column in which a switch is to be closed, while the right hand column is perforated with the switch position in that zone. Thus an 09 set of perforations designates the ninth switch in the left or "0" zone, while a 15 set of perforations designates the fifth switch in the right or "1" zone. Preferably the fields are arranged on the card in the same order that the corresponding switch columns appear in a section.

The zoning of the interposer bars 632 is dependent on the presence or absence of "1" perforations in the left hand card columns. To this end, the interposer bar movements to the left are based on the time the impulse will occur if there is such a "1" perforation. Necessarily then, the interposer bars are moved to the left early in the second third portion of the main cycle and this movement is so timed that if the interposer pin is to be disposed over the "1" zone the projection on the interposer bar can be engaged by the stop released by a corresponding magnet 654 energized with a "1" pulse. The circuits which are completed when interposer pins are to be "1" zoned are as follows: Line 125, circuit breaker contacts CC2 and CC3, CLC2 contacts, MC3 cam contacts, which, as has been pointed out, are closed at this time, common roll 310, card perforation in the "1" index point position in the left column of fields 1 to 20, control brushes 308 (only those for the first five fields have been shown), corresponding non-transferred points (a to f inclusive) of relay R35, interposer bar magnets 654, normally closed cam contacts MC8, to line 124. To prevent a perforation in "0" index point position from tripping a magnet 654, the normally closed cam contacts MC8 are held open during the time that the zero index point positions pass the control brushes.

In the third portion of the main cycle, the interposer pins 630 are positioned over designated switches, and, if any cradle movement is necessary to dispose the designated switchboard section at the switching station, the machine is conditioned therefor. The movement through the reading station of the card which has just emerged from the control station coincides with the third portion of the main cycle. The second and third pair of feed rolls 312 and 314 and 320 and 322 are continuously running and their peripheral speed is such that the card will continue past the reading brushes in the last third portion of the machine clutch cycle. No card will be following it through the control station because the card unit clutch latches up at the end of the second third portion of the main cycle for the reason that cam contact MC2, in series with the card unit clutch magnet 408, is closed only during the end of the first third portion and the start of the second third portion of the main cycle.

The zoned interposer pins are yieldably moved to the right (Fig. 12c) over the respective columns of switches in step with the movement of the card index point positions past the reading brushes 316. In this way a perforation occurring at one of the index point positions may be used to position the interposer pin over a switch similarly located in a switch column of the appropriate zone. The impulse obtained energizes the associated interposer bar magnet 654 just in time for the pointed free end of the released stop pawl 668 to engage that one of the notches 698 formed in the top of the interposer bar which will stop the interposer bar with the interposer pin positioned over the connector 222 of the designated switch.

In order to connect the interposer bar magnets 654 with the brushes 316 of the reading station, the transfer contacts, of which contacts R35a through R35f are typical, must be shifted as the magnets are normally connected with the brushes 308 of the control station. The transfer contacts are necessary to maintain the brushes of one card station electrically separate from those of the other card station, for otherwise, due to contact of the brushes with the associated common contact roll at the station having no card, all the magnets 654 would be operated each time a perforation occurred in one card column. Thus, in that part of the third portion of the main cycle during which the card index point positions pass over the reading brushes, a cam contact MC5 is closed to hold a relay R35 energized and transfer the contacts R35a to R35f. As the card passes the reading brushes, circuits will be completed through the card perforations as follows: from line 125, through circuit breaker contacts CC2 and CC3, card lever contacts CLC3 now closed because a card is passing the read station, cam contacts MC4, held closed during the time the card index point positions pass the reading station, common roll 318, reading brushes 316, now transferred contacts R35a through R35f, interposer bar magnets 654, and cam contact MC-8, to line 124. It should be remembered that the latches controlled by the interposer bar magnets are restored to their latched position between the second and third portions of the main cycle after having been operated to zone the interposer bars.

During this third period steps are also undertaken to initiate the shifting of the switchboard cradle at the end of the main cycle so as to dispose the designated section at the switching station. The number of this section, it will be recalled, was read during the second portion of the main cycle as the card passed the control station. It was stored by means of holding relays which also operated other relays indicative of the column and row of the designated section. This information is acted upon when the cam contacts MC6 are closed at the start of the third period. The cam contacts MC6 make momentarily early in the last third portion of the main cycle to create a pulse which picks up a relay R40. The circuit through relay R40 is then as follows: From line 125, through the now closed cam operated contacts MC6, the normally closed points of transfer contacts R41d and through relay R40, to line 124. The picking up of relay R40 closes the contacts R40a in series with the PC clutch magnet 1068. This unlatches the clutch pawl 1056 which engages with the single notched clutch driving element 1066 at the end of the main cycle. Movement of the switchboard as explained earlier under the heading "Carriage shift circuits" ensues. Since the cam contacts MC6 are closed but momentarily, relay R40 and the PC clutch magnet are dropped almost immediately, thus permitting the clutch magnet to relatch at the end of its first revolution.

The main cycle is prevented from repeating by the closing of a pair of contacts MC1 during the third portion of the main cycle. The closing of these contacts results in the energization of relay R33 which holds through its contacts R33a in series with the normally closed cam contacts RS&S1 controlled by shaft 944 (Fig. 11b) which is latched up at this time. The picking up of relay R33 opens up the normally closed contacts R33b in series with the main cycle clutch magnet 716. Thus, an RS&S cycle must occur before there can be another main cycle.

*Reset and set circuits*

The positioning of the interposer pins 630 is completed during the last third portion of the main cycle. The positioning of the switchboard cradle, as explained is completed thereafter. Then a reset and set cycle RS&S is initiated.

In the reset and set cycle, the switch opening or resetting mechanism is normally operated and then the switch closing or setting mechanism is normally operated. In this way the designated section is cleared of all old switch closings before the new switch closings are effected. The cycle is started by pulsing of the clutch magnet 958 (Figs. 11b, 12b, and 15a) to unlatch the associated clutch. Thereafter, the clutch engages for one revolution and drives the shaft 944 bearing the cams for operating the contacts RS&S1, RS&S2, RS&S3 and RS&S4 and the sleeve 868 bearing the cams 870 and 872 through one revolution.

The energization of the RS&S cycle clutch magnet 958 is obtained after the switchboard positioning operation has been completed. To this end it is disposed in series with the cam operated BF and RL contacts 582, 586, 614 and 620, and the relay operated contacts R33c, R22b and R26c. The contacts R26c and R22c will be closed respectively when the carriage comes into incidence in the BF and RL directions, as relays R26 and R22 will then be energized. The RL and BF cam contacts are closed only at the points where their respective drive clutches may latch up. Thus, they are closed whenever the drive through the respective clutches is discontinued and the cradle has come to rest and their presence in the circuit prevents the reset and/or the set operations from taking place while the switchboard is moving. The relay R33 is picked up sufficiently late in the third portion of the main cycle to insure that the magnet 458 is not energized in time to permit the RS&S cycle clutch to engage at the start of the third period of the main cycle in those cases where the designated section is already at the switching station. A picking up of the magnet at any time after this point is all right as the unlatched clutch will not engage until the notch in the clutch driving element 948 (Fig. 15a) comes around again at which time the main cycle will be ending.

As the RS&S shaft turns to operate the switch opening or resetting mechanism and the switch closing or setting mechanism in the manner hereinbefore described, the normally closed cam contacts RS&S1 will be opened (see Fig. 31) to drop out relay R33. This not only prevents a repetition of the reset and set cycle by opening the contacts R33b to drop out the RS&S cycle clutch magnet 958, but also conditions the machine to begin the next main cycle at the end of the RS&S cycle by closing the R33b contacts to pick up the main cycle clutch magnet 716. The new main cycle will not be initiated, however, until the notch in the clutch driving element 820 (Fig. 15a) is engaged by the clutch dog 824.

The opening of the RS&S1 cam contact also drops out the energized ones of the storage relays T0 and T1 and U0 to U9 inclusive. The dropping out of these relays in turn deenergizes the RL relays and the BF relays. Thus both relays R22 and R26 will be deenergized.

A new main cycle will not be initiated if the hopper H is empty. This occurs because the relay R31 becomes deenergized when the hopper lever contact HLC is allowed to open. This permits the R31b contacts in the stop key circuit to open, thus dropping out relay R34. Contacts R34a then open to prevent energization of the main cycle clutch magnet 716 when the R33b contacts close due to relay R33 dropping out on the opening of the RS&S1 cam contacts in the RS&S cycle. The machine will thus come to a stop at the end of the RS&S cycle. In order to feed the last card through the machine the start key must be depressed momentarily to pick up R34. The R34a contacts will close to pick up the main cycle clutch magnet 716. The machine will then go through another main cycle during which the last card will be fed through the control and reading stations. Thereafter, the usual RS&S cycle ensues.

In this last RS&S cycle, a return movement is initiated of the switchboard cradle to the unloading position in which it is home in both the RL and the BF directions. No main cycle can be initiated because the relay R32 has become deenergized due to the opening of the card lever contact CLC1 when the last card was fed through the control station. Transfer contacts R32a restore to their non-transferred position in which the card unit clutch magnet 408 instead of the main cycle clutch magnet 716 is in circuit with the contacts R34a. This does, however, set up the machine for a card feed cycle when a new set of cards are placed in the hopper 11.

The dropping of relay R32 also conditions the machine to effect the cradle movement to the unloading position by permitting the contacts R32c to close. Thus, this time when the cam contacts RS&S2 are closed in the RS&S cycle, a circuit is completed from line 125 through the now closed RS&S2 contacts, the R41e contacts, the normally closed R32c points, and a relay R36, to the line 124. Relay R36 holds through the closing of its R36a contacts and the now closed R43a contacts.

The normally open contacts R43a are closed because the relay 43 by which they are controlled is now energized. Relay R43 is in series parallel with contacts 996 (Fig. 12c) and 1038 (Fig. 16a) which are respectively closed except when the switchboard cradle is home in the RL and the BF directions. Thus relay R43 remains energized as long as the cradle is not in the unloading position.

The picking up of relay R36 is equivalent to the reading of a designated section at the control station during the main cycle. Just as the RL and BF direction and incidence commuator brushes 990 and 1036 representative of the column and row of the designated section were disposed in a potential circuit, relay R36 closes contacts R36c and R36b to dispose the brushes 990 and 1036, representative of the home positions of the cradle, in a potential circuit. Relay R36 also initiates action on this information, which formerly was done at a fixed point in the main cycle through the picking up of relay R40 to close contacts R40a, by transferring contacts R36d. The common element of the transfer contacts R36d are in series with a capacitor 132 and the normally closed points of these contacts are in series with a resistor through which the capacitor discharges. When the contacts are transferred, capacitor 132 is disposed in series with a relay R39, and, while charging up, pulses the relay. Relay R39 then closes contacts R39a to pulse the PC clutch magnet 1068.

The carriage shift circuits after being set up in this fashion will effect the carriage return movement to the home position as follows:

With the energization of the magnet 1068, the PC clutch will engage and the pulse contacts PC1 will be closed to complete a circuit from line 124 through the pulse contacts, non-transferred contacts R26d, transfer contacts 998 which are closed when the cradle is not home in the RL direction, and relay R30, to line 125. The energization of relay R30 closes the contacts R30b to energize the shift left clutch magnet 608. Relay R30 holds through its contacts R30a in circuit with the contacts 994 which are normally closed when the carriage is not home in the RL direction so as to prevent the shift left clutch magnet from latching up at the end of one revolution if the cradle is not as yet home in the RL direction. Contacts 994 open up just before the cradle arrives home so as to enable the shift left clutch to latch up at the end of the revolution disposing the cradle in the home position in the RL direction.

After the cradle has been disposed in the home position in the RL direction, the forward movement necessary to dispose it in the home position in the BF direction ensues. The energization of the relay R30 transferred contacts R30c permitting the condenser 107 to discharge through the associated resistor. Deenergization of the relay R30 initiates the BF movement at the end of the RL movement by allowing the contacts R30c to restore and place the capacitor 107 in circuit with the relay R38. Condenser 107 charges up and this momentarily energizes relay R38 to close its contacts R38a which are in circuit with the PC clutch magnet 1068.

This time when the pulse contacts PC1 are closed, a circuit will be completed through the non-transferred R26d contacts, contacts 999 which are closed only when the carriage is home in the RL direction, and relay R21. Relay R21 holds through its contacts R21a in circuit with the normally closed contacts R26a so as to have the contacts R21b closed when the pulse contacts PC2 are closed. A circuit will extend from line 124 through the pulse contacts PC2, closed contacts R21b, non-transferred contacts R27a, and relay R28 to line 125. The energization of relay R28 closes the contacts R28b completing a circuit through the shift forward clutch magnet 528. Relay R28 holds through its contacts R28a in circuit with the normally closed contacts R26a to prevent the shift forward clutch from latching up at the end of one revolution if more than one revolution is needed to dispose the cradle in the BF home position. When the cradle arrives home in the BF direction, the finger 1024 of the BF direction and incidence commutator will engage the brush associated with the closed contacts R36b to complete a circuit through relay R26. The energization of relay R26 will cause it to open the contacts R26A breaking the circuit through the relay R28 holding closed the contacts R28b in circuit with the magnet 528. Thus the forward movement will come to an end at the end of the current revolution being undergone by the shift forward clutch with the switchboard cradle disposed in the home position in both directions, that is, in the unloading position.

When the carriage reached its home position in both the RL and BF directions, the remaining machine control circuits were opened. Contacts 996 and 1038 opened to drop out relay R43. The R43a contacts opened, dropping out relay R36. The contacts R36b and R36c then opened so that relays R22 and R26 dropped out. Contacts R36d transferred to enable capacitor 132 to discharge.

*Selective reset*

In setting up a switchboard it may be necessary to employ more than one record card to make all of the required switch closings in a section. Such a situation arises, for example, when two switches must be closed in the same column of a section. Since the interposer pin 630 for that column can close only one of the switches for a given main cycle and reset and set cycle, it is necessary to provide a second card for that section capable of directing the interposer pin to close the other switch. In the normal operation of the machine, the setting of the section according to the second card would be preceded by a setting of the section undoing all of the accomplishments of the first record card appertaining to that section. Therefore, it is necessary to suppress the resetting operation for all cards except the first one that pertains to one section.

It will be remembered that the reset linkage operated by the cam 872 would be disabled by the energization of the reset disabling magnet 898 (Fig. 26). Suppression of the resetting operation for any record card can thus be obtained by completing a circuit through to magnet 898 so that it is energized at the start of the RS&S cycle. Such circuits can be had for selected cards by specially perforating them, as for example, at the eleventh or "X" index point position in the first card column. When a card bearing such a special perforation passes the control station, a circuit is completed from line 125, circuit breaker contacts CC2 and CC3, contacts CLC2, cam contacts MC3, contact roll 310, brush 308 in the first card column extending through the "X" perforation, lead 193, cam contact MC7 closed only while the 11th index point position passes over the control brushes, relay R44, to line 124. The reset disabling magnet 898 is connected in parallel with the relay 44. Relay 44 and the reset disabling magnet hold up through the closed contacts R44a in series with the cam contacts RS&S1. As cam contacts RS&S1 remain closed until midway through the reset and set cycle, the reset linkage will not be effective when operated during the first portion of the RS&S cycle.

Initial reset

It may be desirable to clear a switchboard of all of its closed switches, as for example, when a new application thereof requires the use of but a few sections and the previous application thereof had required the setting up of more or different sections. Such an operation has been denominated "initial reset," and it is a feature of this invention that this operation may be accomplished in the machine described above without the use of record cards. Of course, such an operation may be carried out in the normal manner with the machine through the use of record cards which bear perforations representative of the sections and not of the switches within the respective sections.

The machine is conditioned to perform the "initial reset" operation by the closing of "initial reset" switch. If the start key ST is depressed thereafter, the machine will dispose one after the other of the switchboard sections at the switching station and undergo an RS&S cycle upon each section. In these RS&S cycles, however, the "set" linkage is disabled so that each section is left in an unset condition.

The machine disposes the different sections of the switchboard at the switching station in a regular order. To do this, it is provided with a pair of stepping switches which sequentially energize different combinations of the tens and the unit relays T0 and T1 and U0 through U9. One of the stepping switches, the tens order one, successively energizes the T0 and the T1 relays. The units order stepping switch successively energizes relays U0 through U9. The stepping switches are so interrelated that the relays U0 through U9 are sequentially picked up in combination with the T0 relay before the tens order stepping switch is advanced to permit a repeat energization of all of the unit relays with the T1 relay. It will be evident that the stepping switches in effect duplicate the section designation functions performed by the record cards.

An example of a stepping switch usable in this type of operation is shown in Fig. 29. It embodies the use of two magnets, one of which is operative to advance a biased contact arm assembly progressively over a series of contact members one at a time each time it is energized. The other magnet is operative to withdraw a stop pawl and permit the contact arm assembly to move under the influence of its bias to the starting position. The other magnet is energized through a pair of contacts which are so positioned as to be closed by the contact arm assembly when it is moved beyond the last desired contact member.

As shown, the stepping switch is mounted on the plate 140. Fastened to the plate and insulated from it is an arcuate conducting strip 141. Disposed above the arcuate plate 141 and insulated from each other and the plate 141 are the individual contacting members 142. There can be as many of these individual contacting members 142 as are desired. Loosely pivoted on a stud 143, which is fastened to plate 140, are a lever 144 and a ratchet and a contact arm assembly 145.

The ratchet and contact arm assembly 145 is provided with two resilient fingers, one of which contacts the arcuate strip 141 and the other of which contacts the individual contacting members 142. The contact arm assembly is shown in its home position. A spring 146 urges the assembly 145 in a clockwise direction as viewed in Fig. 29 and a lug portion 147 on the assembly 145 is held against a bent up ear 148 of the lever 144 which in turn is held against a stop pin 149 fixed to the plate 140.

The advance magnet 150 acts upon the ratchet and contact arm assembly through its pivoted armature 151 having a spring pawl 152 secured at one of its free ends. When the magnet 150 is energized, it will attract the armature 151 and the spring pawl 152 will be retracted so that its free end falls into the following tooth on the ratchet. Upon deenergization of the advance magnet 150, a spring 153 will return the armature and pawl to the position shown in Fig. 29 and this motion is limited by a stop pin 154. This action will cause counterclockwise rotation of the ratchet and contact arm assembly 145 as viewed in Fig. 29. The contacting fingers will be moved from one contacting member 142 to the next one on the left. A spring urged member 155, which also constitutes the armature of the restoring magnet 160, acts as a stop pawl and prevents retrograde movement of the ratchet. The arm 144 is thus no longer held against the stop pin 149 and a spring urged latch 156 is allowed to fall against the free end of a leaf contact 157. As before stated, the arm 144 is loosely pivoted on the stud 143 and its floating position during the advancing of the stepping relay is not important.

When the ratchet and contact arm assembly 145 are positioned so that the contacting fingers are in contact with the last individual contact member 142 on the left as viewed in Fig. 29, the next impulse to the advance magnet 150 will cause a lug portion 158 of the assembly 145 to press against a leaf contact 157 and cause closure of the pair of contact points 159. The spring urged latch 156 will fall in back of leaf contact 157 to thus hold the points 159 closed.

The contacts 159 are in a circuit to the restoring magnet 160 and their closing causes it to attract, as its armature, the stop pawl 155. The end of the stop pawl 155 is thus disengaged from the ratchet teeth and engaged with the free end of the spring pawl 152 to deflect it so that it disengages from the ratchet. The ratchet and contact assembly 145 is now returned to the original or starting position shown in Fig. 29 by the spring 146. In going to this position, a lug portion 147 of the assembly 145 strikes the ear 148 of the lever 144 causing an ear 161 on the same lever 144 to raise the latch 156 and allow the contacts 159 to open, thus deenergizing restoring magnet 160.

The machine is conditioned to perform the "initial reset" operation upon a switchboard in the cradle by throwing the initial reset switch IRS to the "on" position. Switch IRS is in series parallel with a relay R41 and the "set" disabling magnet 930, and these are thus energized throughout initial-reset operation. The picking up of relay R41 closes contacts R41a to place a relay R42 in series with the start key ST. Contacts R41b, in a series circuit also containing cam contacts RS&S3, the contacts R43c, and the "advance" magnet 150 of the units stepping relay, are closed also. Contacts R41c are closed to shunt out the R33c points to permit energization of the RS&S clutch magnet 958 without a main cycle. The R41d contacts transfer to connect relay R40 in series with a pair of contacts R43b and with cam contacts RS&S4 instead of the cam contacts MC6. The R41e contacts are opened to prevent pickup of relay coil R36 when the cam contacts RS&S2 are closed in the RS&S cycle. Contacts R41f are opened to prevent the picking up of relay 34, which initiates a card feed cycle or a main cycle when the start key ST is depressed.

Depression of the start key ST completes a circuit from line 125, through the start key ST, wire 170, now closed contacts R41a, and relay R42, to line 124. The picking up of relay R42 causes contacts R42a to transfer so as to connect a capacitor 171 in series with relay R40. Capacitor 171 will then charge up through the relay R40 thereby pulsing it. This will cause contacts R40a to close and complete a circuit to the PC clutch magnet 1068, thus initiating a cradle shift operation. The contacts R40b will close and complete a circuit from line 125, through now closed R40b contacts, lead 172, rotating wiper 173 of the units stepping switch, lead 174, and the pickup coil of relay U0, to line 124. Relay U0 will thus be energized.

A branch circuit extends from line 172 through wire 175, the rotating wiper 176 of a tens stepping switch, wire 177, and the pickup coil of relay T0, to line 124. Hence relay T0 will also be energized. The relays U0 and T0 operate just as they do when they are picked up by the sensing of perforations at the control station. Contacts RL1a and BF1b in circuit with brushes 990 and 1036 respectively of the RL and the BF direction and incidence commutators will be closed to set up the cradle shift circuits to effect a movement of the cradle so that the 00 section of the switchboard will be at the switching station. The timing is such that the pulse contacts PC1 and PC2 make after the cradle shift circuits have been set up.

When the 00 section of the switchboard has been moved into the switching station, relay R22 will be energized, as is customary. Relay R26 will already be energized. The concurrent energization of both of these relays initiates an RS&S cycle in which only the reset linkage is operated, as the "set" disabling magnet 930 was picked up with the closing of the initial reset switch. The reset and set cycle circuit is from line 125, through now closed R26c contacts, now closed R22b contacts, now closed R41c contacts, RS&S clutch magnet 958, and BF and RL cam contacts 582, 586, 614, and 620, to line 124. During the RS&S cycle, the setup section 00 will, of course, be reset. Cam contacts RS&S1 will be opened to drop out the relays U0 and T0 in circuit with it. Cam contacts RS&S3 will close to complete a circuit from line 125, through RS&S3 cam contacts, contacts R43c now closed because the carriage is not in the home position in both directions, now closed R41b contacts, lead 182, and the advance magnet 150 of the units stepping switch, to line 124. When cam contact RS&S3 opens, the wiping arm 173 of this stepping relay will advance under the action of spring 153 to the next position which is the one to which wire 183 is attached. When cam contact RS&S4 makes, a circuit is completed from line 125, through cam contacts RS&S4, now closed R43b contacts, the transferred R41d contacts, and relay R40, to line 124, thus energizing relay R40. Contacts R40a will be closed to energize the PC clutch magnet 1068. The R40b contacts will be closed to complete a circuit from line 125, through the contacts R40b, lead 172, wiper 173, lead 183, and relay U1, to line 124. A branch circuit extends via lead 175, wiper 176, lead 177, and relay T0, to line 124. The cradle shift circuits will again be set up and acted upon, this time to dispose switchboard section 01 at the switching station.

When the cradle has been moved so as to dispose the 01 section at the switching station, an RS&S cycle ensues in the manner explained and section 01 will be reset. The machine repeats the resetting operation upon sections 0-2, 0-3, 0-4, 0-5, 0-6, 0-7, 0-8, and 0-9 in the order enumerated. When the cam contacts RS&S3 pulse the advance magnet 150 of the units stepping switch the tenth time, the wiper 173 will move off of the segment 184 and close the contacts 185. These contacts are then held closed by the latch 156 as described in the description of the stepping switch. A circuit will thus be completed from line 125, through contacts 185, and advance magnet 186 of the tens order stepping switch, to line 124. A branch circuit also extends from the contacts 185, through the reset magnet 187 of the units order stepping switch, to line 124. The energization of the reset magnet 187 of the units order stepping switch will release the wiper 173 for return to its initial position in which it is in contact with the segment to which wire 174 is attached. When it reaches its initial position, the contacts 185 are unlatched as hereinbefore explained and the circuits through the magnets 186 and 187 are broken. The wiper 176 in the tens order stepping switch now advances to the segment 188. Thereafter, cam contacts RS&S4 are closed to energize relay R40. The contacts R40b will be closed to complete circuits to energize relays T1, and U0. It will be seen how setup sections 10, 11, 12, 13, 14, 15, 16, 17, 18, and 19 are reset thereafter in the order enumerated.

During the reset cycle in which the section 19 is reset, the cradle shift circuits are completed to return the cradle to the unloading position. An impulse from cam contact RS&S3 will cause the wiper 173 to move from segment 184 and close contacts 185. This, as explained before, will cause energization of the reset magnet 187 of the units stepping switch and of the advance magnet 186 of the tens order stepping switch. The wiper 176 of the tens order stepping switch will thus move from segment 188 and close contacts 189 which are like the contacts 185 of the units order stepping switch and become latched in their closed position. A circuit will now be completed from line 125, through lead 190, contacts 189, lead 191, and relay R36, to line 124, thus energizing relay R36. A branch circuit extends from contacts 189, through the reset magnet 192 of the tens order stepping switch, to line 124. Both stepping switches will thus return to their initial position. Relay R36 holds up through its R36a contacts and the now closed R43a contacts. By closing the R36b and R36c contacts and transferring the R36d contacts, relay R36 effects a return of the cradle to the unloading position as it did when the last record card was processed through the machine. When the cradle reaches its home position in both directions, contacts 996 and 1038 open as before, and relay R43 is deenergized. Relays R22 and R26 also are energized as the carriage reaches its home position. Thus a reset cycle, which is not necessary, ensues after the carriage is in its home position but it can do no harm as relay R43 is deenergized and the contacts associated with this relay are back to their normal position. Relay R36 drops out when points R43a open and thus relays R22 and R26 drop out.

*Template switchboard adjusting system*

This system enables the advantages of the switchboard adjusting machine to be availed of in the setting up of switchboards of the type described at points remote from that of the machine. It involves the reproduction of the switch designations contained in a series of record cards as perforations on a template which may be placed over a switchboard to guide the manual closing of the switches thereon. It envisions using the switchboard adjusting machine to produce the perforated template, and the use of a stylus or like tool to depress, through the perforations, the connectors of switches on the switchboard over which the template has been placed.

The system includes, in addition to the template, a dummy switchboard and a template adapter. A template is mounted on the upper surface of the dummy switchboard which is then inserted into the cradle of switchboard adjusting machine in place of the usual switchboard. When a group of record cards are processed through the machine, the interposer pins perforate the template at the same locations that they would have depressed the switch connectors of a switchboard in the cradle.

After the machine has run through its operation and restored the cradle to its unloading position, the dummy switchboard is removed therefrom and the template from the dummy switchboard. Thereafter the template may be mounted on the upper surface of the template adapter which is located upon a switchboard to be adjusted so as to dispose the template directly above the switch connectors. The stylus is then inserted through the perforations in the template to depress the connectors of the switches corresponding to the record card designations. Upon removal of the adapter, the switchboard is ready for insertion into an accounting machine adapted for its use. The template may be removed from the adapter and stored until such time as it is desired to set up another switchboard for the same type of operation in a similar machine. The template thus may constitute a permanent record which will be repeatedly used to set up switchboards.

The template is shown in Fig. 32. It is made of a relatively thin material whose length and width is such as to correspond with the general outline of the switchboards commonly used. On its upper surface the template has been provided with marks such as 1100 outlinging in block form the area corresponding to each of the zones of each section of a corresponding switchboard. The blocks facilitate the identification of the areas which correspond with the sections on the switchboard. Along the longitudinal center line of the template, two holes 1102 have been provided to facilitate the accurate locating of the template on the dummy switchboard and on the template adapter. These two holes perform this function by guiding the template on corresponding pins suitably located on the dummy switchboard and the template adapter.

The dummy switchboard (Figs. 33–35) is a structure which supports a blank template in the machine in the same relative location occupied by the connectors on a switchboard, thereby enabling the perforation thereof by the interposer pins. Thus the dummy switchboard has the overall outline, shape and size of a switchboard. It includes a base casting 1104 provided with a raised portion or platform 1106 and with longitudinally extending grooves 1108 on its sides whereby it may be slid upon the rails 496 located in the switchboard adjusting machine cradle 430. Upon the platform of the base casting are mounted a plurality of transversely extending pads or blocks 1110 formed of a yieldable material such as rubber. These pads extend completely across the board and are of such width that they underlie the entire area usually occupied by each row of sections on a switchboard. The template rests upon these pads and they form the backing which yieldably receives the interposer pins in the perforating operation. The pads are disposed in spaced relation to each other in order to accommodate the reset plate raising elements 834 and 836 of the machine. The operation of the bars 834 during the reset cycle will not disturb the template as it is disposed at a sufficient distance thereabove, that is, at the level usually occupied by the heads 222a of the connectors 222.

To hold the template upon the pads, a cover 1112 is provided. This cover is cut out as at 1114 so as to expose, to the action of the interposer pins, the template material occupying the space usually occupied by the switches of a switchboard. The cutouts are shown as being equal in size to the area usually encompassed by two sections; however, larger or smaller openings may be provided as desired.

The cover is hingedly mounted upon the base casting 1104 by having its one side 1116 bent at a right angle and terminating in a plurality of generally circular forms 1118 to define one portion of a hinge. The other portion of the hinge is formed of a flat plate 1120 having complementary similar circular portions which are associated with the cover through a hinge pin 1122.

The cover is held closed by means of a pair of fasteners located on the other longitudinally extending side of the dummy switchboard. These fasteners include an element 1124 which is slotted at its upper end and has its lower end rotatably mounted in the platform beneath which it terminates in a wing shape. When the element 1124 is rotated by means of the wing shape the slot engages a cross wire 1126 which is resiliently supported in spaced relation from the underside of the cover. The slot is directed downwardly into the element 1124 so that it will cam the spring downward to yieldably hold the cover tightly upon a template resting upon the pads.

Along the longitudinal center of the dummy switchboard, a pair of upwardly extending pins 1128 are provided to cooperate with the holes 1102 in the template. The pins and holes guide the template into a definite fixed position on the dummy switchboard. Holes 1130 may also be provided in the cover to permit the pins to extend a considerable distance through the template. A handle 1132 is mounted on the end of the dummy switchboard to provide a convenient means for enabling the ready insertion and removal of the dummy switchboard from the cradle of the adjusting machine.

The template adapter (Figs. 36–39) is a structure which supports the template over the switches of a switchboard that is to be adjusted. It includes a base casting 1134 formed of a raised portion 1136 which terminates at its opposite longitudinal edges in downwardly turned sides 1138 which at the lower ends are adapted to rest upon the upper surface of a switchboard which is to be adjusted. The raised portion 1136 is cut out so as to form openings which expose the zones of the switchboard sections. The transverse members of the lattice work so formed may be reinforced with ribs 1140 which lie between the switchboard section rows.

A pair of pins 1142 are mounted upon the lattice member extending along the longitudinal center of the casting and these serve to cooperate with the holes 1102 of the template to guide it to its proper seat on the adapter. A pair of pins 1144 are mounted on the bottom of opposite ends of each of the sides 1138 of the base casting and are adapted to be snugly received in corresponding holes formed in the upper surface of a switchboard so as to accurately locate the adapter on the switchboard. In this way it is assured that the perforation in a template will be disposed over the corresponding switch connectors on the switchboard.

A cover 1146 is provided on the template adapter to hold the template seated thereon. It also is cut out; however, its openings are longitudinally extending ones extending over several of the openings defined in the base casting. The longitudinally extending lattice elements 1147 of the cover overlie perforations formed by the interposer pins for which no switch was designated and which perforated the template in the area normally occupied by the spaces between the zones of a section and between the sections.

The cover 1146 is moved to and from its holding position on the base casting on a hinged axis. The hinged axis is formed by circular curved portions 1148 along one longitudinally extending side thereof cooperating by means of a pin 1150 with circular curved portions 1152 formed on a plate 1154 vertically secured as by welding to the associated side 1138 of the base casting.

The cover is held closed by latches 1156. These latches are formed so that their upper end is downwardly and inwardly inclined to where it terminates at 1158 in a hooked portion. Tension springs 1160 urge these latch members toward the cover on axes formed by pins 1169 located in lugs 1166 secured to the outside surface of the downwardly turned side portion 1138 of the base casting. Thus when the cover is moved to the closed position, the edges of the cover engage the upper inclined surface of the latches to force them outwardly against the action of the tension springs 1160 until such time as the upper surface of the cover is disposed beneath the hooked portion 1158. The cover will now be held closed until such time as the operator grasps the latches to move them outwardly to where they are clear of the cover. A pair of extensions 1168 are located near the latches to facilitate the raising of the cover.

The cover may also be provided with a material 1170 such as rubber on its underside to resiliently but firmly hold the template in place. Its longitudinally extending center lattice element also may be perforated as at 1172 to accommodate the template centering pins 1142.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a selectively made electrical interconnecting arrangement for use in accounting machines or the like, a support member, a first set of conducting leads mounted on one side of said support member, a second set of conducting leads also mounted on said one side of the support member but intersecting said first set of leads, a plurality of selectively operable switches each having a pair of contact elements and a slidable connector for effecting an electrical circuit through the contact elements, said switches being respectively provided for different intersections of the leads of the first and second sets, means connecting one of the contact elements of each switch with one of the leads of the associated intersection, means connecting the other of each pair of contact elements with the other lead of the associated intersections, and a movable reset plate mounted upon said support member and through which said connectors pass and by which they may be adjusted to a switch opening condition.

2. In a selectively made electrical interconnecting arrangement for use in accounting machines or the like, a removable connection board having a plurality of terminals on one side, a first set of conducting leads connected to certain of said terminals, a second set of conducting leads connected to other of said terminals and arranged so as to intersect the first set of conducting leads, a plurality of selectively operable switches each having a pair of contact elements and a depressible slidable connector for effecting an electrical circuit through the contact elements, said switches being respectively provided for different intersections of the leads of the first and second sets, means connecting one of the contact elements of each switch with one of the leads of the associated intersection, means connecting the other of each pair of contact elements with the other lead of the associated intersection, and a movable reset plate mounted upon the other side of the removable board and through which the connectors extend and by which they may be adjusted to a switch opening condition.

3. In a selectively made removable electrical interconnecting arrangement for use in statistical card machines or the like, a body member formed with a hollow chamber, a plate closing said chamber and having a plurality of terminals extending through it, a first set of conducting leads disposed in the chamber and connected to certain of said terminals, a second set of conducting leads disposed in said chamber transversely of said first set of leads so as to cross them and connected to other of said terminals, a plurality of selectively operable switches mounted in said body, each of said switches being provided with a pair of contact elements and a headed slidable connector electrically interconnecting said contact elements, said switches being respectively provided for different intersections of the crossing leads, means connecting one of the contact elements of each switch with one of the associated crossing leads, means connecting the other of each pair of contact elements with the other associated crossing lead, and a movable reset plate mounted on the exterior side of said body member and through which said connectors extend, said plate member being operative when raised to engage the head of all set connectors to restore them to the unset condition.

4. In a selectively made removable electrical interconnecting arrangement for use in statistical card machines or the like, a body member formed with a plurality of hollow interconnected chambers and corresponding raised portions, a plate closing said chambers and having a plurality of terminals extending through it, a first set of conducting leads disposed in each of said chambers and connected to certain of said terminals, a second set of conducting leads disposed in each of said chambers transversely of said first set of leads so as to cross them and connected to other of said terminals, the sets of leads in some of said chambers being extensions of the sets of leads in other of said chambers, a plurality of selectively operable switches mounted in each of said raised portions of said body, each of said switches being provided with a pair of contact elements and a headed slidable connector for electrically interconnecting said contact elements, said switches being respectively provided for different intersections of the crossing leads, means connecting one of said contact elements of each switch with one of the associated crossing leads, means connecting the other of said pair of contact elements with the other associated crossing lead, and a movable plate mounted on the exterior side of each of said raised portions and through which the connectors in that raised portion extend, said plates each being operative when raised to engage the heads of all depressed connectors in that portion to restore them to a switch opening condition.

5. In an apparatus for operating any of a plurality of means selectively operable and arranged in similar sections, means for sensing and analyzing data bearing means having designations representing a section and different selectively operable means in that section, and means controlled by said sensing and analyzing means for operating the designated selectively operable means in the designated sections.

6. In an apparatus for adjusting a plurality of means selectively operable and arranged in similar sections on a removable connection board, means for sensing and analyzing sequentially groups of designations on data bearing means, different ones of said groups containing designations of different ones of said sections and of particular selectively operable means in those sections, first means controlled by said sensing and analyzing means for operating the designated electrical interconnecting means, and second means controlled by said sensing and analyzing means for effecting relative movement between said connection board and said first means so as to dispose the section designated in a group of designations in a position whereat the selectively operable means thereof which are designated in the same group may be operated by said first means.

7. In an apparatus for adjusting a plurality of selectively operable switches arranged by columns in similar sections on a removable connection board, means for sensing and analyzing sequentially a series of record cards each bearing in different columns designations representative of a section and of particular switches in that section, first means controlled by said sensing and analyzing means for operating in corresponding switch columns the particular switches designated in the card columns, and second means controlled by said sensing and analyzing means for moving said connection board so as to dispose the sections designated on the cards in positions whereat their switches may be operated by said first means.

8. In an apparatus, a connection board arranged in sections each having a particular designation and containing columns of switches for effecting network connections representative of and for controlling certain types of operations, a switching station comprising a plurality of switch setting elements movable over respective switch columns and registerable with switches in those columns, said connection board and said switching station being selectively movable relative to each other to register one of said sections with said switching station, means for feeding a series of cards representing different switch settings, each card representing one of said sections and containing in different columns designations representing particular switch settings and designations for selecting the corresponding section, means for sensing and analyzing said designations, means controlled by sensing and analyzing means for moving said connection board and said switching station relative to each other to register the designated sections of the former at the latter, and other means controlled by the sensing and analyzing means for selectively operating the setting elements according to the switch designations in corresponding card columns.

9. In an apparatus, a connection board arranged in sections each having a particular designation and containing columns of switches for effecting network connections representative of and for controlling certain types of operations, a switching station comprising a plurality of switch setting elements movable over respective switch columns and registerable with switches in those columns and shiftable to adjust the registered switches, said connection board and said switching station being selectively movable relative to each other to register one of said sections with said switching station, means repeatedly operable to feed successive ones of a series of cards representing different switch settings, each card representing one of said sections and containing designations for selecting the corresponding section, means for sensing and analyzing the designations on a fed card, means controlled by the sensing and analyzing means for moving said connection board and said switching station relative to each other to register the section designated on the fed card, means including other means controlled by the sensing and analyzing means for moving and registering the setting elements according to the designations representing switch settings on the same card, means operable upon the registration of the section and of the setting elements to shift said setting elements, and means automatically actuable thereafter to initiate the card feed means.

10. In an apparatus for adjusting a plurality of selectively operable switches arranged in similar sections on a removable connection board, means for sensing and analyzing sequentially a series of record cards each bearing designations of a section and of particular switches in that section, a switch setting station comprising a plurality of switch setting elements selectively registerable with switches of a section disposed thereat, means controlled by said sensing and analyzing means for selectively registering said switch setting elements according to the switch designations on each card, means controlled by said sensing and analyzing means for moving the connection board so as to register the section designated on a card at the switching station, and means operable upon registration for each card of the designated section and of the designated switches to actuate said switch setting elements to set the switches.

11. In an apparatus for adjusting a plurality of selectively operable switches arranged in similar sections on a removable connection board, a switch setting station comprising a plurality of switch setting elements selectively registerable with switches of a section registered with the station, a support for said connection board movable from a loading and unloading position in which the connection board is clear of the station to positions in which the different connection board sections are registered with the station, means for sensing and analyzing each time it is actuated successive ones of a series of record cards each bearing designations of a section and of particular switches in that section, means controlled by said sensing and analyzing means for selectively registering said switch setting elements according to the switch designations on each card, means controlled by said sensing and analyzing means for moving the support board so as to register the designated section on each card at the switching station, means operable upon registration for each card of the designated section and of the designated switches to actuate said switch setting elements to set the switches, means operable upon operation of said switch setting elements actuating means to actuate said sensing and analyzing means, and means operable upon operation of said switch setting elements actuating means when all of said series of record cards have been sensed and analyzed to actuate support moving means so as to dispose the support in the loading and unloading position.

12. In an apparatus for adjusting a plurality of selectively operable switches arranged on a removable connection board by columns in similar sections divided into zones having equal numbers of switches of each column, means for sensing and analyzing sequentially a series of record cards each bearing in different columns designations of a section and of particular switches in corresponding columns of that section, the particular switch in a column being designated by zone and position within that zone, a switching station comprising an interposer element for each column of a section that is selectively registerable with any of the switches of a corresponding column of a section registered with the switching station, means controlled by said sensing and analyzing means for selectively registering said interposer elements according to each card and first as to zone and then as to position within the zone, means controlled by said sensing and analyzing means for moving said connection board according to each card so as to register the section designated at the switching station, and means for operating the interposer elements to adjust the designated switches after each registration of the interposer elements and of the connection board section.

13. In an apparatus for adjusting a plurality of selectively operable switches arranged on a removable connection board by columns in similar sections divided into equal zones having equal numbers of switches of each column, means for sensing and analyzing sequentially a series of record cards each bearing in different columns designations of a section and of particular switches in corresponding columns of that section, the particular switch in each column being designated by zone and position within that zone, said means including a control station whereat each card is first read for the zones of the designated switches and a reading station whereat each card is read for the position within those zones of the designated switches, the section to which each card pertains being read at one of the stations and each card being read at both of the stations before the next one is read at the control station, a switching station comprising an interposer element for each column of a section that is selectively registerable with any of the switches of a corresponding column of a section registered with the switching station, a movable cradle for supporting said connection board, means controlled by said sensing and analyzing means for moving said cradle according to each card so as to register the designated section with the switching station, means controlled by said sensing and analyzing means as the cards pass the control station for registering the interposer elements as to zone, means controlled by said sensing and analyzing means as the cards pass the reading station for registering the interposer elements as to positions within the respective zones, and means for operating the interposer elements to adjust the designated switches after each registration of the interposer elements and the section.

14. In an apparatus for adjusting a plurality of selectively operable switches arranged on a removable connection board by columns in similar sections divided into zones having equal number of switches in each column, means for sensing and analyzing sequentially a series of data bearing means each having designations of a section and of particular switches in different columns of that section, the particular switch in a column being designated by zone and position within that zone, a switching station comprising an interposer element for each column of a section that is yieldably movable over said column first in one direction and then in the opposite direction, means controlled by said sensing and analyzing means for stopping the interposer element after it has passed over the zone containing the switch position, means controlled by said sensing and analyzing means for thereafter stopping said interposer element over the switch position when the interposer element is moved in the opposite direction over said column, means controlled by said sensing and analyzing means for moving said connection board according to each data bearing means so as to register the section designated at the switching station, and means for operating the interposer elements to adjust the designated switches after each registration of the interposer elements of the connection board section.

15. In an apparatus for adjusting a plurality of selectively operable switches arranged in similar sections on a removable connection board, means for sensing and analyzing a series of data bearing means each bearing designations of a section and of particular switches in that section, a switching station comprising a plurality of switch setting elements selectively registerable with the switches of a section registered with the station, means controlled by said sensing and analyzing means for selectively registering said switch setting elements according to the switch designations on each data bearing means, means controlled by said sensing and analyzing means for moving the connection board so as to register the sections designated on the data bearing means at the switching station, means operable after each registration of a section to unset the set switches in that section, and means operable thereafter and after each registration of the switch setting elements to actuate the registered switch setting elements.

16. In an apparatus for adjusting a plurality of switches arranged in similar sections on a removable connection board having reset plates for the respective sections which are actuable to unset the set switches therein, means for sensing and analyzing sequentially a series of record cards each bearing designations of a section and of particular switches in that section, a switch setting station comprising a plurality of switch setting elements selectively registerable with the switches of a section registered with the station, means controlled by said sensing and analyzing means for selectively registering said switch setting elements according to the switch designations on each card, means controlled by said switches, sensing and analyzing means for moving the connection board so as to register the section designated on each card at the switching station, means operable upon registration of a section to actuate the reset plate of that section, and means operable thereafter and after registration of the switch setting elements to actuate said switch setting elements to set the switches.

17. In an apparatus for adjusting a plurality of selectively operable switches arranged in similar sections on a removable connection board, means for sensing and analyzing a series of data bearing means each having designations of a section and of particular switches in that section and of the fact that it is not the first data bearing means pertaining to a section when another pertaining thereto precedes it, a switching station comprising a plurality of switch setting elements selectively registerable with the switches of a section registered with the station, means controlled by said sensing and analyzing means for selectively registering said switch setting elements according to the switch designations on each data bearing means, means controlled by said sensing and analyzing means for moving the connection board so as to register the sections designated on the data bearing means at the switching station, means normally effective after each registration of a section to unset the set switches in that section, means controlled by said sensing and analyzing means when the data bearing means has a designation indicating that it is not the first data bearing means pertaining to the designated section to render said switch unsetting means ineffective, and means operable thereafter to actuate the registered switch setting elements.

18. In an apparatus for adjusting groups of selectively operable switches similarly arranged upon raised sections laid out in columns and rows on a removable connection board having a reset plate for each of the sections that may be raised to unset the set switches therein, means for sensing and analyzing a series of record cards of which different ones bear designations of different sections and of particular switches in those sections, a switching station including (1) a plurality of interposer elements selectively registerable with the switches of a section registered with the switching station and (2) a pair of reset plate raising elements between which a section being registered is received, said reset plate raising elements limiting the path of movement of said sections into and out of registration with said switching station to the direction of the section rows, means controlled by said sensing and analyzing means for selectively registering said interposer elements according to the switch designations on each card, means controlled by said sensing and analyzing means for reciprocating said connecting board in the directions of said section columns and rows to dispose by the most direct route within the limitations of the machine the section designated on each card in registration with the switching station, said reciprocating means including means operable when the designated section lies in a row other than that containing a section presently located at the switching station to first reciprocate the connection board in the direction of said rows to a position in which all of the sections are clear of the switching station and then in the direction of said columns until the row containing the designated section is aligned with the station and finally in the direction of said rows until the designated section is registered with said station, and means operable after each registration of the interposer elements and the connection board to actuate first the reset plate raising elements to raise the reset plate to reset the switches and then the interposer elements to set the designated switches.

19. A machine for presetting control panels comprising a plurality of similar sections arranged in rows and columns and each having a plurality of settable elements, a setting station comprising a bank of setting members capable of registering with the settable members of a section registered with the setting station, means for selectively moving said control panel and said setting station relative to each other in the directions of said rows and columns to register a section of said settable members with the setting station for a setting operation, and means for selectively operating said setting members.

20. A machine for presetting control panels comprising a plurality of similar sections arranged in rows and columns and each having a plurality of settable machine controlling elements, a setting station comprising a bank of setting members capable of registering with the settable members of a section registered with the setting station, means for selectively moving said control panel and said setting station relative to each other in the directions of said rows and columns to register a section of said settable members with the setting station for setting operation, means for selectively operating said setting members, and means controlled by records having designations representative of the settings of the settable members for controlling the operation of the moving means and selectively operating means.

21. A machine for unsetting control panels comprising a plurality of similar sections bearing designations and arranged in rows and columns and each having a plurality of switch elements, a switching station including members actuable to unset the set switch elements of a section registered at the switching station, means for selectively moving a control panel and said switching station relative to each other in the directions of said columns and rows to register a section with the switching station, means operable upon registration of a section at the switching station to actuate said unsetting elements, and control means for said moving means operative to designate the different sections of the control panel.

22. A machine for unsetting a control panel comprising a plurality of similar sections bearing designations and arranged in rows and columns and each having a plurality of switch elements, a switching station including members actuable to unset the set switch elements of a section registered with the switching station, a support for said control panel movable from a loading and unloading position in which the control panel is clear of the station to positions in which the different panel sections are registered with said station, means for selectively moving said support in the directions of said columns and rows, means operable upon registration of a section at the switching station to actuate said unsetting elements, control means for said moving means operative to designate the different sections of the control panel operative to actuate said naming means to return the support to the loading and unloading position when the last section to be designated by the control means has been unset.

23. In an apparatus for effecting different settings relative to a working point of an object extending in two dimensions, first means to move said object in each course along one dimension, second means to move said object in each course along the other dimension, third means to indicate the present setting of the object, fourth means to designate a new setting for the object, fifth means to compare the present setting indicated by the third means with the new setting designated by the fourth means and determine the course of movement necessary in each dimension to effect such new setting, and means controlled by said comparing means to operate the first and second means so as to move the object to the new setting.

24. In an apparatus for effecting different settings relative to a working point of an object extending in two dimensions, first means to move said object in each course along one dimension, second means to move said object in each course along the other dimension, third means to indicate the present setting of the object, fourth means to designate a new setting for the object, fifth means to compare the present setting indicated by the third means with the new setting designated by the fourth means and determine the course of movement necessary in each dimension to effect such new setting, and means controlled by said comparing means to operate successively the first and the second means so as to move the object to the new setting.

25. In an apparatus for disposing different parts of an object extending in two dimensions at a working point that is approachable along one dimension only, first means to move said object in each course along one dimension, second means to move said object along each course in the other dimension, third means to indicate the present disposition of the object with respect to the working point, fourth means to designate a new disposition of the object with respect to the working point, means to compare the present disposition of the object indicated by the third means with the new disposition of the object indicated by the fourth means and determine the sequence of movement necessary along the various dimensions to dispose the new part at the working point including that necessary to withdraw a part presently at the working point, and means controlled by said comparing means to operate the first and second means so as to move the object to the new disposition.

26. In an apparatus for disposing sections of an object arranged by columns and rows singly at a working point that is approachable only in the directions of said rows, support means for said object movable so as to dispose the different sections at said working point, means operative to reciprocate said support means in the direction of said rows, means operative to reciprocate said support means in the direction of said columns, means for designating the different sections, and means controlled by said designating means for actuating the reciprocating means successively so as to remove the present section from and dispose the designated section at the working point.

27. In an apparatus for disposing the sections of an object arranged by columns and rows singly at a working point that is approachable only in the direction of said rows, support means for said object movable so as to dispose the different sections at said working point, means for reciprocating said support means in the direction of said rows, means for reciprocating said support means in the direction of said columns, means for designating the different sections, means for analyzing the designated section as to column and row, means for analyzing the section presently at the working point as to column and row, and means responsive to a difference in the analysis of said analyzing means for actuating the reciprocating means successively so as to remove the present section from and dispose the designated section at the working point.

28. In an apparatus for disposing the sections of an object arranged by columns and rows at a working point for individual sections that is approachable only in the direction of said rows, a support for said object movable so as to dispose the different sections at the working point, a first means to reciprocate said support in the direction of said rows, a second means to reciprocate said support in the direction of said columns, means to designate the different sections, means to analyze the designated section as to column and row, means including elements movable synchronically with said support in the direction of said columns and cooperating with said analyzing means to indicate the location of the row of the designated section with respect to the working point, means including elements movable synchronically with the movement of said support in the direction of said rows and cooperative with said analyzing means to indicate the location of the column of the designated section with respect to the working point, means responsive to the indication of said row locating means that the row of the designated section is other than that presently aligned with the working point to actuate said first means so as to move the support in a course withdrawing the object to a position beyond the working point, means responsive to the arrival of said support in said position and to the indication of said row locating means to actuate said second means to move said support to a second position in which the row of the designated section is aligned with said working point, and means responsive to the arrival of said support in said second position and to the indication of said column locating means for actuating said first means to move said support so as to dispose the designated section at the working point.

29. In an apparatus for disposing the sections of an object arranged by columns and rows at a working point for individual sections that is approachable only in the direction of said rows, a support for said object movable so as to dispose the different sections at the working point, a first pair of means including electromagnetic means selectively energizable to reciprocate said support in the direction of said rows, a second pair of means including electromagnetic means selectively energizable to reciprocate said support in the direction of said columns, two sets of selectively energizable relays operable in combination to designate the different sections, two sets of relays energizable by the section designating relays to indicate respectively the row and the column of the designated section, means including elements movable synchronically with the movement of said support in the direction of said columns and cooperative with said row indicating set of relays to complete circuits indicative of the location of that row with respect to the working point, means including elements movable synchronically with the movement of said support in the direction of said rows and cooperative with said column indicating set of relays to complete circuits indicative of the location of that column with respect to the working point, means responsive to the completion of circuits indicative that the row of the designated section is not presently aligned with the switching station for actuating the electromagnetic means in the appropriate one of said first pair of means to move the support in a course withdrawing the object to a position beyond the working point, means responsive to the arrival of said support in said position and to the completion of circuits indicative of the present location of the row containing the designated section for actuating the electromagnetic means of the appropriate one of said second pair of means to move said support to a second position in which the row is aligned with said working point, and means responsive to the arrival of said support in said second position and to the completion of circuits indicative of the present location of the column containing the designated section for actuating the electromagnetic means in the other of said first pair of means to move said support so as to dispose the designated section at the working point.

30. In an apparatus for disposing the sections of an object arranged by columns and rows at a working point for individual sections that is approachable only in the direction of said rows, a support for said object movable from a loading and unloading position in which none of said columns and rows are aligned with said working point so as to dispose the different sections at the working point, a first means to reciprocate said support in the direction of said rows, a second means to reciprocate said support means in the direction of said columns, third means to designate the different sections, means to analyze the designated section as to column and row, means including elements movable synchronically with said support in the direction of said columns and cooperative with said analyzing means to indicate the location of the row of the designated section with respect to the working point, means including elements movable synchronically with the movement of said support in the direction of said rows and cooperative with said analyzing means to indicate the location of the column of the designated section with respect to the working point, means responsive to the indication of said row locating means when another section row is aligned with the working point in another row to actuate said first means so as to move the support in a course withdrawing the object to a position clear of the working point, to the indication of the column locating means that none of the columns is aligned with said working point and to the indication of said row locating means to actuate said second means to move said support to a position in which the row of the designated section is aligned with said working point, means responsive to the arrival of said support in said position and to the indication of said column locating means to actuate said first means to move said support so as to dispose the designated section at the working point, means operable when a section is disposed at the working point to perform a work function, means operable upon performance of the work function to cause the third means to designate another section, and means operable when the designating means is exhausted to actuate first said first means to move said object to a position clear of said working point and then said second means to move said object to the loading and unloading position.

31. In a device for locating an object in any one of a plurality of positions zoned into groups, means for yieldably moving said object from a home position through said plurality of positions, means for stopping said object when it has passed through any group of such positions, means for thereafter yieldably moving said object in the opposite direction through the last passed group of such positions, and means for stopping said object when moving in said opposite direction in any one of the positions of that group.

32. In a device for locating an object in one of a plurality of positions zoned into groups, means adapted to be yieldably coupled with said object at a series of points corresponding to the number of said groups, a stop disposed in the path of said object, means for moving said yieldably coupled means so as to cause said object to engage with said stop and to dispose said yieldably coupled means at an end point of the series of points, means for moving said yieldably coupled means through a range sufficient to move said object from said end position through all of its positions, and operable stop means, means associated with said object for engagement by said operable stop means to stop said object after it has passed through the positions of a corresponding group, means for thereafter yieldably moving said yieldably coupled means through a range sufficient to move said object toward said stop through a group of positions, a second operable stop means, and a means for each position in a group associated with said yieldably coupled means for engagement by said second operable stop means to stop the said object at the corresponding position.

33. A pawl operative to stop the motion of an object in either of two directions comprising a body movable from an inoperative to an operative position, a first projection on said body adapted to be operatively disposed in the path of said object only when said object is moving in one direction, and a second projection formed on said body adapted to be operatively disposed in the path of said object only when it is moving in the other direction.

34. In an apparatus for perforating a template to be used for adjusting a plurality of selectively operable switches arranged in similar sections on a connection board, means for sensing and analyzing sequentially a series of record cards of which different ones bear designations of different sections and of particular switches in those sections, a perforating station comprising a plurality of interposer pins selectively registerable with positions corresponding to the switch positions in a connection board section, means controlled by said sensing and analyzing means for selectively registering said interposer elements according to the switch designations on each card, a support for said template movable relative to said station so as to register the different areas of said template corresponding to different sections on a connection board with said station, means controlled by said sensing and analyzing means for moving the support so as to register the template area corresponding to the connection board section designated on each card and means actuable after each registration of the interposer pins and the template for the respective cards to operate said interposer pins to perforate said template.

35. In an apparatus for perforating a template to be used for adjusting a plurality of selectively operable switches arranged by columns in similar sections on a connection board, a perforating station comprising a plurality of interposer pins each of which is registerable with the different positions in a respective column of positions corresponding with a column of switch positions on a connection board section, a support for said template movable so as to register the different areas of said template corresponding to the different sections on a connection board with said station, means for sensing and analyzing sequentially a series of record cards each bearing in different columns designations of a section and of particular switches in that section, means controlled by said sensing and analyzing means for moving said support so as to register the template area corresponding to the connection board section designated on each card, means controlled by said sensing and analyzing means for registering said interposer pins according to the switch designations on each card, and means actuable after each registration of the interposer pins and the template for the respective cards to actuate said interposer pins to perforate said template.

36. In an apparatus for perforating a template to be used for adjusting a plurality of selectively operable switches arranged in similar sections on a connection board, a perforating station comprising a plurality of interposer pins selectively registerable with positions corresponding to the switch positions in a connection board section, removable support means for said template including a backing element of yieldable material, a cradle for said support means movable so as to register the different areas of said template corresponding to the different sections on a connection board with said station, means for sensing and analyzing sequentially a series of record cards of which different ones bear designations of different sections and of particular switches in those sections, means controlled by said sensing and analyzing means for moving said cradle to register the template area corresponding to the connection board section designated on each card, means controlled by said sensing and analyzing means for registering the interposer pins according to the switch designations on each card, and means actuable after each registration of the interposer pins and the template for the respective cards to depress the registered interposer pins through the template and into the yieldable material so as to perforate the template.

37. In a device for supporting a template for perforation in a machine equipped with despressable piercing pins, a base, means on said base for mounting the device in said machine, an elastic backing material mounted on said base, guide means secured to said base for accurately locating a template on said device, and a cover attachable to said base to hold the template firmly down upon said backing material, said cover being provided with large openings exposing the template to the action of the pins.

38. In a device for supporting a perforated template over a connection board having a plurality of switches which are adjusted by the movement of slidable connectors out of and into the board, a base having a template receiving portion formed with large openings and means whereby it may be mounted on a connection board so as to juxtapose the template receiving portion with the switches, guide means secured to said base for accurately locating a template on said device, and a cover attachable to said base to hold the template firmly down upon said template receiving portion, said cover being provided with large openings exposing the perforations in the template.

39. In a device for supporting a perforated template over a connection board having a plurality of switches which are adjusted by the movement of slidable connectors out of and into the board, a base having a template receiving portion formed with large openings and means whereby it may be mounted on a connection board so as to juxtapose the template receiving portion with the switches, guide means secured to said base for accurately locating a template on said device, and a cover attachable to said base to hold the template firmly down upon said template receiving portion, said cover being provided with large openings exposing the perforations in the template and with strips which separate these large openings and overlie perforations formed in those areas of the template beneath which no switches are located.

40. In a method for adjusting a removable connection board having a plurality of switches arranged in sections, the steps of preparing a series of record cards for the respective sections and the particular switches therein according to a preselected code, placing the record cards in a machine operable by section in accordance with the code designations on the record cards, placing the removable connection board in the machine, operating the machine, and then removing the set-up connection board from the machine.

41. In a method for adjusting a connection board having a plurality of switches which are adjusted by the movement of slidable connectors out of and into the board and arranged in sections, the steps of preparing a series of record cards for the respective sections and the particular switches therein according to a preselected code, placing the record cards in a machine operable to process the record cards serially and perforate a template in accordance with the code designations on the record cards in locations corresponding to the positions of the designated switches on the connection board, placing the template in the machine, operating the machine, removing the perforated template from the machine and placing it over the connection board, and inserting a stylus through the perforations in the template to move the slidable connectors of the corresponding switches.

42. In a method for adjusting a removable connection board having a plurality of switches which are provided with connectors slidable out of and into the board to open and close the switches and arranged in sections, the steps of placing a template in a dummy connection board having a yieldable backing material therefor, placing the template bearing the dummy connection board in a machine adapted to perforate the template in locations corresponding to the positions of switches on the connection board, operating the machine to perforate the template according to the switches which are to be adjusted, removing the dummy connection board from the machine and the perforated template from dummy connection board, placing the template in a connection board adapter, placing the template bearing connection board adapter over a connection board, and inserting a stylus through the perforations to adjust the corresponding switches.

References Cited in the file of this patent

UNITED STATES PATENTS

| | | |
|---|---|---|
| 1,060,939 | Potts | May 6, 1913 |
| 2,377,762 | Daly | June 5, 1945 |
| 2,377,764 | Dickinson | June 5, 1945 |
| 2,502,960 | Johnson | Apr. 4, 1950 |
| 2,590,950 | Eckert et al. | Apr. 1, 1952 |
| 2,613,287 | Geiger | Oct. 7, 1952 |